(12) United States Patent    (10) Patent No.: US 7,770,196 B1
Hendricks    (45) Date of Patent: Aug. 3, 2010

(54) SET TOP TERMINAL FOR ORGANIZING PROGRAM OPTIONS AVAILABLE IN TELEVISION DELIVERY SYSTEM

(75) Inventor: John S. Hendricks, Potomac, MD (US)

(73) Assignee: Comcast IP Holdings I, LLC, Wilmington, DE (US)

( * ) Notice: Subject to any disclaimer, the term of this patent is extended or adjusted under 35 U.S.C. 154(b) by 1482 days.

(21) Appl. No.: 09/966,594

(22) Filed: Oct. 1, 2001

Related U.S. Application Data

(63) Continuation of application No. 07/991,074, filed on Dec. 9, 1992, now abandoned.

(51) Int. Cl.
*H04N 5/445* (2006.01)
*G06F 3/00* (2006.01)
*G06F 13/00* (2006.01)

(52) U.S. Cl. .............................. 725/50; 725/46; 725/54

(58) Field of Classification Search ................... 725/46, 725/47, 54, 50
See application file for complete search history.

(56) References Cited

U.S. PATENT DOCUMENTS

| | | | |
|---|---|---|---|
| 3,647,977 A | 3/1972 | Closs | |
| 3,794,923 A | 2/1974 | Ellis | |
| 3,860,873 A | 1/1975 | Ringstad | |
| 3,946,158 A | 3/1976 | Leclercq et al. | |
| 3,978,470 A | 8/1976 | McGuire | |
| 3,993,955 A | 11/1976 | Belcher et al. | |
| 4,197,590 A | 4/1980 | Sukonick et al. | |
| 4,225,884 A | 9/1980 | Block et al. | |
| 4,279,035 A | 7/1981 | Skerlos | |
| 4,331,974 A | 5/1982 | Cogswell et al. | |

(Continued)

FOREIGN PATENT DOCUMENTS

DE    3935294    4/1991

(Continued)

OTHER PUBLICATIONS

Reimer, Memories in My Pocket, Feb. 1991.

(Continued)

*Primary Examiner*—James Sheleheda
(74) *Attorney, Agent, or Firm*—Banner & Witcoff, Ltd.

(57) ABSTRACT

A set top terminal is disclosed for creating a favorites menu of television programs available for viewing, based on a user's preferences. The terminal receives a television signal from an operations center, extracts individual programs from the signal, and sends one or more of the individual programs to a television for display, based on a selection by the user. The terminal generates an interactive electronic program guide for the selection of programs. The favorites menu of the guide narrows the list of available programs to those most likely of interest to the user. The terminal receives and stores user information, including general demographic information and viewing preference information. The viewing preference information may be received directly from the user, for example by querying the user. Alternatively, it may be learned by tracking the user's viewing habits. The viewing preference information may include, for example, frequently-watched channels, frequently-watched programs, or information related to program content. The user information may be stored in a user profile. Using the user information, the terminal identifies those programs available for viewing that most closely match the user information. A program menu including the identified programs is then generated for display on a television.

15 Claims, 69 Drawing Sheets

U.S. PATENT DOCUMENTS

| | | |
|---|---|---|
| 4,381,522 A | 4/1983 | Lambert |
| 4,398,216 A | 8/1983 | Field et al. |
| 4,451,701 A | 5/1984 | Bendig |
| 4,455,570 A | 6/1984 | Saeki et al. |
| 4,484,217 A | 11/1984 | Block et al. |
| 4,484,218 A | 11/1984 | Boland et al. |
| 4,488,179 A | 12/1984 | Krüger et al. |
| 4,509,198 A | 4/1985 | Nagatomi |
| 4,513,315 A | 4/1985 | Dekker et al. |
| 4,528,589 A | 7/1985 | Block et al. |
| 4,528,643 A | 7/1985 | Freeny, Jr. |
| 4,533,948 A | 8/1985 | McNamara et al. |
| 4,546,382 A | 10/1985 | McKenna et al. |
| 4,558,464 A | 12/1985 | O'Brien, Jr. |
| 4,581,484 A | 4/1986 | Bendig |
| 4,602,279 A | 7/1986 | Freeman ............... 725/35 |
| 4,621,282 A | 11/1986 | Ahern |
| 4,633,462 A | 12/1986 | Stifle et al. |
| 4,641,205 A | 2/1987 | Beyers, Jr. ............... 386/83 |
| 4,646,150 A | 2/1987 | Robbins et al. |
| 4,658,290 A | 4/1987 | McKenna et al. |
| 4,673,976 A | 6/1987 | Wreford-Howard |
| 4,674,085 A | 6/1987 | Aranguren et al. |
| 4,677,685 A | 6/1987 | Kurisu |
| 4,688,246 A | 8/1987 | Eilers et al. |
| 4,691,340 A | 9/1987 | Maeda et al. |
| 4,694,490 A | 9/1987 | Harvey et al. |
| 4,695,879 A | 9/1987 | Weinblatt |
| 4,695,880 A | 9/1987 | Johnson et al. |
| 4,697,209 A | 9/1987 | Kiewit et al. |
| 4,706,121 A | 11/1987 | Young |
| 4,712,105 A | 12/1987 | Kohler |
| 4,712,130 A | 12/1987 | Casey |
| 4,724,491 A | 2/1988 | Lambert |
| 4,739,510 A | 4/1988 | Jeffers et al. |
| 4,747,785 A | 5/1988 | Roberts et al. |
| 4,751,578 A | 6/1988 | Reiter et al. |
| 4,775,935 A | 10/1988 | Yourick |
| 4,779,138 A | 10/1988 | Nomura et al. |
| 4,792,972 A | 12/1988 | Cook, Jr. |
| 4,802,008 A | 1/1989 | Walling |
| 4,805,014 A | 2/1989 | Sahara et al. |
| 4,816,901 A | 3/1989 | Music et al. |
| 4,816,904 A | 3/1989 | McKenna et al. |
| 4,825,220 A | 4/1989 | Evans et al. |
| 4,829,372 A | 5/1989 | McCalley et al. |
| 4,829,558 A | 5/1989 | Welsh |
| 4,835,607 A | 5/1989 | Keith |
| 4,845,662 A | 7/1989 | Tokumitsu |
| 4,860,379 A | 8/1989 | Schoeneberger et al. |
| 4,876,736 A | 10/1989 | Kiewit |
| 4,885,803 A | 12/1989 | Richards |
| 4,887,308 A | 12/1989 | Dutton |
| 4,888,638 A | 12/1989 | Bohn |
| 4,896,354 A | 1/1990 | Inagaki et al. |
| 4,907,082 A | 3/1990 | Richards |
| 4,920,432 A | 4/1990 | Eggers et al. |
| 4,924,303 A | 5/1990 | Brandon et al. |
| 4,928,168 A | 5/1990 | Iwashita |
| 4,930,160 A | 5/1990 | Vogel |
| 4,935,924 A | 6/1990 | Baxter |
| 4,947,429 A | 8/1990 | Bestler et al. |
| 4,959,810 A | 9/1990 | Darbee et al. |
| 4,961,109 A | 10/1990 | Tanaka |
| 4,965,825 A | 10/1990 | Harvey et al. |
| 4,974,252 A | 11/1990 | Osborne |
| 4,975,771 A | 12/1990 | Kassatly |
| 4,975,951 A | 12/1990 | Bennett |
| 4,977,455 A | 12/1990 | Young |
| 4,985,697 A | 1/1991 | Boulton |
| 4,985,761 A | 1/1991 | Adams |
| 4,995,078 A | 2/1991 | Monslow et al. |
| 4,996,597 A | 2/1991 | Duffield |
| 5,001,554 A | 3/1991 | Johnson et al. |
| 5,003,384 A | 3/1991 | Durden et al. |
| 5,003,591 A | 3/1991 | Kauffman et al. |
| 5,014,125 A | 5/1991 | Pocock et al. |
| 5,015,829 A | 5/1991 | Eilert et al. |
| 5,020,129 A | 5/1991 | Martin et al. |
| 5,029,232 A | 7/1991 | Nall |
| 5,036,537 A | 7/1991 | Jeffers et al. |
| 5,038,402 A | 8/1991 | Robbins |
| 5,046,093 A | 9/1991 | Wachob |
| 5,047,867 A * | 9/1991 | Strubbe et al. ............... 386/83 |
| 5,049,990 A | 9/1991 | Kondo et al. |
| 5,054,071 A | 10/1991 | Bacon |
| 5,055,924 A | 10/1991 | Skutta |
| 5,056,138 A | 10/1991 | Tyson, Sr. |
| 5,057,917 A | 10/1991 | Shalkauser et al. |
| 5,073,930 A | 12/1991 | Green et al. |
| 5,075,771 A * | 12/1991 | Hashimoto ............... 725/46 |
| 5,077,607 A | 12/1991 | Johnson et al. |
| 5,078,019 A | 1/1992 | Aoki |
| 5,083,205 A | 1/1992 | Arai |
| 5,091,782 A | 2/1992 | Krause et al. |
| 5,093,718 A | 3/1992 | Hoarty et al. |
| 5,099,319 A | 3/1992 | Esch et al. |
| 5,103,314 A | 4/1992 | Keenan |
| 5,105,268 A | 4/1992 | Yamanouchi et al. |
| 5,115,309 A | 5/1992 | Hang |
| 5,115,426 A | 5/1992 | Spanke |
| 5,121,205 A | 6/1992 | Ng et al. |
| 5,124,980 A | 6/1992 | Maki |
| 5,132,789 A | 7/1992 | Ammon et al. |
| 5,134,712 A | 7/1992 | Yamamoto |
| 5,144,663 A | 9/1992 | Kudelski et al. |
| 5,150,118 A | 9/1992 | Finkle et al. |
| 5,151,782 A | 9/1992 | Ferraro |
| 5,151,785 A | 9/1992 | Citta |
| 5,151,789 A | 9/1992 | Young |
| 5,152,011 A | 9/1992 | Schwob |
| 5,155,591 A | 10/1992 | Wachob |
| 5,166,886 A | 11/1992 | Molnar et al. |
| 5,182,639 A | 1/1993 | Jutamulia et al. |
| 5,187,735 A | 2/1993 | Herrero Garcia et al. |
| 5,192,999 A | 3/1993 | Graczyk et al. |
| 5,195,022 A | 3/1993 | Hoppal et al. |
| 5,202,817 A | 4/1993 | Koenck et al. |
| 5,206,722 A | 4/1993 | Kwan |
| 5,206,929 A | 4/1993 | Langford et al. |
| 5,206,954 A | 4/1993 | Inoue et al. |
| 5,208,660 A | 5/1993 | Yoshida |
| 5,212,553 A | 5/1993 | Maruoka |
| 5,221,962 A | 6/1993 | Backus et al. |
| 5,223,924 A * | 6/1993 | Strubbe ............... 725/46 |
| 5,231,494 A | 7/1993 | Wachob |
| 5,235,328 A | 8/1993 | Kurita |
| 5,235,419 A | 8/1993 | Krause |
| 5,237,311 A | 8/1993 | Mailey et al. |
| 5,237,610 A | 8/1993 | Gammie et al. |
| 5,241,428 A | 8/1993 | Goldwasser et al. |
| 5,247,347 A | 9/1993 | Litteral et al. |
| 5,247,575 A | 9/1993 | Sprague et al. |
| 5,251,324 A * | 10/1993 | McMullan, Jr. ............... 725/14 |
| 5,253,066 A | 10/1993 | Vogel |
| 5,253,275 A | 10/1993 | Yurt et al. |
| 5,253,341 A | 10/1993 | Rozmanith et al. |
| 5,255,086 A | 10/1993 | McMullan, Jr. et al. |
| 5,260,788 A | 11/1993 | Takano et al. |
| 5,270,809 A | 12/1993 | Gammie et al. |
| 5,282,028 A | 1/1994 | Johnson et al. |
| 5,285,272 A | 2/1994 | Bradley et al. |
| 5,289,271 A | 2/1994 | Watson |
| 5,293,540 A | 3/1994 | Trani et al. |

| | | | | | | |
|---|---|---|---|---|---|---|
| 5,293,633 A | 3/1994 | Robbins | | 5,488,409 A | 1/1996 | Yuen et al. |
| 5,307,173 A | 4/1994 | Yuen et al. | | 5,490,247 A | 2/1996 | Tung et al. |
| 5,307,481 A | 4/1994 | Shimazaki et al. | | 5,493,568 A | 2/1996 | Sampat et al. |
| 5,311,425 A | 5/1994 | Inada | | 5,497,187 A | 3/1996 | Banker et al. |
| 5,317,391 A | 5/1994 | Banker et al. | | 5,500,794 A | 3/1996 | Fujita et al. |
| 5,319,455 A | 6/1994 | Hoarty et al. | | 5,508,733 A | 4/1996 | Kassatly |
| 5,319,707 A | 6/1994 | Wasilewski et al. | | 5,512,934 A | 4/1996 | Kochanski |
| 5,323,240 A | 6/1994 | Amano et al. | | 5,515,098 A | 5/1996 | Carles |
| 5,327,554 A | 7/1994 | Palazzi, III et al. | | 5,517,502 A | 5/1996 | Bestler et al. |
| 5,329,590 A | 7/1994 | Pond | | 5,528,281 A | 6/1996 | Grady et al. |
| 5,335,313 A | 8/1994 | Douglas | | 5,537,141 A | 7/1996 | Harper et al. |
| 5,339,239 A | 8/1994 | Manabe et al. | | 5,539,449 A | 7/1996 | Blahut et al. |
| 5,339,315 A | 8/1994 | Maeda et al. | | 5,550,863 A | 8/1996 | Yurt et al. |
| 5,341,166 A | 8/1994 | Garr et al. | | 5,561,708 A | 10/1996 | Remillard |
| 5,341,426 A | 8/1994 | Barney et al. | | 5,561,709 A | 10/1996 | Remillard |
| 5,341,474 A | 8/1994 | Gelman et al. | | 5,570,126 A | 10/1996 | Blahut et al. |
| 5,343,239 A | 8/1994 | Lappington et al. | | 5,579,522 A | 11/1996 | Christeson et al. |
| 5,343,516 A | 8/1994 | Callele et al. | | 5,588,104 A | 12/1996 | Lanier et al. |
| 5,345,594 A | 9/1994 | Tsuda | | 5,588,139 A | 12/1996 | Lanier et al. |
| 5,347,304 A | 9/1994 | Moura et al. | | 5,594,509 A | 1/1997 | Florin et al. |
| 5,349,638 A | 9/1994 | Pitroda et al. | | 5,600,364 A | 2/1997 | Hendricks et al. |
| 5,351,075 A | 9/1994 | Herz et al. | | 5,600,368 A | 2/1997 | Matthews, III |
| 5,353,121 A | 10/1994 | Young et al. | | 5,600,573 A | 2/1997 | Hendricks et al. |
| 5,355,162 A | 10/1994 | Yazolino et al. | | 5,600,775 A | 2/1997 | King et al. |
| 5,357,276 A | 10/1994 | Banker et al. | | 5,621,456 A | 4/1997 | Florin et al. |
| 5,365,265 A | 11/1994 | Shibata et al. | | 5,621,793 A | 4/1997 | Bednarek et al. |
| 5,367,330 A | 11/1994 | Haave et al. | | 5,629,733 A | 5/1997 | Youman et al. ............... 725/53 |
| 5,367,571 A | 11/1994 | Bowen et al. | | 5,630,103 A | 5/1997 | Smith et al. |
| 5,374,951 A | 12/1994 | Welsh | | 5,635,989 A | 6/1997 | Rothmuller .................. 725/46 |
| 5,375,068 A | 12/1994 | Palmer et al. | | 5,640,196 A | 6/1997 | Behrens et al. |
| 5,384,588 A | 1/1995 | Martin et al. | | 5,644,354 A | 7/1997 | Thompson et al. |
| 5,386,241 A | 1/1995 | Park | | 5,659,350 A | 8/1997 | Hendricks et al. |
| 5,389,964 A | 2/1995 | Oberle et al. | | 5,661,516 A | 8/1997 | Carles |
| 5,390,348 A | 2/1995 | Magin et al. | | 5,663,757 A | 9/1997 | Morales et al. |
| 5,396,546 A | 3/1995 | Remillard | | 5,675,390 A | 10/1997 | Schindler et al. |
| 5,400,401 A | 3/1995 | Wasilewski et al. | | 5,689,663 A | 11/1997 | Williams |
| 5,404,393 A | 4/1995 | Remillard | | 5,696,906 A | 12/1997 | Peters et al. |
| 5,404,505 A | 4/1995 | Levinson | | 5,703,965 A | 12/1997 | Fu et al. |
| 5,408,258 A | 4/1995 | Kolessar | | 5,715,315 A | 2/1998 | Handelman |
| 5,410,326 A | 4/1995 | Goldstein | | 5,721,956 A | 2/1998 | Martin et al. |
| 5,410,344 A | 4/1995 | Graves ........................ 725/46 | | 5,724,091 A | 3/1998 | Freeman et al. |
| 5,412,416 A | 5/1995 | Nemirofsky | | 5,727,065 A | 3/1998 | Dillon |
| 5,412,720 A | 5/1995 | Hoarty | | 5,729,471 A | 3/1998 | Jain et al. |
| 5,414,426 A | 5/1995 | O'Donnell et al. | | 5,737,533 A | 4/1998 | de Hond |
| 5,416,508 A | 5/1995 | Sakuma et al. | | 5,737,725 A | 4/1998 | Case |
| 5,421,031 A | 5/1995 | De Bey | | 5,742,680 A | 4/1998 | Wilson |
| 5,424,770 A | 6/1995 | Schmelzer et al. | | 5,745,556 A | 4/1998 | Ronen |
| 5,426,699 A | 6/1995 | Wunderlich et al. | | 5,745,710 A | 4/1998 | Clanton, III et al. |
| 5,432,542 A | 7/1995 | Thibadeau et al. | | 5,754,938 A | 5/1998 | Herz et al. |
| 5,432,561 A | 7/1995 | Strubbe | | 5,758,257 A | 5/1998 | Herz ......................... 725/116 |
| 5,438,372 A | 8/1995 | Tsumori et al. | | 5,774,122 A | 6/1998 | Kojima et al. |
| 5,440,632 A | 8/1995 | Bacon et al. | | 5,774,170 A | 6/1998 | Hite et al. |
| 5,442,452 A | 8/1995 | Ryu | | 5,787,171 A | 7/1998 | Kubota et al. |
| 5,442,626 A | 8/1995 | Wei | | 5,793,872 A | 8/1998 | Hirayama et al. |
| 5,446,490 A | 8/1995 | Blahut et al. | | 5,799,157 A | 8/1998 | Escallon |
| 5,446,891 A * | 8/1995 | Kaplan et al. .................. 707/2 | | 5,805,204 A | 9/1998 | Thompson et al. |
| 5,446,919 A | 8/1995 | Wilkins | | 5,805,677 A | 9/1998 | Ferry et al. |
| 5,448,313 A | 9/1995 | Kim et al. | | 5,809,204 A | 9/1998 | Young et al. |
| 5,461,667 A | 10/1995 | Remillard | | 5,815,671 A | 9/1998 | Morrison |
| 5,467,402 A | 11/1995 | Okuyama et al. | | 5,818,441 A | 10/1998 | Throckmorton et al. |
| 5,469,206 A | 11/1995 | Strubbe et al. ................ 725/60 | | 5,818,511 A | 10/1998 | Farry et al. |
| 5,473,362 A | 12/1995 | Fitzgerald et al. | | 5,819,301 A | 10/1998 | Rowe et al. |
| 5,477,262 A | 12/1995 | Banker et al. .................. 725/38 | | 5,833,468 A | 11/1998 | Guy et al. |
| 5,477,263 A | 12/1995 | O'Callaghan et al. | | 5,835,087 A | 11/1998 | Herz et al. |
| 5,479,266 A | 12/1995 | Young et al. | | 5,838,368 A | 11/1998 | Masunaga et al. |
| 5,479,268 A | 12/1995 | Young et al. | | 5,844,600 A | 12/1998 | Kerr |
| 5,479,508 A | 12/1995 | Bestler et al. | | 5,844,890 A | 12/1998 | Delp et al. |
| 5,481,294 A | 1/1996 | Thomas et al. | | 5,848,396 A | 12/1998 | Gerace |
| 5,481,296 A | 1/1996 | Cragun et al. | | 5,850,218 A | 12/1998 | LaJoie et al. |
| 5,481,542 A | 1/1996 | Logston et al. | | 5,880,769 A | 3/1999 | Nemirofsky et al. |
| 5,483,277 A | 1/1996 | Granger | | 5,890,122 A | 3/1999 | Van Kleeck et al. |
| 5,483,278 A | 1/1996 | Strubbe et al. | | 5,917,537 A | 6/1999 | Lightfoot et al. |
| 5,486,278 A | 1/1996 | Manganiello et al. ......... 725/61 | | 5,917,915 A | 6/1999 | Hirose |

| | | | | | | |
|---|---|---|---|---|---|---|
| 5,929,849 | A | 7/1999 | Kikinis | GB | 2 177 873 A | 1/1987 |
| 5,929,932 | A | 7/1999 | Otsuki et al. | GB | 2255214 A | 10/1992 |
| 5,953,485 | A | 9/1999 | Abecassis | GB | 2259830 | 3/1993 |
| 5,957,695 | A | 9/1999 | Redford et al. | GB | 2269302 | 2/1994 |
| 5,986,690 | A | 11/1999 | Hendricks | GB | 2344009 | 5/2000 |
| 5,990,927 | A | 11/1999 | Hendricks et al. ............ 725/132 | IN | 762/CAL/93 | 12/1993 |
| 6,016,141 | A | 1/2000 | Knudson et al. | JP | 61-202587 | 3/1985 |
| 6,025,837 | A | 2/2000 | Matthews, III et al. | JP | 60143086 | 7/1985 |
| 6,029,045 | A | 2/2000 | Picco et al. | JP | 62-24777 | 2/1987 |
| 6,034,680 | A | 3/2000 | Kessenich et al. | JP | 62-140134 | 6/1987 |
| 6,052,717 | A | 4/2000 | Reynolds et al. | JP | 01-020454 | 1/1989 |
| 6,099,320 | A | 8/2000 | Papadopoulos | JP | 1-130683 | 5/1989 |
| 6,101,324 | A | 8/2000 | Connell et al. | JP | 3029456 | 2/1991 |
| 6,119,154 | A | 9/2000 | Weaver et al. | JP | 3-114375 | 5/1991 |
| 6,138,147 | A | 10/2000 | Weaver et al. | JP | 4233886 | 6/1991 |
| 6,154,633 | A | 11/2000 | Landgraf et al. | JP | 7-235909 | 9/1995 |
| 6,163,316 | A | 12/2000 | Killian | JP | 6-134489 | 1/1996 |
| 6,166,778 | A | 12/2000 | Yamamoto et al. | JP | 408051614 | 2/1996 |
| 6,177,931 | B1 | 1/2001 | Alexander et al. | JP | 408228328 | 9/1996 |
| 6,182,050 | B1 | 1/2001 | Ballard | JP | 09227193 | 8/1997 |
| 6,201,536 | B1 | 3/2001 | Hendricks et al. | JP | 9-284571 | 10/1997 |
| 6,204,885 | B1 | 3/2001 | Kwoh | JP | 410285568 | 10/1998 |
| 6,252,690 | B1 | 6/2001 | Laine | TW | 238461 | 4/1992 |
| 6,288,753 | B1 | 9/2001 | DeNicola et al. | TW | 234223 | 11/1994 |
| 6,331,877 | B1 | 12/2001 | Bennington et al. | TW | 235358 | 12/1994 |
| 6,463,585 | B1 | 10/2002 | Hendricks et al. | TW | 235359 | 12/1994 |
| 6,486,892 | B1 | 11/2002 | Stern | TW | 236065 | 12/1994 |
| 6,539,548 | B1 | 3/2003 | Hendricks et al. | TW | 236744 | 12/1994 |
| 2001/0013123 | A1 | 8/2001 | Freeman et al. | WO | WO 80/00209 | 2/1980 |
| 2001/0027493 | A1 | 10/2001 | Wallace | WO | WO 88/01463 | 2/1988 |
| 2002/0087980 | A1 | 7/2002 | Eldering et al. | WO | WO 89/12370 | 12/1989 |

FOREIGN PATENT DOCUMENTS

| | | | | | |
|---|---|---|---|---|---|
| DE | 4214184 | 11/1992 | WO | WO 91/00670 | 1/1991 |
| DE | 19755742 | 7/1999 | WO | WO 91/03112 | 3/1991 |
| EP | 149536 | 1/1984 | WO | WO 92/04801 | 3/1992 |
| EP | 103438 | 3/1984 | WO | WO 92/10040 | 6/1992 |
| EP | 145063 | 6/1985 | WO | WO 92/11713 | 7/1992 |
| EP | 158548 | 10/1985 | WO | WO 92/17027 | 10/1992 |
| EP | 0158767 | 10/1985 | WO | WO 92/21206 | 11/1992 |
| EP | 167237 | 1/1986 | WO | WO 93/22877 | 11/1993 |
| EP | 0277014 | 8/1988 | WO | WO 94/07327 | 3/1994 |
| EP | 0 281 293 | 9/1988 | WO | WO 94/13107 | 6/1994 |
| EP | 0299830 | 1/1989 | WO | WO 94/14282 | 6/1994 |
| EP | 0314572 | 5/1989 | WO | WO 94/16527 | 7/1994 |
| EP | 0 328 440 | 8/1989 | WO | WO 95/15658 | 6/1995 |
| EP | 0340643 | 11/1989 | WO | WO 96/08109 | 3/1996 |
| EP | 0377334 | 7/1990 | WO | WO 96/17306 | 6/1996 |
| EP | 0390041 | 10/1990 | WO | WO 96/25006 | 8/1996 |
| EP | 0396186 | 10/1990 | WO | WO 96/41473 | 12/1996 |
| EP | 399200 | 11/1990 | WO | WO 97/12486 | 4/1997 |
| EP | 0 402 809 | 12/1990 | WO | WO 97/13368 | 4/1997 |
| EP | 0420123 | 4/1991 | WO | WO 97/20274 | 6/1997 |
| EP | 0 424 648 | 5/1991 | WO | WO 97/22110 | 6/1997 |
| EP | 450841 | 10/1991 | WO | WO 97/22112 | 6/1997 |
| EP | 0 486 989 | 11/1991 | WO | WO 97/41688 | 11/1997 |
| EP | 0 488 379 | 6/1992 | WO | WO 98/02836 | 1/1998 |
| EP | 0 506 435 | 9/1992 | WO | WO 98/10997 | 1/1998 |
| EP | 0 513 553 | 11/1992 | WO | WO 98/08344 | 2/1998 |
| EP | 0 570 785 | 11/1993 | WO | WO 98/18086 | 4/1998 |
| EP | 0586954 | 3/1994 | WO | WO 98/28906 | 7/1998 |
| EP | 0620689 | 10/1994 | WO | WO 98/48566 | 10/1998 |
| EP | 0646856 | 4/1995 | WO | WO 98/53581 | 11/1998 |
| EP | 0702491 | 3/1996 | WO | WO 99/18701 | 4/1999 |
| EP | 0734157 | 9/1996 | WO | WO 99/26415 | 5/1999 |
| EP | 0821522 | 1/1998 | WO | WO 99/45491 | 9/1999 |
| EP | 0838798 | 3/1998 | WO | WO 99/52285 | 10/1999 |
| EP | 0835915 | 4/1998 | WO | WO 99/66719 | 12/1999 |
| EP | 0845904 | 6/1998 | WO | WO 01/01689 | 1/2001 |
| EP | 0892388 | 1/1999 | WO | WO 01/11874 | 2/2001 |
| EP | 0924629 | 6/1999 | | | |
| EP | 0924687 | 6/1999 | | | |

WO    WO 01/18665    3/2001

OTHER PUBLICATIONS

Olshansky et al., Subscriber Distribution Networks Using Compressed Digital Video, Nov. 1992.
Dinaro et al., Markets and Products Overview, 1991.
Advertisement, Hong Kong Enterprise, Nov. 1988.
Advertisement, Great Presentations, 1987.
Advertisement, Consumer Dist, Fall/Winter 1992.
Moloney, Digital Compression in Todays . . . , Jun. 6, 1993.
Bestler, Flexible Data Structures . . . , Jun. 6, 1993.
Gelman et al., A Store-and-Forward . . . , Jun. 21, 1991.
Hewlett Packard Co., HP-41C Operating Manual, Dec., 1982.
Sorce, et al., Human Factors in Telecommunications, Sep. 10-14, 1990.
Herron, T.L., Teaching With The Internet, vol. 1, No. 3 1998.
Azuma, J., Creating Educational Web Sites, Mar. 1999.
Goldberg, M.W., et al., World Wide Web Course Tool . . . , May 1996.
Waite Group Press, An Interactive Lesson . . . , "Online! 1996.
Speech Technology, Electronic Dictionary . . . , Apr. 1, 1989.
SIGCSE/SIGCUE Conf., Enhancing Teaching . . . , Jun. 1-2, 1996.
Kubota, et al., Terrestrial Data . . . , Aug. 1, 1997.
Funkschau, Fur Geschlossene . . . , Aug. 25, 1989.
Gelman, et al., An Architecture for Interactive Applications, May 23, 1993.
Koenen, et al., MPEG-4: Context and Objectives, Signal Processing: Image Communication 9, 295-304 (1997).
Benson et al., Television Engineering Handbook Featuring HDTV Systems, © 1992, 1986.
Pereira et al., EBU Technical Review "MPEG-4—opening new frontiers to broadcast services", Mar. 21, 1999.
Media Daily, V2, No. 72, Prodigy Offers Total Television Online Guide, Apr. 12, 1994.
Sheldon, Thomas, Windows 3 Made Easy (ISBN: 0-07881-5371, OsborneMcGraw-Hill), Jan. 1989.
Dan et al., Multimedia Systems, A Dynamic Policy of Segment Replication for Load-Balancing in Video-On-Demand Servers, Jul. 1995.
Ikezaki, et al., A New Display Pointing Method . . . , IEEE, Transaction On Comsumer Electronics, Jun. 8, 1990.
Kruger, The Digital Television Identification System, *Journal ntz*, vol. 35, 1982.
Eitz, et al., The Next Stage, *Funkschau*, Mar. 1988.
Hedger, John, Broadcast Software: Experience with ORACLE, © 1980 by Online Conferences, Inc.
SuperVGA Display Products User's Guide, $1^{st}$ Edition, © Nokia Data AB 1991.
Lieferschein Nr. 20139924, Product Description, Oct. 28, 1991.
*Applied Cryptography, Protocols, Algorithms, and Source Code in C*, (pp. 34-44) Schneier, Bruce, Pub. 199 by John Wiley & Sons, 1996.

* cited by examiner

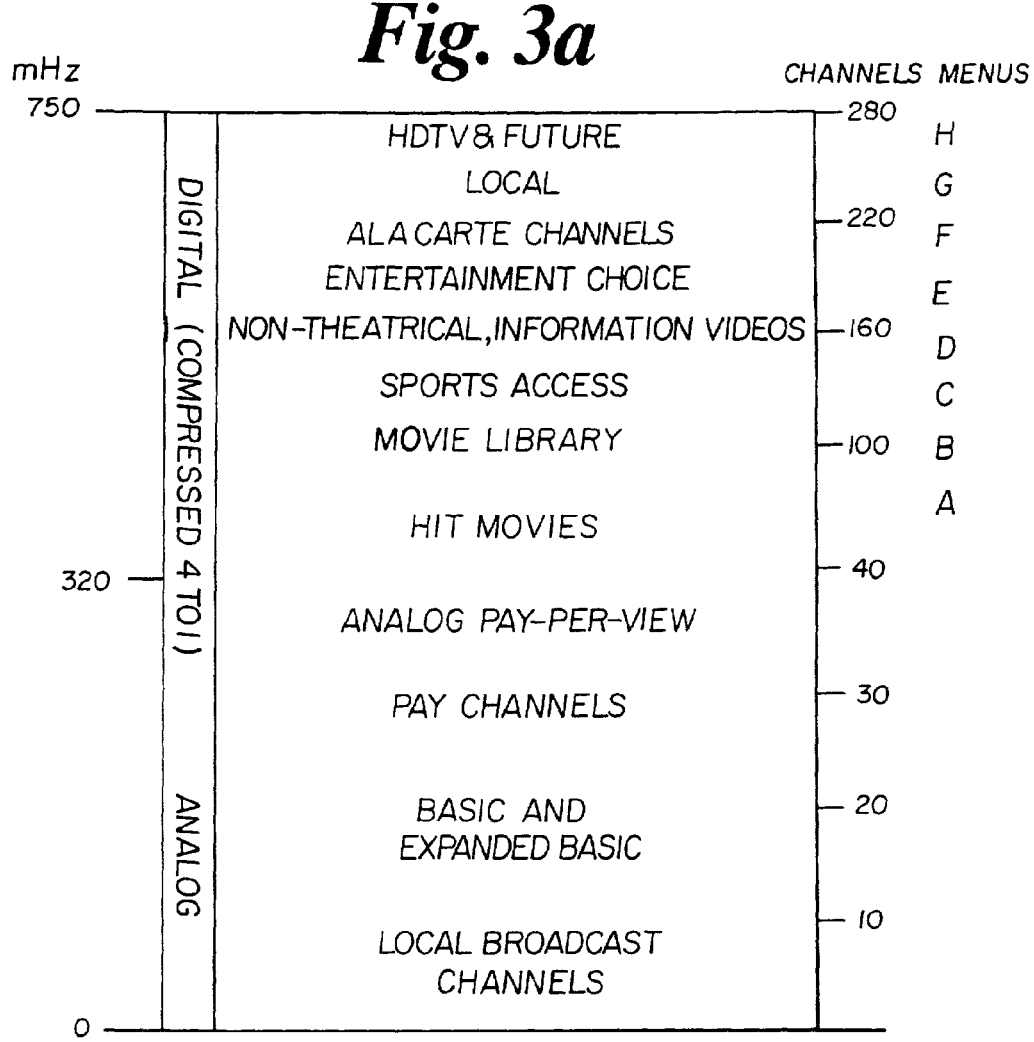

Fig. 3c

SATELLITE MOVIE OPTIONS

| VCTV COMBO | COMP. RATIO | AVAILABLE MENUS (1,283) | PRIORITY ONE MENUS | PRIORITY ONE PLUS TWO MENUS |
|---|---|---|---|---|
| 1 | 8:1 | HIT MOVIES 8 MOVIE SELECTIONS WITH START TIMES EVERY 15 MINUTES | HIT MOVIES 6 MOVIE SELECTIONS WITH START TIMES EVERY 30 MINUTES | HIT MOVIES 6 MOVIE SELECTIONS WITH START TIMES EVERY 15 MINUTES |
| 2 | 8:1 | | | |
| 3 | 8:1 | | | |
| 4 | 8:1 | | | |
| 5 | 8:1 | | | |
| 6 | 8:1 | | | |
| 7 | 8:1 | | | |
| 8 | 8:1 | | | |
| 9 | 4:1 | SPORTS 8 SELECTIONS | SPORTS 2 SELECTIONS | SPORTS 4 SELECTIONS |
| 10 | 4:1 | | | |
| 11 | 8:1 | CHILDRENS 8 SELECTIONS | CHILDRENS 2 SELECTIONS | CHILDRENS 4 SELECTIONS |
| 12 | 8:1 | DOCS/NEWS 8 SELECTIONS | DOCS/NEWS 2 SELECTIONS | DOCS/NEWS 4 SELECTIONS |
| 13 | 8:1 | ENTERTAINMENT 8 SELECTIONS | ENTERTAINMENT 4 SELECTIONS | ENTERTAINMENT 6 SELECTIONS |
| 14 | 8:1 | SPECIAL-INTEREST CHANNELS 16 SELECTIONS | SPECIAL-INTEREST CHANNELS 4 SELECTIONS | SPECIAL-INTEREST CHANNELS 8 SELECTIONS |
| 15 | 8:1 | | | |
| 16 | 8:1 | PROMOS (1/6 SCREEN) 48 | PROMOS (1/6 SCREEN) 6 | PROMOS (1/6 SCREEN) 48 |
| 17 | 8:1 or max | DATA STREAM | DATA STREAM | DATA STREAM |
| 18 | 8:1 or max | MUSIC 32 DIGITED STATIONS | MUSIC 4 DIGITED STATIONS | MUSIC 32 DIGITED STATIONS |

236     230     233

PROGRAM CONTROL INFORMATION
Chronologically by Channel

12:00 PM

| *Program name | *Program length | *Menu code | *Description | *Video |
|---|---|---|---|---|
| 1 Cheers | .5 | E24 | C | N |
| 2 Terminator | 2.0 | A33 | Tx | S |
| 3 PrimeTime | 1.0 | D14 | N | N |
| 4 Football Special | .5 | B24 | S | N |
| • | | | | |
| • | | | | |
| • | | | | |
| • | | | | |

12:30 PM

| *Program name | *Program length | *Menu code | *Description | *Video |
|---|---|---|---|---|
| 1 Simpsons | .5 | E14 & C13 | A | S |
| 4 FootballGame | 3.0 | B13 | S | N |
| • | | | | |
| • | | | | |
| • | | | | |

1:00 PM

| *Program name | *Program length | *Menu code | *Description | *Video |
|---|---|---|---|---|
| 1 Jaws | 2.0 | E16 | Tx | S |
| 3 Bugs Buny | 1.0 | C25 | A | N |
| • | | | | |
| • | | | | |
| • | | | | |

Thursday, October 26, 1994             7:59 PM

TV Guide

**X*PRESS NETWORK SCHEDULES**

Press GO On Any Network for Schedule Info

Next 7 Days

| | | | | | |
|---|---|---|---|---|---|
| 2 | WMAR/NBC | 13 | WJZ/ABC | 27 | LEARNING |
| 3 | LOCAL WEATHER | 14 | HEADLINE | 28 | DISNEY |
| 4 | WRC/NBC | 15 | C-SPAN | 29 | HBO |
| 5 | WTTG/FOX | 16 | C-SPAN II | 30 | CINEMAX |
| 6 | CNN | 17 | WWOR | 31 | SHOWTIME |
| 7 | WJLA/ABC | 18 | ESPN | 32 | LOCAL GOVT. |
| 8 | DISCOVERY | 19 | NICKELODEON | 33 | A & E |
| 9 | WUSA/CBS | 20 | WDCA/IND | 34 | HITS |
| 10 | TNT | 21 | FAMILY | 35 | WERU/IND. |
| 11 | WBAL/CBS | 22 | WMPT/PBS | 36 | WTBS |
| 12 | USA | 23 | LIFETIME | 37 | NASHVILLE |
| | | 24 | INTERFAITH | 38 | VH-1 |
| | | 25 | BET | 39 | MTV |
| | | 26 | WETA/PBS | | |

YOUR CHOICE TV

Press GO Here to Return to Menu G
Press GO Here to Return to Cable TV

Thursday, October 26, 1994  8:00 PM

INTERACTIVE SERVICES
LEVEL A
There are three levels of interactivity possible with your cable television digital converter.

Level a is live interactivity with specially encoded cable and broadcast programs... available whenever you see this symbol...

This service offers enlightening information about programs, fun quizzes for the famiy, geographical facts, contests, and much more!

YOUR CHOICE   Press GO Here to order Level A interactivity for just $4.95 per month and enjyh interactivity immediately
Press GO Here for More Information
Press GO Here to Return to Cable TV

Thursday, October 26, 1994                                                      8:00 PM

INTERACTIVE SERVICES
LEVEL B

This level of interactivity allows you to access a wide range of services including:

| | |
|---|---|
| PRODIGY | ENCYCLOPEDIA |
| AMERICA ON LINE | ATLAS |
| X*PRESS | SHOPPING CENTER |
| AIRLINE RESERVATIONS | ASSOCIATED PRESS |
| HOTEL RESERVATIONS | U.S. YELLOW PAGES |

To take advantage of these services, an INTERACTIVE MODEM is required. This is available from your cable system. For installation and price information, contact your cable system today.

YOUR CHOICE

Press GO Here for More Information
Press GO Here to Return to Cable TV

INTERACTIVE PROGRAMMING VENTURES TM

Press GO on any Interactive Menu

QUIZ      Press GO for:     Another Question
FAST FACTS                   No More Questions
MORE INFO                    More Info on Earth's Rotation
WHERE IN THE WORLD
PRODUCTS The correct answer is "counterclockwise." In the Southern Hemisphere, huricane winds circulate clockwise due to the effects of the earth's rotation.

Your Answer:
Clockwise
IS INCORRECT - SORRY!

YOUR CHOICE

Press GO Here to Resume Show Without Interactivity
Press GO Here to Return to Cable TV

Thursday, October 26, 1994                                    8:04 PM

AIRLINE INFORMATION AND RESERVATIONS (Continued)

Press GO on the ARIZONA airport you will DEPART:

| PHOENIX | FLAGSTAFF | TUCSON |
| PRESCOTT | YUMA | Minor Airport List |

Press GO on the DC airport you will ARRIVE:

NATIONAL          DULLES          BWI
Check Flights to all Three D.C. Airports

Press GO on your preferred departure time:

Morning    Mid-day    Late aft.    eve/night    anyhtime

Press GO on your preferred arrival time:

Morning    Mid-day    Late aft.    eve/night    anyhtime

YOUR CHOICE    Press GO Here to Continue
Press GO Here to Erase Above and Repeat
Press GO Here to Return to Cable TV

Thursday, October 26, 1994                                      8:04 PM

AIRLINE INFORMATION AND RESERVATIONS (Continued)

Here are your airline flight options for a morning departure from Phoenix to Dulles.

Press GO on Any Flight to Check Availability and Fare

| Depart Time | Arrive Time | Airline | Flight No. | Stops | Connecting Through |
|---|---|---|---|---|---|
| 6:15 AM | 1:30 PM | AMERICAN | 32 | 0 | |
| 7:30 AM | 2:45 PM | AMERICAN | 212 | 0 | |
| 8:00 AM | 3:07 PM | DELTA | 49 | 0 | |
| 10:30 AM | 7:15 PM | US AIR | 285 | 1 | Chigago |
| 11:25 AM | 6:10 PM | UNITED | 10 | 0 | |
| 11:45 AM | 8:40 PM | UNITED | 77 | 1 | Dallas |

YOUR CHOICE   Press GO Here to Return to Airline Main Menu
Press GO Here to Return to Menu 1
Press GO Here to Return to Cable TV

Thursday, October 26, 1994             8:06 PM

AIRLINE INFORMATION
AND RESERVATIONS (Continued)

You have selected SEATS: 23A, 23B
DELTA FLIGHT #49 from Phoenix to Wash.Dulles

Date: 11/25/94 Departs 8:00 AM and arrives 3:07PM

| One Way Fare: | $295.00 | 23A | Round Trip Fare: | $419.00 | 23A |
|---|---|---|---|---|---|
| | $295.00 | 23B | Round Trip Fare: | $419.00 | 23B |
| Total: | $590.00 | | Total: | $838.00 | |

Press GO Here to Select   ONE WAY   or   ROUND TRIP

TO COINFIRM YOUR RESERVATION:

YOUR CHOICE    Press GO Here to Charge to Your Credit Card
Press GO Here and an Agent Will Call You
Press GO Here to Exit Without Reservation

Thursday, October 26, 1994          8:08 PM

DMX Demonstration

Here are the menu options you'll enjoy:

Press GO On the station you want

| Top 5 | Hard Rock | Easy Listening | New Age | Country Top 40 | Rythm and Blues | Classical |
|---|---|---|---|---|---|---|
| Top 10 | Heavy Metal | Instru-mentals | Favorite Light Rock | New Country | Blues Legends | Classical Piano |
| Top 40 | Rock Classics | Easy List. Favorites | Beatles Only | Country Classics | Soul | Classical Strings |
| Rock | Rap | Jazz | Rock Legends | Bluegrass | Soul Classics | Classical Guitar |
| '30s | '40s | '50s | '60s | '70s | '80s | '90s |
| Waltz | Latin | Disco | Polka | Reggae | Dance Fever | Teen Dance |

You are listening to:
MAGGIE MAE by Rod Stewart

More Information on Current Artist/Song        Screen ON/OFF
All this for just $4.95 per month. Less than 1/2 the cost of one CD! ORDER NOW.

YOUR CHOICE TV

Press GO Here to Order DMX
Press GO Here to Return to Cable TV

Thursday, October 26, 1994      8:08 PM

MUSIC from DMX
Digital Music Express

When you order DMX you will instantly be able to access all the different stations through Menu 1. To enhance listening enjoyment, you might want to connect your stereo speakers to your TV set. If you listen to music in a different room or if you want to watch TV in one room while another family member listens to DMX in a separate room, a TUNER ATTACHMENT is available from your cable system. In any event, order DMX today for only $4.95 per month and enjoy commercial-free digital radio instantly.

YOUR CHOICE TV      Press GO Here for a Free Demo of DXM, Digital Music Express

| | | | | | | |
|---|---|---|---|---|---|---|
| Top 5 | Hard Rock | Easy Listening | New Age | Country Top 40 | Rythm and Blues | Classical |
| Top 10 | Heavy Metal | Instrumentals | Favorite Light Rock | New Country | Blues Legends | Classical Piano |
| Top 40 | Rock Classics | Easy List. Favorites | Beatles Only | Country Classics | Soul | Classical Strings |
| Rock | Rap | Jazz | Rock Legends | Bluegrass | Soul Classics | Classical Guitar |
| '30s | '40s | '50s | '60s | '70s | '80s | '90s |
| Waltz | Latin | Disco | Polka | Reggae | Dance Fever | Teen Dance |

Thursday, October 26, 1994      8:09 PM

DMX Demonstration

Here are the menu options you'll enjoy:

Press GO On the station you want

You are listening to:
PIANO CONCERTO by Rachmaninoff No. 3 op, 30 1909

More Information on Current Artist/Song      Screen ON/OFF
All this for just $4.95 per month. Less than 1/2 the cost of one CD!      ORDER NOW.

YOUR CHOICE TV

Press GO Here to Order DMX
Press GO Here to Return to Cable TV

Thursday, February 26, 1994                    7:44 PM

*Fig. 21*

Thursday, February 26, 1994                    7:45 PM

SET TOP TERMINAL FOR ORGANIZING PROGRAM OPTIONS AVAILABLE IN TELEVISION DELIVERY SYSTEM

REFERENCE TO RELATED APPLICATION

The present application is a continuation of U.S. patent application Ser. No. 07/991,074, filed Dec. 9, 1992 now abandoned, which is incorporated herein by reference as if fully set forth.

BACKGROUND OF THE INVENTION

The invention relates to television entertainment systems for providing television programming to consumer homes. More particularly, the invention relates to cable television packaging, delivery and presentation systems which provide consumers with many television programming options.

Advances in television entertainment have been primarily driven by breakthroughs in technology. In 1939, advances on Vladmir Zworykin's picture tube provided the stimulus for NBC to begin its first regular broadcasts. In 1975, advances in satellite technology provided consumers with increased programming to homes.

Many of these technology breakthroughs have produced inconvenient systems for consumers. One example is the ubiquitous three remote control home, having a separate and unique remote control for the TV, cable box and VCR. More recently, technology has provided cable users in certain parts of the country with 100 channels of programming. This increased program capacity is beyond the ability of many consumers to use effectively. No method of managing the program choices has been provided to consumers.

Consumers are demanding that future advances in television entertainment, particularly programs and program choices, be presented to the consumer in a user friendly manner. Consumer preferences, instead of technological breakthroughs, will drive the television entertainment market for at least the next 20 years. As computer vendors have experienced a switch from marketing new technology in computer hardware to marketing better useability, interfaces and service, the television entertainment industry will also experience a switch from new technology driving the market to consumer useability driving the market.

Consumers want products incorporating new technology that are useful, and will no longer purchase new technology for the sake of novelty or status. Technological advances in sophisticated hardware are beginning to surpass the capability of the average consumer to use the new technology. Careful engineering must be done to make entertainment products incorporating new technology useful and desired by consumers.

In order for new television entertainment products to be successful, the products must satisfy consumer demands. TV consumers wish to go from limited viewing choices to a variety of choices, from no control of programming to complete control. Consumers wish to advance from cumbersome and inconvenient television to easy and convenient television and keep costs down. Consumers do not wish to pay for one hundred channels when due to lack of programming information, they seldom, if ever, watch programming on many of these channels.

The concepts of interactive television, high definition television and 300 channel cable systems in consumer homes will not sell if they are not packaged, delivered and presented in a useable fashion to consumers. The problem is that TV programming is not being managed, packaged, delivered, and presented to consumers in a user friendly manner.

Consumers are already being bombarded with programming options, numerous "free" cable channels, subscription cable channels and pay-per-view choices. Any further increase in TV entertainment choices, without a user friendly presentation and approach, will likely bewilder viewers with a mind-numbing array of choices.

The TV industry has traditionally marketed and sold its programs to consumers in bulk, such as continuous feed broadcast and long-term subscriptions to movie channels. The TV industry is unable to sell its programming in large quantities on a unit per unit basis, such as the ordering of one program. Consumers prefer a unit sales approach because it keeps costs down and allows the consumer to be more selective in their viewing.

Additionally, viewership fragmentation, which has already begun, will increase. Programming not presented in a user friendly manner will suffer with a decrease in viewership and revenue.

What is needed is an economical system which can gather television programming in a variety of formats, package the programs, deliver the programs, and present the programs through a user friendly interface which allows the consumer to easily select from among the many program choices. The system must be capable of handling hundreds of programs in different formats, be expandable for future types of programming, include a method for billing consumers, and be inexpensive. The present invention is addressed to fulfill these needs.

SUMMARY OF INVENTION

A set top terminal is disclosed for creating a favorites menu of television programs available for viewing, based on a user's preferences. The terminal receives a television signal from an operations center, extracts individual programs from the signal, and sends one or more of the individual programs to a television for display, based on a selection by the user. The terminal generates an interactive electronic program guide for the selection of programs. The favorites menu of the guide narrows the list of available programs to those most likely of interest to the user. The terminal receives and stores user information, including general demographic information and viewing preference information. The viewing preference information may be received directly from the user, for example by querying the user. Alternatively, it may be learned by tracking the user's viewing habits. The viewing preference information may include, for example, frequently-watched channels, frequently-watched programs, or information related to program content. The user information may be stored in a user profile. Using the user information, the terminal identifies those programs available for viewing that most closely match the user information. A program menu including the identified programs is then generated for display on a television.

The expanded cable television program delivery system dramatically increases programming capacity using compressed transmission of television program signals. Developments in digital bandwidth compression technology now allow much greater throughput of television program signals over existing or slightly modified transmission media. The program delivery system provides subscribers with a user friendly interface to operate and exploit a six-fold or more increase in current program delivery capability.

Subscribers will be able to access the expanded program package and view selected programs through a menu-driven access scheme that allows each subscriber to select individual programs by sequencing a series of menus. The menus are sequenced by the subscriber using simple alpha-numeric and iconic character access, allowing the subscriber to access desired programs by simply pressing a single button rather than subscriber to access desired programs by simply pressing a single button rather than recalling from memory and pressing the actual two or more digit numeric number assigned to a selection. Thus, with the press of single buttons, the subscriber can advance from one menu to the next. In this fashion, the subscriber can sequence the menus and select a program from any given menu. The programs are grouped by category so that similar program offerings are found on the same menu.

System Description

1. Major System Components

In its most basic form, the system uses a program delivery system in conjunction with a conventional cable television system. The program delivery system contemplates (i) at least one operations center, where program packaging and control information are received and then assembled in the fowl of digital data, and (ii) a digital compression system, where the digital data is compressed, combined/multiplexed, encoded, and mapped into digital signals for satellite transmission (i.e., modulated, upconverted and amplified). The program delivery system transports the digital signals to the concatenated cable television system where the signals are received at the cable headend. Within the cable headend, the received signals may be decoded, demultiplexed, managed by a local central distribution and switching mechanism and then transmitted to subscriber homes via the cable system.

The delivery system employs an in-home decompression capability employing a decompressor housed within a set-top terminal in each subscriber's home. The decompressor remains transparent from the subscriber's point of view and allows any of the compressed signals to be demultiplexed and individually extracted from the composite data stream and then individually decompressed upon selection of a corresponding program by the subscriber. Within the set-top terminal, video signals are converted into analog signals. Control signals are extracted, decompressed and either executed immediately or placed in local storage in a ROM. The program control signals correspond to specific television programs with menu program options that each subscriber may access through a subscriber interface. The subscriber interface is a combined alpha, numeric and iconic remote control device which provides direct or menu-driven program access.

An array of menu templates are generated by a either a computer program within the set-top terminal or by the cable headend. The menu templates are generated using the program control information signals received from the Operations Center. A computer program within the set top terminal generates the on-screen menu displays and allocates a specific menu program option for each program signal. A combined alpha and numeric remote control provides the user interface to each program signal, allowing selection of a specific menu option which corresponds to a particular program signal.

2. Operations Center and Digital Compression System

The Operations Center performs two primary services, packaging television programs and generating the program control signal. At the Operations Center television programs are accumulated from various sources in both analog and digital form. The programs are then packaged into groups and categories which allow for easy menu access to programs and provides optimal marketing of programs to subscribers. The packaging process also accounts for any groupings by transponder which are necessary. After a packaging scheme is developed, the program control information which, among other things, describes the packaging, is generated by a computer and delivered with the packaged programs to the head end and/or subscriber. The system also accommodates local cable and television companies with programming time for local advertising and/or programming time availability.

The delivery system employs digital compression techniques to increase existing satellite transponder capacity by at least a 6:1 ratio, resulting in a six-fold increase in program delivery capability. The input signals are compressed, combined and encoded prior to satellite transmission, and subsequently transponded to various receive sites. There are a number of compression algorithms that presently exist which can achieve the resultant increase in capacity and improved signal quality desired for the invention.

3. System Control

Network management, control and monitoring of all compressors and decompressors in the network, is performed by a network controller at the cable headend, where program selection activity, and account and billing information is monitored. In the preferred embodiment, the network controller monitors, among other things, automatic poll-back responses from the set-top terminals remotely located at each subscribers' home. The polling and automatic report-back cycle occurs frequently enough to allow the network controller to maintain accurate account and billing information as well as monitor authorized channel access. In the simplest embodiment, information to be sent to the network controller will be stored in ROM within each subscriber's set-top terminal and retrieved only upon polling by the network controller.

Control information from the set top terminal will be sent to the network controller at the cable headend and not directly to the operations center. The digital compression and delivery system of the preferred embodiment provides a one-way path from the Operations Center to the cable headend. Thus, program monitoring and selection control will take place only at the cable headend by the local cable company and its decentralized network controllers (i.e., decentralized relative to the Operations Center which is central to the program delivery system). The local cable company will in turn be in communication with the operations center or a regional control center which accumulates return data from the set-top terminal for statistical or billing purposes. Alternatively, the operations center, and statistical and billing sites could be collocated.

4. Menu-Driven Program Selection

At a given receive site, any of the compressed signals may be demultiplexed or individually extracted from the data stream and passed from the cable headend over the cable system to the subscriber's set-top terminal. Within the set-top terminal, the individual compressed signals are decompressed and either placed in local storage (from which the menu template may be created), executed immediately, or sent directly to the screen. A combined alpha, numeric and iconic remote control device provides the subscriber interface to the system.

Through this interface, the subscriber may select desired programming through the systems menu-driven scheme or by directly accessing a specific channel by its actual number. The menu-driven scheme provides the subscriber with one-step access to all major menus, ranging from hit movies to specialty programs. From any of the major menus, the subscriber can in turn access submenus and minor menus by alpha character access. By using menu-driven, iconic or alpha-character access, the subscriber can access desired programs by simply pressing a single button rather than recalling from memory and pressing the actual channel number to make a selection. The subscriber can access regular broadcast and basic cable television stations by using either the numeric keys on the remote control and pressing the corresponding channel number, or one of the menu icon selection options.

DESCRIPTION OF THE DRAWINGS

FIG. 3a is a diagram of the bandwidth allocation for a 750 mHz system.

FIG. 3b is a diagram/chart of the compressed channel allocation for the system.

FIG. 3c is a diagram showing how three cable television systems with different bandwidths may use the program delivery system of the present invention simultaneously.

FIG. 4b is a block diagram of the computer assisted packaging shown in FIG. 4a.

FIG. 6 is a chart of the program control information carried by the program control information signal.

FIG. 11b is a drawing of the complete remote control derived from FIG. 11a.

FIG. 12b is another drawing of the preferred remote control unit shown in FIG. 12a.

FIG. 14b is a drawing of the basic menus used in the present invention, in addition to FIG. 14a.

FIGS. 16a-16e are drawings of menus related to program guide services.

FIGS. 17a-17c are drawings of interactive television promotional menus, for Levels A-C.

FIGS. 17d-17j are drawings of submenus for interactive television services, Level A.

FIGS. 18a-18l are drawings of interactive services, Level B, particularly related to on-screen airline reservations.

FIGS. 19a-19e are drawings of menus for digital audio services.

Figure 20:
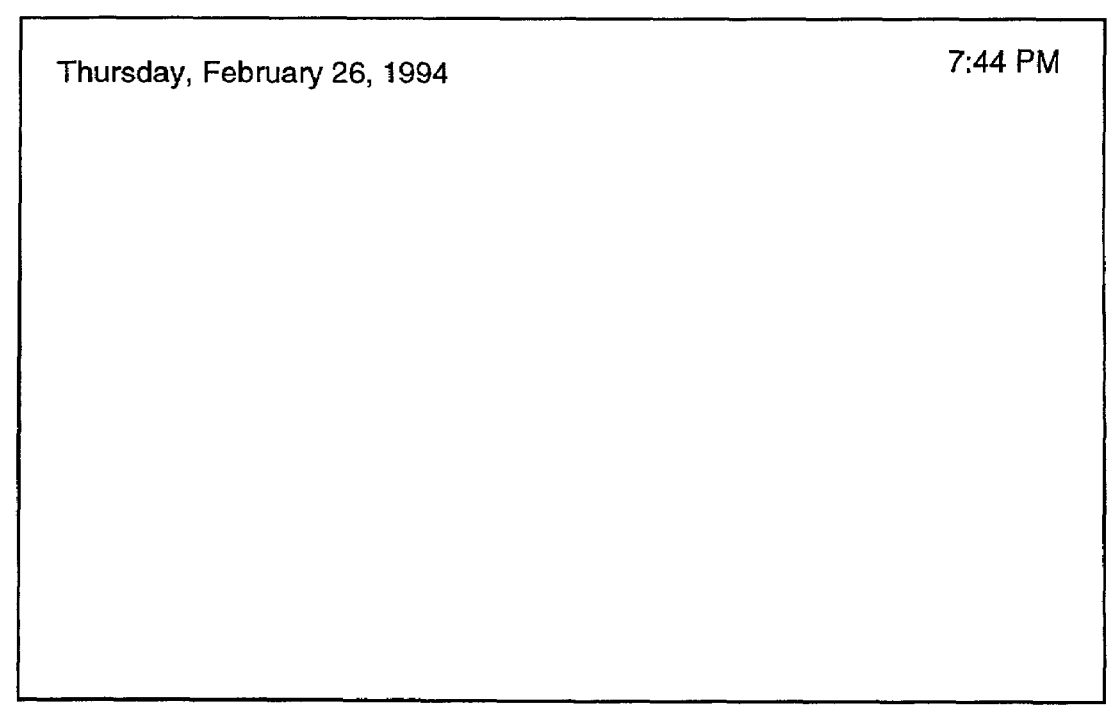
Figure 21:
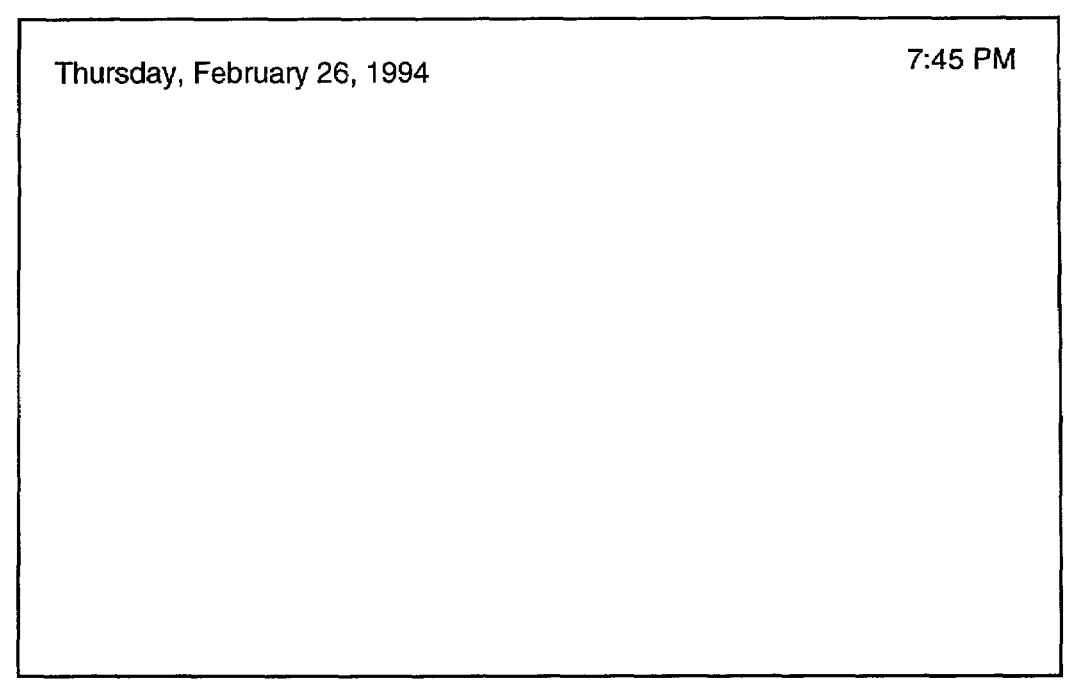

FIGS. 20-28 illustrate many of the menus presented in the preceding Figures.

DESCRIPTION OF THE PREFERRED EMBODIMENT

Figure 1:
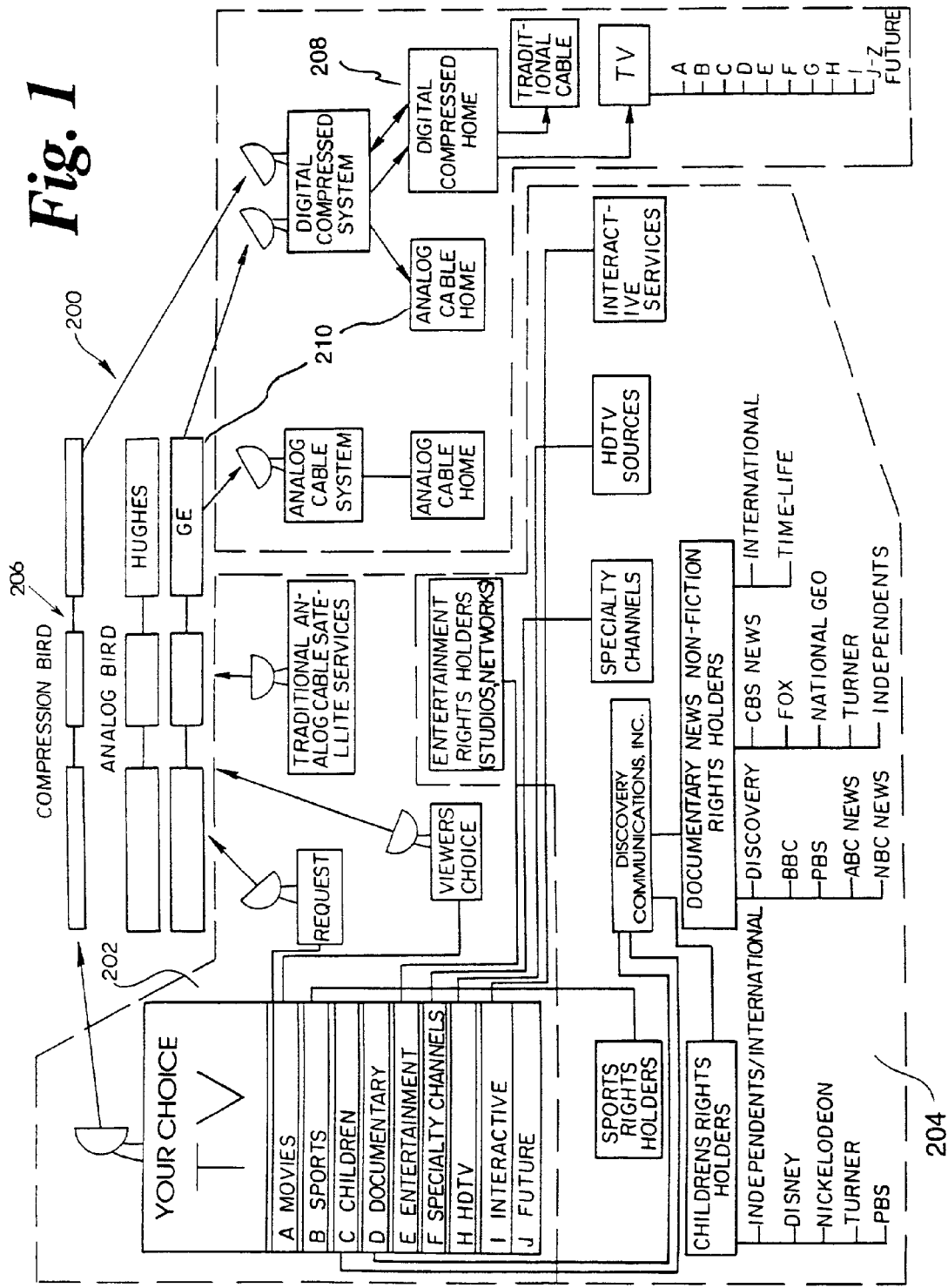
FIG. 1 is a schematic of the overall system design.

FIG. 1 shows an overview of the cable television menu driven program delivery system 200. The Operations Center 202 is shown receiving external programming signals which correspond to particular programming categories that are available for a subscriber's viewing. These external signals may be in analog or digital form and may be received via landline, microwave transmission, or satellite. Some of these external signals may be transmitted from the program source to the Operations Center 202 in compressed digital format or other nonstandard digital formats. These external signals are received and packaged along with programming that is stored at the Operations Center 202 (not shown here).

Examples of external program sources 204 shown in FIG. 1 are: Sporting events, children's programs, documentaries, high definition TV sources, specialty channels, interactive services, weather, news, and other nonfiction or entertainment. Any source that can provide either audio or video or both may be utilized to provide programming to the Operations Center 202.

After packaging, the packaged television program signal is prepared for satellite transmission 206 and sent from the Operations Center 202 to the cable headend 208 via satellite transmission 206. Depending on the specific embodiment, the television program signal may need to be compressed, combined/multiplexed, encoded, mapped, modulated, upconverted and amplified. This system, which is intended to be compatible with existing C and Ku Band satellite transmission 206 technologies, accepts video, audio and data signals ranging in signal quality, and input from a number of sources.

Upon receipt of the programming signal at the cable headend 208, the signal is again treated if necessary and sent into a concatenated cable system to the subscriber's home. The signal reaches the subscribers home in a compressed format and must be decompressed prior to viewing. Included in the delivered program signal is information which enables equipment at the subscriber's home to display menus for choosing particular programs. Depending on the particular embodiment, the television program signal may arrive at the subscriber's home via one or more coaxial cables, fiber cables, twisted pairs, cellular telephone connections, or personal communications network (PCN) hookups.

This connection between the subscriber's home and the cable headend 208 allows for two-way communications. Utilizing this two-way communications, the cable headend 208 receives information about a subscriber's account, billing, and programs viewed. Also, the cable headend 208 is capable of sending computer data or computer software information to the subscriber's home.

As shown in FIG. 1, an analog cable TV system 210 can continue to exist alongside and within the digitally compressed system of the present invention. The digital transmissions do not effect the analog system. In fact, the analog cable signal may be transmitted simultaneously on the same cable as the digital signal. The cable headends may continue to supply subscribers with local channels in an analog signal format.

Figure 2:
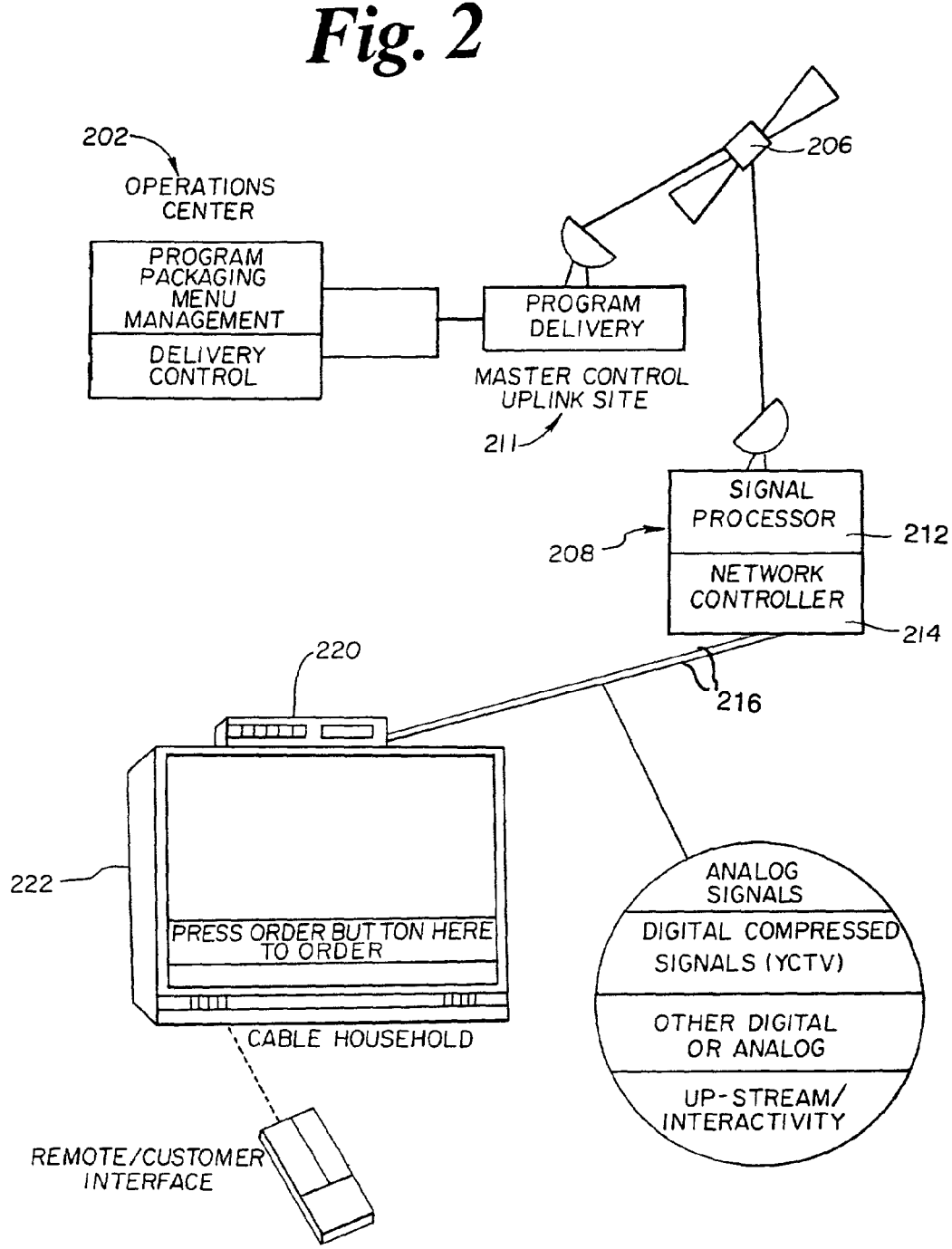
FIG. 2 is a schematic of the primary components of the invention.

FIG. 2 shows a more detailed overview of the operation of the present invention. The Operations Center 202 shown performs program packaging and delivery control. In the preferred embodiment, the packaged program signal will be treated at a master control uplink site 211 prior to being transmitted to the satellite 206. Various satellite multi-accessing schemes and architectures can be used with the system, including both single channel per transponder time division multiplex (TDM) and multiple channel per transponder single channel per carrier (SCPC). Time division multiplexing is the more desirable scheme. The signal is transmitted from the satellite 206 to the cable headend 208 where a computer system including a digital switch treats the signal and delivers it through cables to a subscriber's home. In alternate embodiments, multiple Operations Center 202 and multiple uplink sites can be simultaneously utilized.

In the embodiment shown in FIG. 2, two cables 216 are used between the cable headend 208 and the subscriber's home. In this particular embodiment, analog signals, digitally compressed signals, other digital signals and up-stream/interactivity signals are sent and received over the two cables 216.

The cable headend 208 receives the digitally compressed and multiplexed signal from the satellite 206 and processes the signal for further distribution to the subscriber homes. The cable headend 208 performs two primary functions in the cable delivery system. It will act as a signal processor 212 and distribution center for routing the digitally compressed signals to subscribers and it will act as a network controller 214 receiving information from subscribers and passing the information on to the Operations Center 202 or other remote sites (such as regional, statistical and billing sites not shown). In order to perform these two functions, the cable headend 208 of the preferred embodiment is equipped with two computer processors working in unison. Use of two processors performing different functions increases the speed and capability of the cable headend 208 without a significant increase in cost. One processor, the signal processor 212, handles the receiving and processing of the satellite 206 signal for distribution to subscribers. The second processor acts as a network controller 214 and monitors activity of the subscriber's set top terminal 220. The cable headend 208 can be operated by one CPU or a series of CPU's which perform the signal processing and network control functions.

The signal processor 212 will treat the signal as necessary for use by the subscriber's set top terminal 220. In the simplest embodiment, the amount of processing that is necessary by the signal processor 212 is limited to demultiplexing and frequency allocation. However, in alternative embodiments, the signal processor 212 demultiplexes the signal, allocates frequencies and then re-multiplexes the signal using a different multiplexing scheme prior to the signal's distribution to the subscriber. In addition, for embodiments in which the control of local availability time is desired at the cable headend 208, the signal processor 212 must be capable of compressing and adding additional signals to the satellite 206 signal. In order to incorporate local programming, the signal processor 212 would demultiplex the satellite 206 signal, compress the local programming, combine the compressed local program with the satellite 206 signal and then multiplex the signal prior to delivery to the subscriber terminals. Most of the activities necessary for incorporating local programming will be automatically performed by the signal processor 212. In the preferred embodiment, the signal processor 212 incorporates all the necessary digital switching capability to serve numerous subscribers.

Signals received by the cable headend 208 must be decompressed before transmission from headend to subscriber location only when the compression algorithm used for the cable system differs from the one used for satellite transmission 206. This difference may result from different bandwidth constraints between the cable transmission media and the satellite 206 transponder. Such a difference would necessitate the use of separate compression algorithms to maintain desired signal quality and throughput over both of the transmission mediums.

System control is performed by the network controller 214. The primary task of the network controller 214 at the cable headend 208 is to manage the configuration of the set top terminals, which includes receiving and processing signals from the set top terminal units. The network controller 214 must also monitor selections at subscribers' homes, maintain accurate account and billing information, authorize subscriber channel access, and authorize particular set top terminals to operate in the system. Information required to operate the network will be stored in memory (either in RAM, ROM, magnetic or optical Read/Write) at the cable headend 208 and also in memory (RAM and/or ROM) within each subscriber's set top terminal 220. Two-way communications between the network controller 214 and set top terminal 220 will occur over cable lines. Interactive television programming can be accommodated through the network controller 214. In addition, the network controller 214 will be able to access set top terminals via phone lines for trouble shooting, special features or sophisticated reprogramming.

The network controller 214 regularly polls each set top terminal 220 to acquire needed information to operate the system. The network controller 214 sends signals to set top terminals to authorize their operation and to authorize access to specific channels. If a subscriber has failed to pay a recent bill, the network controller 214 can deauthorize the subscriber's set top terminal 220. When a subscriber orders a program or channel the network controller 214 checks the subscriber's account for good standing and then authorizes the access by signaling the set top terminal 220.

To perform its functions, the network controller 214 must work closely with the signal processor 212. In many instances the program control information signal received from the Operations Center 202 must be modified prior to being sent to the set top terminals. These modifications to the program control information are made by the network controller 214 working in conjunction with the signal processor 212 to send a set top terminal 220 control information stream (STTCIS). From the signal processor 212, the network controller 214 receives the program control information signal which includes cable franchise specific information added by the Operations Center 202. The network controller 214 modifies the program control information signal, if necessary, and communicates the new information to the signal processor 212. The signal processor 212 then forwards the information to the set top terminal 220 in the form of the STTCIS. In most instances the network controller 214 will modify the program control information signal by adding additional information. In a simple embodiment the program control information signal can be passed through the cable headend 208 to the set top terminal 220 without any modifications.

Although the signal processor 212 will handle the addition of simple local availabilities (e.g. local advertisements) into the signal sent to the set top terminal 220, the network controller 214 will handle any of the more sophisticated local programming needs such as interactive programming and certain data services. The network controller 214 will receive any electronic signals sent by the set top terminal 220 including those in response to interactive service requests and some data service requests. The network controller 214 coordinates the necessary switching and access to allow the subscriber to enjoy these services.

The network controller 214 has the capability of performing "on the fly programming" changes, assisting in masking portions of subscriber's television screens (split screen video), assist in selecting different audio signals for the same video (foreign languages), assist in interactive features, create tiered programming, etc. For last minute changes to programming (such as for a local emergency or important regional events), an operator using the network controller 214 can modify the program control information signal "on the fly" and change menus available to the subscriber. This accommodates short notice changes to program packaging that can not be provided to the Operations Center 202 in advance. In order to accommodate split screen techniques for promo and demo video (which will be described later), those undesired video portions of the screen must be masked. The network controller 214 can send the necessary control information to inform the set top terminal 220 to mask portions of a specific channel's video. For example, a video channel with a split screen showing four separate videos would require a ¾ mask to focus the viewer on the featured video clip.

Tiered programming allows different users to view different video even though they are "tuned" to the same channel. For example, the network controller 214 may know the demographics of its subscriber's through a database, by "learning" from prior subscriber choices, from an interactive selection, or from other means. Using the demographics information, the network controller 214 may target commercials to the correct audience by showing different commercials to subscriber's with different demographics. Even though subscriber's will believe they are "tuned" to one channel, they will be switched to a different channel for the tiered video. Alternatively, the subscriber's may be offered an option of several commercials from which to choose.

To accommodate foreign speaking subscribers, multiple audio channels for television programming may be provided. The subscriber may be shown menus of programs available in his native language. The function of choosing the correct audio to correspond to the selected language may be handled by either the set top terminal 220 or the network controller 214 depending upon the configuration. Local programming in several languages or additional audio channels for a foreign language translation of a popular television program may be provided by the network controller 214. Using a picture-on-picture feature, sign language may be similarly made available to certain set top terminals for the deaf. Also, a text overlay may be easily produced on the lower part of the screen for the deaf.

In the more sophisticated and expensive embodiments, the network controller 214 can act as a central computer and provide intra-set top terminal interactive games, inter-set top terminal interactive games, computer bulletin board type services, message services (Electronic mail) etc. For example, a subscriber may play war games with six of his (anonymous) fellow subscribers each in their own home each operating a separate tank. The network controller 214 gathers the players via set top terminal communications and acts as the referee. A bulletin board or message system can be set up to discuss a particular program such as "Twin Peaks Whodunit" for enthusiasts. These interactive features are further described below with the interactive services level B menu and the set top terminal hardware upgrade level B interactive unit.

Also shown in FIG. 2 is the set top terminal 220 that receives the signals from the cable headend 208 and manipulates them for the subscriber. The set top terminal 220 is equipped with local computer memory and the capability of interpreting the digitally compressed signal to produce menus for the subscriber. Although the set top terminal 220 is shown on top of the subscriber's television 222, it may be placed anywhere in the subscriber's home that is accessible by the remote control. The remote control communicates the subscriber's selections to the set top terminal 220. The subscriber's selections are generally based upon menus or other prompts displayed on the television screen. A typical menu is shown in FIG. 2 on the television screen.

One of the achievements of the present invention is effective utilization of digital compression technology by packaging television programs into categories that allow easy access to television programs by consumers. With current digital compression techniques for video, the typical 50-channel capacity cable satellite receiving system can be increased to 300 channels. Presently, one transponder is used for each satellite delivered channel. The preferred embodiment uses 18 satellite transponders and compression ratios of 4/1 to 8/1 to achieve a capacity of 136 satellite delivered channels. More transponders or higher compression ratios can be used to deliver up to the channel capacity of any existing cable system.

Typical program packaging and delivery first involves the digitizing of the video signals. This is then followed by one of a variety of digital compression techniques that are available. Following compression the channels must be multiplexed and sent to the satellite 206 dish that will provide the uplink. A variety of multiplexing schemes may be used in the system. In some situations, it may be advantageous to use different multiplexing schemes in different parts of the overall system. In other words, one multiplexing scheme may be used for satellite transmission 206 and a second remultiplexing scheme for the land transmission.

Once the signal has arrived at the uplink or master control site, it must be modulated, upconverted, and amplified. Various types of satellites and transponders capable of handling digital signals may be used in this cable television packaging and delivery system. An example of a digital satellite that may be used is the AT&T Telstar 303.

In order to achieve the required throughput of video and audio information for the system, digital compression techniques for video are employed. A television signal is first digitized. The object of digitization is two-fold: First, in the case of an analog signal, like a television picture, digitization allows the signal to be converted from a wave-form into a digital binary format. Secondly, standard digital formats are designed to have the resulting pictures or video stills take up less space on their respective storage mediums. Essentially, standard digital formats define methods of compression.

A video screen is divided into picture elements known as pixels. Images define one pixel at a time are referred to as "bit-mapped" images. Most compression techniques take the bit-mapped images and convert them into a series of mathematical algorithms both to reduce storage space and to allow for the mathematical manipulation of images that is often not possible with analog formats. This is possible because many images have pixels that repeat themselves. For example, a photograph of a blue, cloudless sky will have a great number of "repeating" picture elements. This redundancy can be represented with great precision by mathematical formulas. Finally, once images have digitized, the standard digitized formats also include techniques required to re-render the images into their final form, either fully bit-mapped or into an analog wave-form. There are three basic digital compression techniques: within-frame (intraframe), frame-to-frame (interframe), and within-carrier. Intraframe compression processes each frame in a television picture to contain fewer visual details and, therefore, the picture contains fewer digital bits. For example, information on blocks of pixels is sent rather than individual digitized pixels themselves. A six by six block of pixels contains thirty-six pixels. Each pixel can be defined by an eight-bit word. Therefore, a six by six block of pixels equals two hundred eighty-eight bits. If the information on the block rather than the individual pixels themselves, is transmitted, this reduces the amount of information transmitted. Blocks of various sizes may be used as is known by those skilled in the art.

Interframe compression transmits only changes between frames, thus omitting elements repeated in successive frames. Motion prediction technology and motion detection technology are necessary to determine what portions of a changing picture may be compressed. Therefore, if a block does not vary between several frames, the block is transmitted once, and repeated at the receive site for successive frames.

Within-carrier compression allows the compression ratio to dynamically vary depending upon the amount of changes between frames. If a large number of changes occur between frames, the compression ratio drops from, for example, sixteen-to-one to eight-to-one. If action is intense, the compression ratio may dip to four to one.

Various compression methods are used for the above techniques. In vector quantization, a block is compared to a library of standard blocks and a best fit comparison is made between the two. Each block in the library has a corresponding sixteen bit code. Only this code is transmitted to represent the block, rather than the actual block of pixels itself. Therefore, a two hundred eighty-eight bit block of pixels is converted into a sixteen bit code resulting in a compression ratio of 288 bits/16 bits '18. The converse process is performed at the receive site to convert the sixteen bit codes into two hundred eighty-eight bit blocks for reproduction on a television receiver. Other types of compression are known to those skilled in the art, including, for example, discrete cosine transform ("DCT").

Several standard digital formats representing both digitizing standards and compression standards have been developed. For example, JPEG (joint photographic experts group) is a standard for single picture digitization. Motion picture digitization may be represented by standards such as MPEG or MPEG2 (motion picture engineering group specification). Other proprietary standards have been developed in addition to these. Although MPEG and MPEG2 for motion pictures are preferred in the present invention, any reliable digital format with compression may be used with the present invention.

Various hybrids of the above compression techniques have been developed by several companies including AT&T, Compression Labs, Inc., General Instrument, Scientific-Atlanta, Philips, and Zenith. As is known by those skilled in the art, any of the compression techniques developed by these companies, and other known techniques, may be used with the present invention.

FIG. 3a shows effective allocation of 750 mHz of bandwidth for television programming. In FIG. 3a bandwidth is allocated for both analog and digitally compressed signals. In the preferred embodiment, the bandwidth is divided so that each category of program receives a portion of the bandwidth. These categories correspond with major menus of the user interface software. The representative categories shown in FIG. 3a include: (1) high definition TV made possible through the use of compression technology, (2) A La Carte Channel category which provides specialty channels for subscription periods such as monthly, and (3) pay-per-view.

FIG. 3b shows a chart of compressed channel allocation for a variety of programming categories that have been found to be desirable to subscribers. By grouping similar shows or a series of shows into blocks of channels, the system is able to more conveniently display similar programming with on-screen television menus. For example, in the movie category, which has the greatest allocation of channels, the same movie may be shown continuously and simultaneously on different channels. Each channel starts the movie at a different time allowing the subscriber to choose a more suitable movie starting time.

In order to accommodate cable TV systems that have different bandwidths and channel capacities, the television programming and television program control information may be divided into parts such as priority one, two, three. The large bandwidth cable TV systems can accommodate all the parts of the television programming and all parts of the television programming control information. Those cable TV systems with a more limited bandwidth are able to use the program delivery system 200 by only accepting the number of parts that the cable system can handle within its bandwidth.

For instance, as is shown in FIG. 3c, three cable television systems with different bandwidths may use the program delivery system 200 simultaneously with each system accepting only those parts of the information sent which it is capable of handling. Priority one television programming and menus 230 are accepted by all three systems. Priority two television programming and menus 233 are not accepted by the cable television system whose capacity is the smallest or in this case 330 mHz (40 channels) system. Priority two television programming and menus 233 are accepted and used by the two larger capacity cable television systems shown. Priority three television programming and menus 236 are only used by the largest capacity television system which is capable of handling all three parts—Priority one, two and three programming and menu information.

With this division of television programming and menus, the program delivery system 200 may be utilized simultaneously by a variety of concatenated cable systems with varying system capacities. By placing the heavily watched or more profitable programming and menus in the Priority one division, both users and owners of the cable TV systems will be accommodated as best as possible within the limited bandwidth.

Figure 3D:
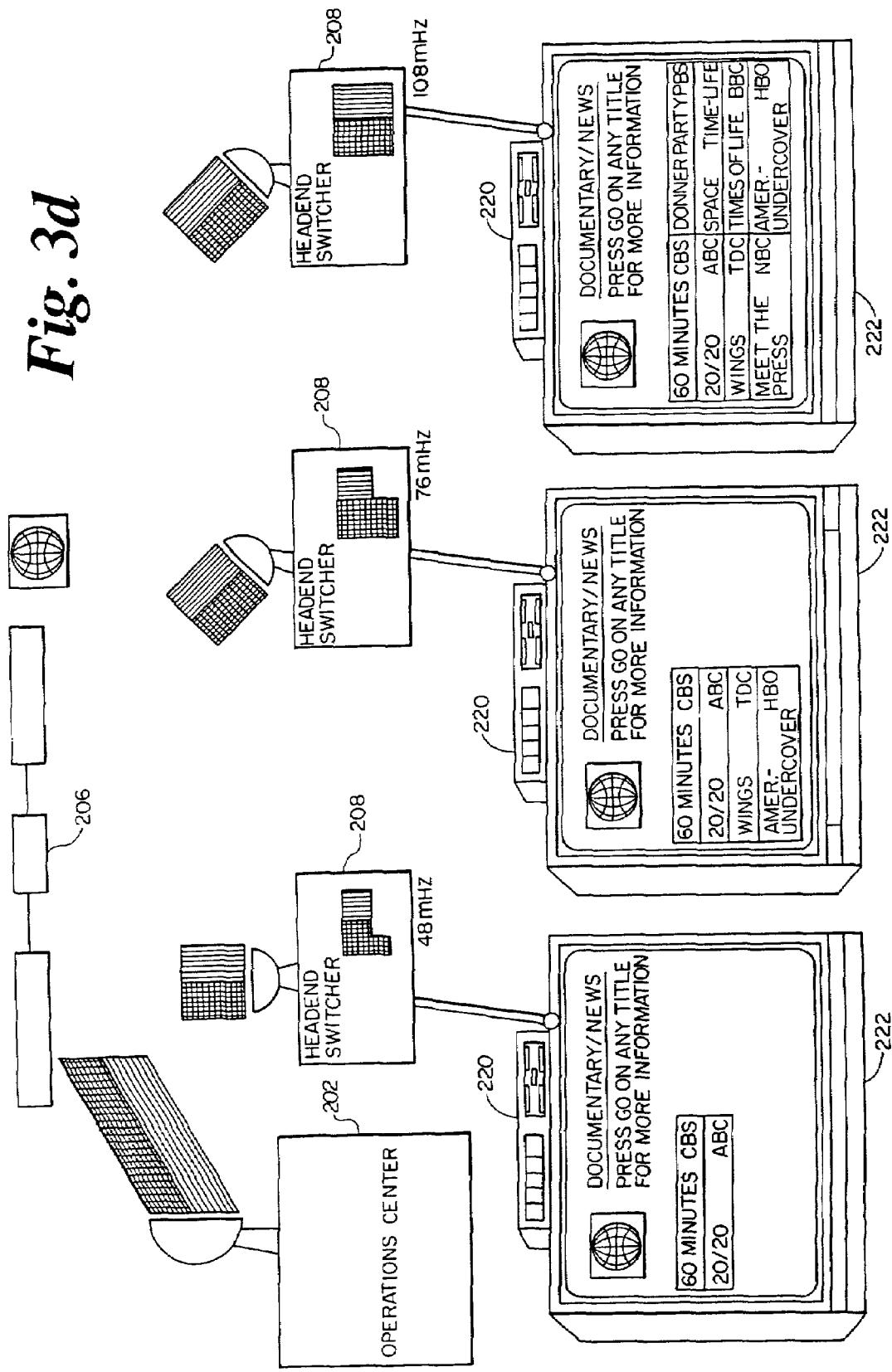
FIG. 3d is a diagram showing three different cable headend systems, each system receiving the entire satellite signal and stripping those parts of the signal which cannot be handled by the local cable system.

FIG. 3d shows three different cable headend 208 systems, each system receiving the entire satellite signal from the Operations Center 202 and stripping those parts of the signal which cannot be handled by the local cable system due to bandwidth limitations. In this particular embodiment, the three local cable television systems shown have bandwidth limitations which correspond with the bandwidth limitations depicted in the previous FIG. 3c. As the bandwidth decreases, the programming options available to the viewer in the exemplary on-screen menu decreases. Using this preferred embodiment, the Operations Center 202 is able to send one identical signal to the satellite 206 that is sent to all the cable headends. Each cable headend 208 accepts the entire signal and customizes the signal for the local cable system by stripping those portions of the Operations Center 202 signal that are unable to be handled by the local cable system. An alternate embodiment requires the Operations Center 202 to send different signals for reception by different capacity cable headends.

There are several ways in which the cable headend 208 may strip the unnecessary signal from the Operations Center 202. A person skilled in the art will derive many methods from the three examples discussed below. One simple method is for the cable headend 208 receiver to receive the entire signal and then manipulate the signal to strip away those unnecessary portions. A second method is for the signal to be sent in three portions with each portion having a separate header. The cable headend 208 would then recognize the headers and only receive those signals in which the proper header is identified. For the second method, the Operations Center 202 must divide the signal into three parts and send a separate header lead before each signal for each part.

The third and preferred method is for a set of transponders to be assigned to one priority level and each cable headend 208 to receive signals from the transponders corresponding to the proper priority level. For example, if there are three priority levels and 18 transponders, transponders one through nine may be assigned to priority level one, transponders ten through fourteen priority level two, and transponders fifteen through eighteen assigned to priority level three. Thus, a cable headend 208 capable of operating at priority level two only would only receive signals from transponders one through nine, and ten through fourteen.

Figure 3E:
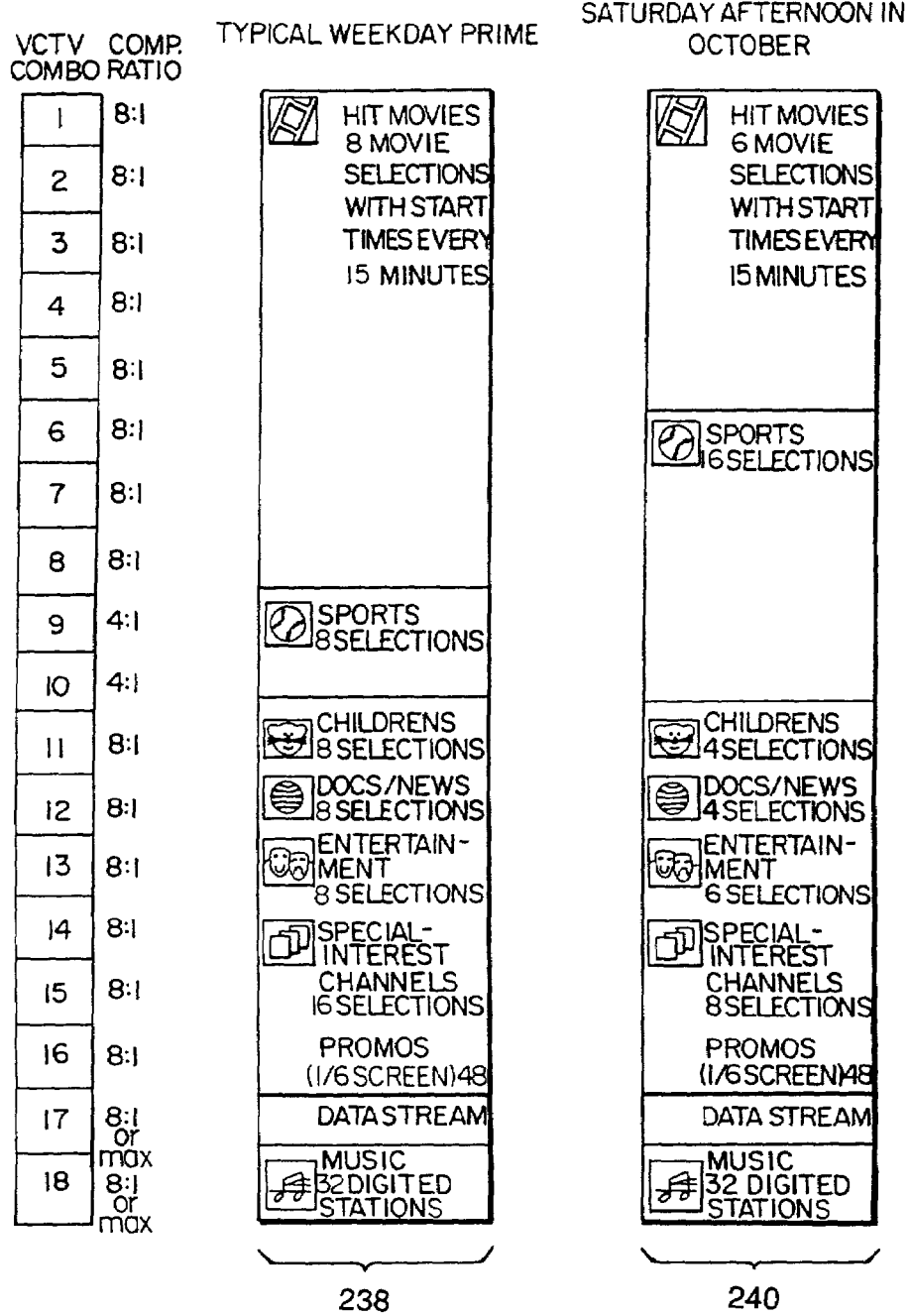
FIG. 3e is a diagram showing dynamic change in bandwidth allocation from a typical week day prime time signal.

In addition to dividing the television programming and menus into parts, the Operations Center 202 of the preferred embodiment is also capable of dynamically changing the bandwidth allocation for a particular category of programming. FIG. 3e depicts this dynamic change in bandwidth allocation from a typical week day prime time 238 signal to a Saturday afternoon in October 240 (during the college football season). FIG. 3e highlights the fact that the bandwidth allocated to sports is limited to eight selections during week day prime time 238 but is increased to sixteen selections during a Saturday afternoon in October 240. This dynamic increase in bandwidth allocation allows the system to accommodate changes in programming occurring on an hourly, daily, weekly, monthly, seasonal and annual basis.

In addition to dynamically allocating bandwidth for programming categories, the Operations Center 202 can also dynamically change the menu capacities in order to accommodate the change in programming and bandwidth. For example, on a Saturday afternoon in October 240, the major menu for sports may include a separate subcategory for college football. This subcategory would, in turn, have a separate submenu with a listing of four, six, eight, or more college football games available for viewing. In order to accommodate this dynamic menu change, the Operations Center 202 must add a submenu listing to the major sports menu, create a new or temporary submenu for college football, and allocate the necessary menu space on the college football submenu.

Once the television programs have been packaged and a program control information signal is generated to describe the various categories and programs available, the packaged programs are then digitized, compressed, and combined with the program control information signal. Upon the signal's departure from the Operations Center 202 the breakdown into categories is insignificant and the signal is treated like any other digitally compressed signal.

Figure 4A:
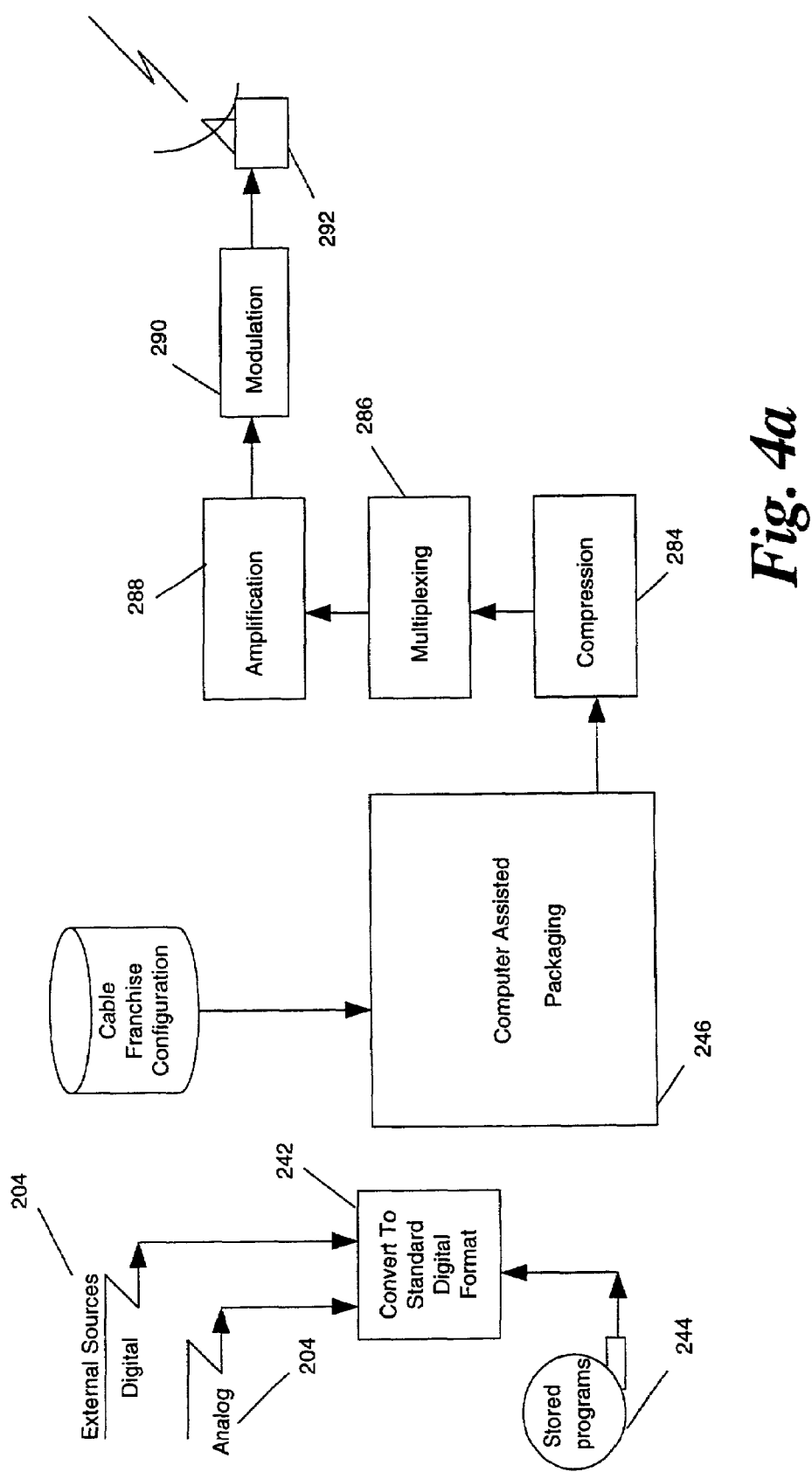
FIG. 4a is a block diagram of the Operations Center and Master Control Site.

FIG. 4a shows the basic operations that must occur in order for the packaged signal to be sent to the satellite 206. External digital and analog signals must be received from television programming sources and converted to a standard digital format 242, defined above for the computer assisted packaging equipment (CAP) 246. Also within the Operations Center 202, stored programs 244 must be accessed using banks of looping tape machines or other video storage/retrieval devices, either analog or digital, and converted to a standard digital format 242 prior to use by the CAP 246.

The programmer/packager utilizing the CAP 246 must input a variety of information in order to allow the CAP 246 to perform its function of generating program control information and packaging programs. Some of the information required by the CAP 246 are the date, time slots and program categories desired by the television programmer.

The CAP 246 system includes one or more CPUs and one or more programmer/packager consoles. In the preferred embodiment, each packager console includes one or more CRT screens, a keyboard, a mouse (or cursor movement), and standard video editing equipment. In large Operations Centers 202s multiple packager consoles may be needed for the CAP 246.

Figure 4B:
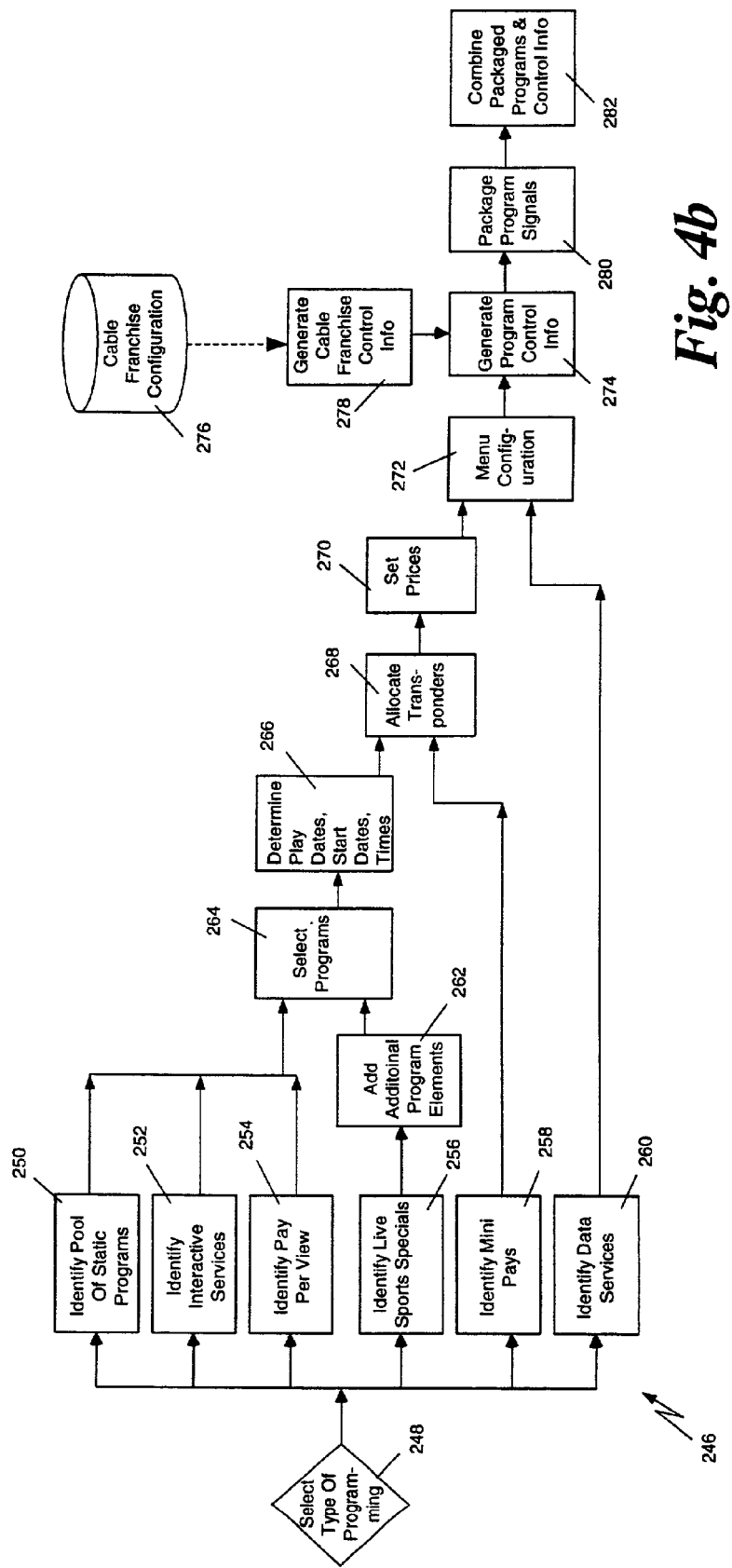

As shown in FIG. 4b, the first step in the operation of the CAP 246 is selecting the type of programming 248 which will be packaged. Basically there are 6 broad categories in which most television programming can be classified: static programming 250, interactive services 252, pay per view 254, live sports specials 256, mini pays 258, and data services. Static programs are programs which will show repetitively over a period of time such as a day or week. Static programs include movies showing repetitively on movie channels, children's programs, documentaries, news, entertainment.

Interactive services includes interactive programs using the Vertical Blanking Interval (VBI) or other data streams synchronized with the programming to communicate interactive features (such as those used in education), and games. Pay per view are programs which are individually ordered by the subscriber. After ordering, the subscriber is authorized to access the program for a limited time, (e.g. three hours, two days, etc.). Live sports specials are live events usually related to sports which subscribers are unlikely to watch on taped delay.

Mini pays are channels to which each set top box may subscribe. The subscriptions for mini pays 258 may be daily, weekly, or monthly. An example would be the Science Fiction channel. Data services are services in which information is interactively presented to the subscriber using a modem or other high rate of speed data transfer. Some examples are Prodigy, services for airline reservations, and TV guide services (e.g. TV Guide X*PRESSJ, InSightJ, etc.). Data could also include classified or other forms of advertising.

After selecting the type of programming, the packager must identify a pool of programs (within the category) to be packaged. The next CAP 246 step varies for different program categories. For the category of live sports, additional program interstitial elements 262 may be added such as promos and other sports news before further processing. For the live sports, static, interactive services 252 and pay per view 254 categories the following CAP 246 step is for one television program to be selected 264. This is followed by each program individually being assigned dates to be played or a start date (for continuous play) and start times 266. Many dates and start times may be assigned to any given program. The program information for these categories may then be processed for allocation of transponder space and setting of prices.

Mini pays and data services require less processing by the CAP 246. After identifying the mini pays 258, the CAP 246 may proceed to allocation of transponder space and pricing for the mini pays 258. Data services in the preferred embodiment generally do not require allocation of transponder space and generally do not require price setting. The information for data services 260 may be directly processed for menu configuration. In alternate embodiments the data services 260 may be processed through these portions of the CAP 246 program.

The CAP 246 then uses an interactive algorithm to allocate transponder space 268 and set prices 270. The factors weighed by the algorithm are: 1. buy rates of the program, 2. margin of profit on the program, 3. length of the program, 4. any contractual requirement which overrides other factors (such as requirement to run a specific football game live in its entirety). The information on buy rates of the program may be obtained from the Central Statistical and Billing Site or a Regional Statistical and Billing Site as will be described later. The CAP 246 must consider the priority levels of programming when allocating transponder space. Particularly, as in the preferred embodiment, transponders are assigned to three specific priority levels.

Following transponder allocation and price setting, the CAP 246 proceeds to menu configuration 272. The positioning of programs within the menu configuration 272 can have an effect on subscriber buy rates for the program. Therefore, an algorithm accounting for either a manually assigned program importance, or a calculated weight of the program importance, is used to determine each programs position within the menu scheme. For instance, a popular program with a high profit margin may be assigned a high weight of importance and shown in a prominent place in the menu scheme. Alternatively, a high profit program with sagging sales may be manually assigned a prominent place in the program schedule to increase sales.

After a series of entries by the programmer/packager at the Operations Center 202, the CAP 246 displays draft menus or schedules (including priority levels) for programming. The packager may now manipulate the menus and schedules and make changes as he feels necessary. After each change, the packager may again display the menus or schedules and determine if any more changes are necessary. When the packager is satisfied with the menu configuration 272 and scheduling of television programs, he may then instruct the CAP 246 to complete the process.

After menu configuration 272, the CAP 246 may begin the process of generating a program control information signal 274. In order to generate program control information signals which are specific to a particular cable headend 208 system, the CAP 246 incorporates cable franchise configuration information 276. In the preferred embodiment, basic cable franchise configuration information 276 is stored at the Operations Center 202. The cable franchises upload changes to their specific franchise information from time to time to the Operations Center 202 for storage. Preferably a separate CPU handles the management of the cable franchise information. From the stored cable franchise information, the CAP 246 generates a cable franchise control information signal which is unique to each franchise.

Using the unique cable franchise control information signals 278 and the menu configuration 272 information, the CAP 246 generates the program control information signal 274. The program control information that is unique to a particular cable franchise may be identified in various ways such as with a header. With the header identification, the cable headend 208 may extract the portions of the program control information signal which it needs. Now, the CAP 246 may complete its process by electronically packaging the programs into groupings 280 for the signal transmission and adding the program control information to the packaged programs 282 to form a single signal for transmission. Through manual entries by the packager or by comparing against a list of programs, the CAP 246 will determine whether the programs are arriving from external sources 204 or sources internal to the Operations Center 202.

Upon completion of the CAP's functions, the Operations Center 202 or the uplink site compresses 284, multiplexes 286, amplifies 288 and modulates 290 the signal for satellite transmission 292. In a basic embodiment, the CAP 246 will also allow entry of time slots for local avails where no national programming will occur.

Figure 5:
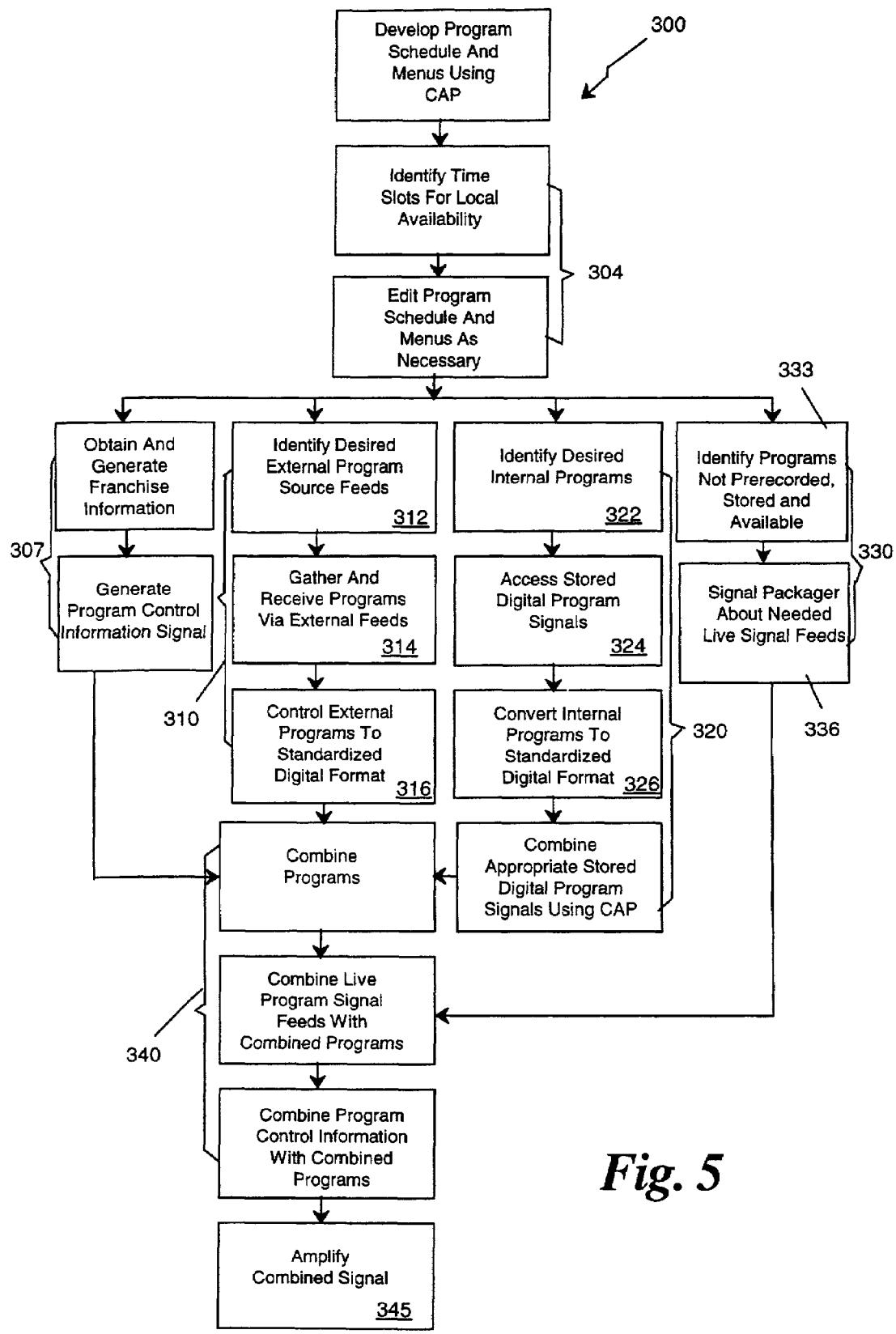
FIG. 5 is a flow chart of the processing occurring at the Operations Center.

FIG. 5 is a more detailed flow chart of some of the functions performed by the CAP 246 after an initial program schedule has been entered and menu configurations generated. The flow chart 300 shows six basic functions that are performed by the CAP 246: (1) editing program schedule for local availability 304 (only for non-standard services, i.e. those services that are not national cable services); (2) generating program control information signals 307; (3) processing external programs 310; (4) processing internal programs 320; (5) processing live feeds 330; and, (6) packaging of program information 340. In an alternate embodiment, the CAP 246 is capable of incorporating local programs and accommodating local availability for local television stations.

Following completion of the programming scheduling (accounting for local availability if necessary) and menu generation 304, the CAP 246 may perform three tasks simultaneously, generating program information signals 307, processing external programs 310 and processing internal programs 320.

The CAP 246 automatically identifies external programs needed 312 and identifies which external feed to request the external program 314. The CAP 246 gathers and receives the external programming information and converts it to a standard digital format 316 for use. The CAP 246 also identifies internal programs 322, accesses the internal programs 324, and converts them to a standard digital format if necessary 326. In addition, the CAP 246 identifies live signal feeds 333 that will be necessary to complete the packaged programming signal 336. In its final task, the CAP 246 completes the packaging of the programs, combines the packaged program signal with the program control information signal, amplifies the signal and sends it out for further processing prior to uplink.

In the preferred embodiment, the Operations Center 202 and uplink or master control site are collocated. However, the Operations Center 202 and uplink site may be located in different geographical places. Also, functions and equipment within the Operations Center 202 may be remotely located. For instance, the program storage may be at a different site and the programs may be sent to the CAP 246 via landline.

In alternate embodiments using multiple Operations Centers, it is preferred that one Operation Center be designated the Master Operations Center and all other Operations Centers be Slave Operations Centers. The Master Operations Center performs the functions of managing and coordinating the Slave Operations Centers. Depending on the method in which the Slave Operations Centers share functions, the Master Operations Center coordination function may involve synchronization of simultaneous transmissions from multiple Slave Operations Centers. To perform its functions, the Master Operations Center may include a system clock for synchronization.

An efficient method of dividing tasks among Operations Centers is to assign specific satellite transponders to each Operations Center 202 and to assign external program sources 204 to the nearest Operations Center. Of course this division of resources may not always be possible. Since programming will be grouped into priority levels with each priority level likely to be assigned specific satellite transponders, it is also possible to assign each Operations Center to a priority level. For example, in a three priority level system with two Slave Operations Centers and 18 transponders, the Master Operations Center may be assigned priority level 1 and assigned 9 transponders. Slave Operations Center A may be assigned priority level 2 and 5 transponders, while Slave Operations Center B is assigned priority level 3 and 4 transponders. In a multiple Operations Center configuration dynamic bandwidth allocation and dynamic menu capacity allocation become more complex and must be coordinated by the Master Operations Center.

Similar to multiple Operations Centers, a delivery system may have multiple satellite uplinks. Preferably each Operations Center has one or more uplink sites. Each Operations Center controls the functions of its assigned uplink sites and may assign one site as a master uplink site.

The program control information signal generated by the Operations Center provides data on the scheduling and description of programs to the network controller 214 or in an alternate configuration directly to the set top terminal 220 for display to the subscriber. In the preferred embodiment, the program control information signal is stored and modified by the network controller 214 and sent to the set top terminal 220 in the form of a set top terminal control information stream (STTCIS). This configuration is required to accommodate differences in individual cable systems and possible differences in set top terminal devices. The set top terminal 220 integrates either the program control signal or the set top terminal control information stream together with data stored in the memory of the set top terminal 220, to generate on-screen displays for assisting the subscriber in choosing the programs he wishes to view. (Throughout the description the term "program control information" is being used to indicate control information coming from the cable headend 208 to the set top terminal 220, whether it is sent directly from the Operations Center, processed by the Network controller 214 and then forwarded to the set top box (STTCIS), or transmitted over telephone lines.)

The types of information that can be sent via the program control signal include: number of program categories, names of program categories, what channels are assigned to a specific category (such as specialty channels), names of channels, names of programs on each channel, program start times, length of programs, description of programs, menu assignment for each program, pricing, whether there is a sample video clip for advertisement for the program, and any other program, menu or product information.

The goal of the menu driven program selection system is to allow the subscriber to choose a program by touring through a series of menus utilizing a remote control for cursor movement. The final choice in the series of menus will identify one particular channel and one time for activation of that channel. Armed with a channel and activation time the set top terminal 220 can display the selected program on the television for the viewer. To achieve this goal a simple embodiment assigns an intelligent alpha-numeric code to each program. This alpha-numeric code identifies the category of the program, the menu in which the program should be displayed, its transmission time(s), and the position on the menu that the program should be displayed.

In this simple embodiment, the program control information, including these menu codes, is sent continuously from the Operations Center to the network controller 214, and ultimately to the set top terminal 220. For example, four hours worth of programming information can be sent via the program control information signal continuously in the format shown in FIG. 6.

FIG. 6 shows the basic information that is needed by the set top terminal 220. The program descriptions shown are coded abbreviations. For example, C for comedy, N for news, S for sports, A for cartoons, and TX for text. If there is a textual description for a program, such as a movie, the description may be given following that program's coded description or may be communicated following the four hours' worth of programming information. As is shown in the coded listing, program descriptions for programs greater than a half hour in length need not be repeated (each half hour). The video description code informs the set top terminal 220 of whether there is still or live video available to advertise the program.

For example, a sporting program may be assigned a code of B35-010194-1600-3.25-Michigan St. vs. USC. The letter B would assign the program to category B, sports. The second alpha-numeric character number 3 would assign the program to the third menu of the sports category. The third character of the code, number 5, assigns the program to the fifth program slot on the third menu. The next six characters, Jan. 1, 1994, represent the date. The following four characters, 1600 represent the start time which is followed by the length of the program and the program name. This entry represents a sports show, a college football game, which will be aired at 4:00 PM on New Years day 1994.

In the 12:30 Channel 1 entry of FIG. 6, two menu codes are shown. By allowing two menu codes, programs that may fit under two different category descriptions may be shown in both menus to the subscriber. With this minimal amount of information being communicated to the set top terminal 220 on a regular basis, the terminal is able to determine the proper menu location for each program and the proper time and channel to activate for the subscriber after his menu selection.

The program control information signal and STTCIS can be formatted in a variety of ways and the on-screen menus can be produced in many different ways. For instance, if the program control information signal carries no menu format information, the menu format for creating the menus can be fixed in ROM at the set-top terminal. This method allows the program control signal to carry less information but has the least flexibility since the menu formats can not be changed without physically swapping the ROM holding the menu format information. In the preferred embodiment, the menu format information is stored at the set top terminal 220 in temporary memory either in a RAM or EPROM. This configuration provides the desired flexibility in the menu format while still limiting the amount of information needed to be communicated via the program control information signal. New menu format information would be sent via the program control information signal or the STTCIS to the set top terminals each time there was a change to a menu.

In the simplest embodiment, the menus remain fixed and only the text changes. Thus, the program control information signal can be limited to primarily text and a text generator can be employed in the set top terminal 220. This simple embodiment keeps the cost of the set top terminal 220 low and limits the bandwidth necessary for the program control information. Another simple embodiment uses a separate channel full-time (large bandwidth) just for the menu information.

As will be described later, live video signals may be used in windows of certain menus. These video signals can be sent via the program control information signal, STTCIS, or can be taken off channels being transmitted simultaneously with the menu display. If the video signal is taken off a channel, less information needs to be sent via the program control information signal. However, this technique requires that separate decompression hardware be used for the program control information and the channel carrying the video. Separate decompressors for the video signals and program information signal allows for the greatest flexibility in the system and is therefore the preferred embodiment. A separate decompressor also assists in assuring that the switch from menus to television programming is smooth and without any significant time delay.

Live video for menus, promos or demos may be sent to the set top terminal 220 in several ways: a) on a dedicated channel, b) on a regular program channel and scaled to size, c) sent along with the program control information signal, etc. However, in the preferred embodiment, a great deal of short promos or demo video are sent using a split screen technique on a dedicated channel.

Using a split screen technique, any number of different video clips may be sent (e.g. 2, 4, 6, 8). To show the video clip on a menu, the video must either be scaled and redirected to a video window on a menu screen or a masking methodology can be used. Masking involves playing the entire channel of video (all 2, 4, 6, or 8 split screens) in background and masking the unwanted video clip portions of the split screen by playing the menu in foreground and overlaying the unwanted background video. Masking is the least expensive method because it does not require any special hardware and it increases video throughput to the set top terminal 220. However, using the masking technique without any video redirecting causes each video clip to be located in a different position on the screen. It also requires the masking to be different for each video clip and makes consistent format difficult. Scaling and redirecting video is generally difficult, expensive and requires additional hardware.

In order to limit the amount of bandwidth needed to transmit the program control information signal, various compression techniques employed for non-video may be used such as block coding, contour coding, blob encoding, and run-length encoding. Further, the program control information signal may be divided into text and graphics, or video, text and graphics and then recombined at the set top terminal 220 using a text generator, graphics decompression, and video decompression as necessary.

Figure 7A:
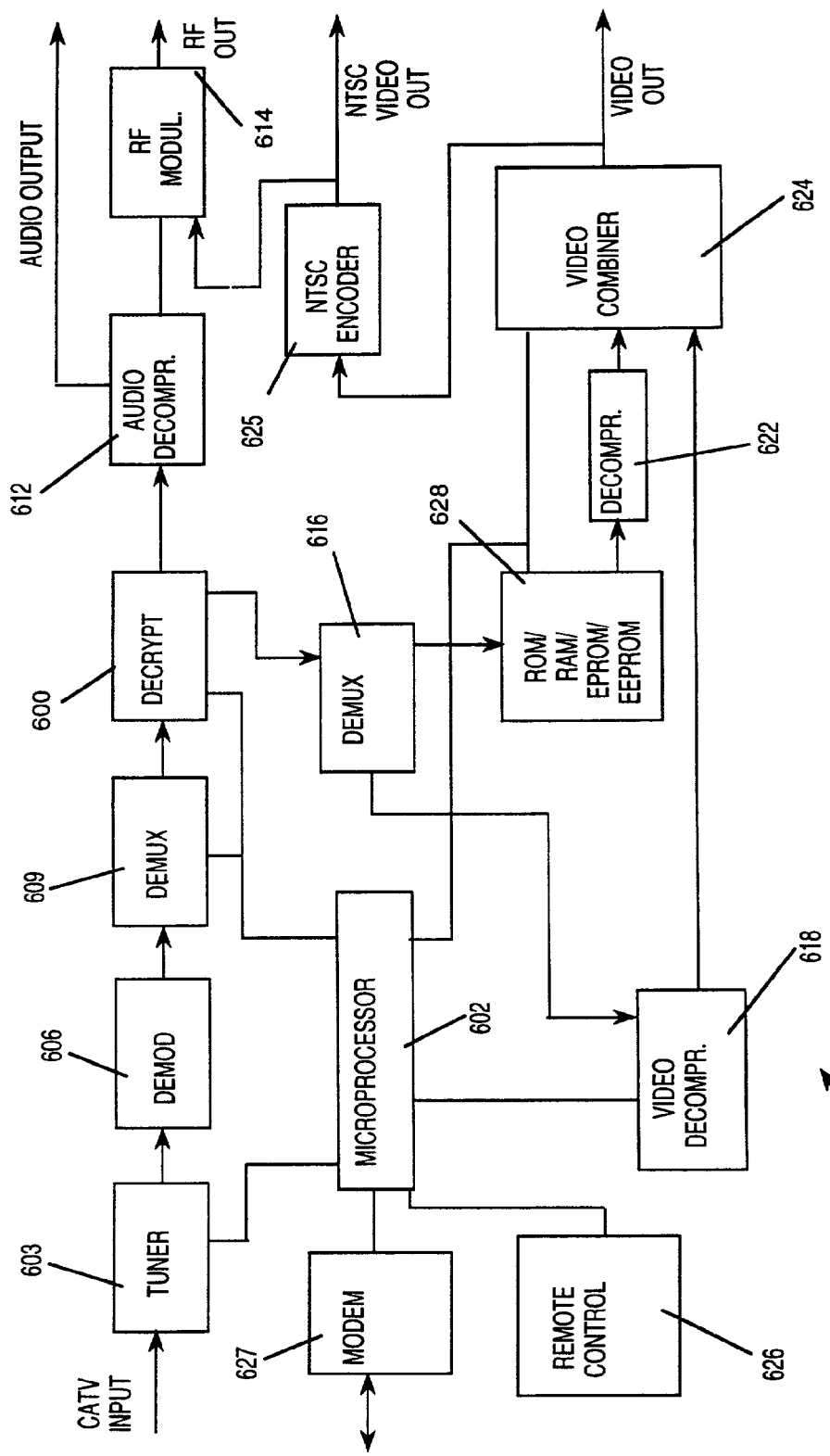
FIG. 7a is a block diagram of the internals of the set top terminal.

FIG. 7a shows a basic block diagram of a digital compression set top terminal 220. In some respects, the set top terminal 220 is similar to other converter boxes currently available and can include a variety of error detection, decryption 600 and coding techniques such as anti-taping encoding. The set-top terminal must also have a tuner 603, digital demodulator 606, and demultiplexers 609, 616 as well as audio equipment 612, 614. Also shown in FIG. 7a is a remote control interface 626 for receiving and processing signals from remote control unit 900. A modem 627 is provided for allowing communication between a microprocessor 602 and the cable head end. NTSC encoder 625 provides an NTSC video output to be output as a standard television signal.

The microprocessor 602 is capable of executing program instructions stored in memory. These instructions allow a user to access various menus by making selections on the remote control 900. The various program instructions for accessing menus and performing other functions are described below.

The manner in which the video is decompressed and the menus are generated from the program control signal or STTCIS varies depending on the specific embodiment of the invention. However, at a minimum, one video decompressor capable of decompressing one video signal must be used. Basic menu format information may be stored in a graphics memory comprising ROM, non-volatile RAM, EPROM, and/or EEPROM 620. Video decompressors 618 and 622 may be used if the video is compressed, and additional equipment to generate menus may be included. In one embodiment, a separate decompressor 622 is used to process the program control information signal and a video combiner 624 incorporates video and menu graphic information. In the preferred embodiment, the program signal is sent with three primary parts, compressed video (or video location information), compressed graphics, and text. After the program signal is demultiplexed into its component parts, a video decompressor, a graphic decompressor, a text generator and a combiner are used to assist in creating the menus.

Figure 7B:
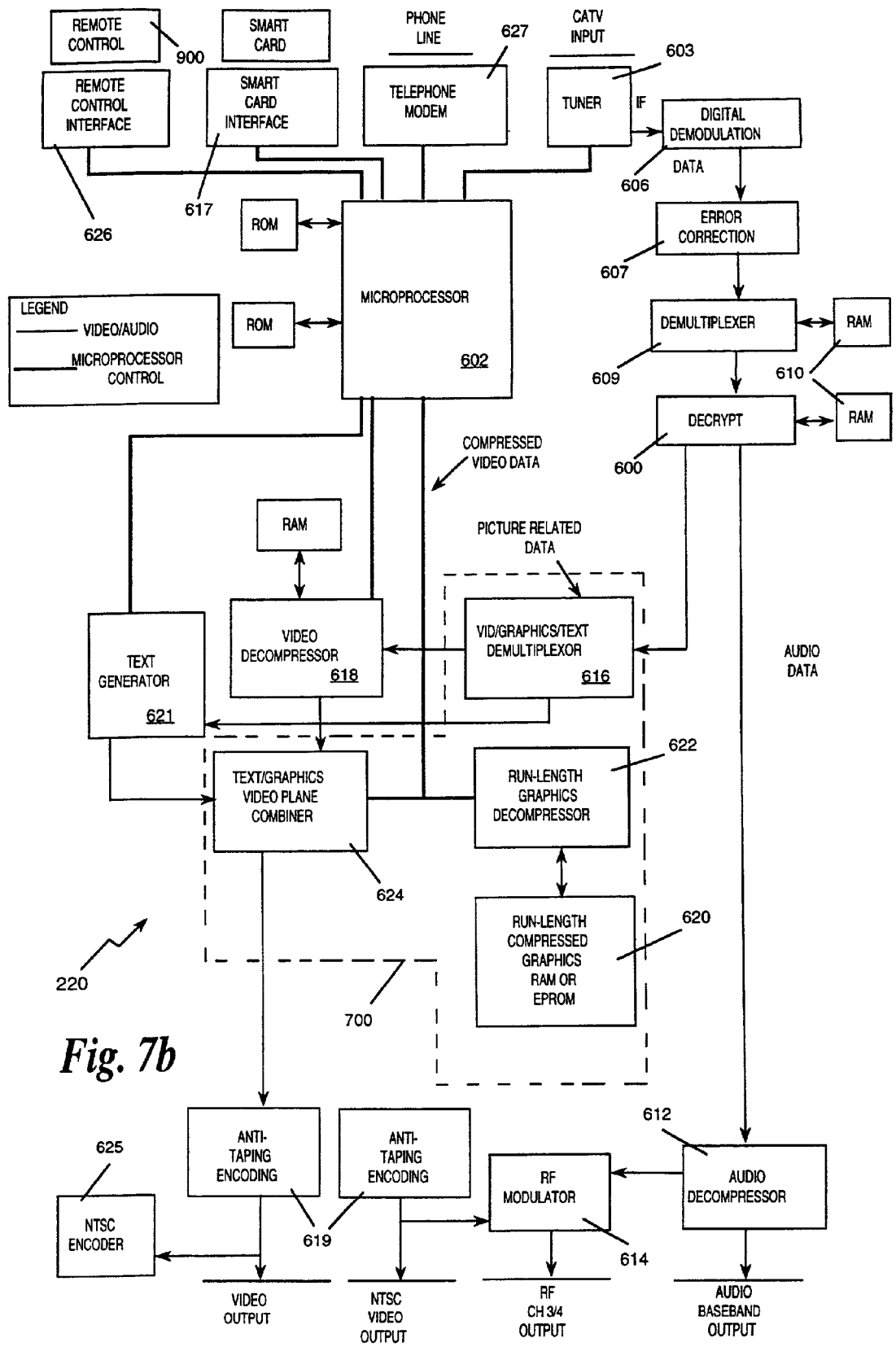
FIG. 7b is a block diagram of an alternative embodiment of the internals of the set top terminal.

FIG. 7b shows a basic block diagram of an alternative digital compression set top terminal 220. The same components shown in FIG. 7a are repeated in FIG. 7b, and given the same reference number (e.g., tuner 603, modem 617, NTSC encoder 625, etc.). FIG. 7b also shows the addition of a smart card interface 617 to allow additional features to be included on a smart card insertable into the smart card interface 617. Error correction circuitry 607 is also shown receiving the demodulated signal, prior to demultiplexing the signal. Memory associated with the microprocessor 602, the demultiplexer 609, the decryptor 600, and the video decompressor 618 is shown in FIG. 7b.

Box 700 in FIG. 7b shows the elements of an upgrade module which is described below with respect to FIGS. 9a and 9b. The remaining circuitry in FIG. 7b shows a basic decompression box 720, also described below.

The circuitry in box 700 includes a video, graphics and text demultiplexer 616, a text and graphics video plane combiner 624, a graphic decompressor 622 and a graphics memory 620. Graphics in memory 620 is preferably run-length compressed, however other methods of compressing graphics may be used as is known by those skilled in the art.

The generated menus and video are combined in the combiner 624 and output to an anti-taping encoder 619. Any method of anti-tapping encoding known by those skilled in the art may be used with the present invention.

Figure 8A:
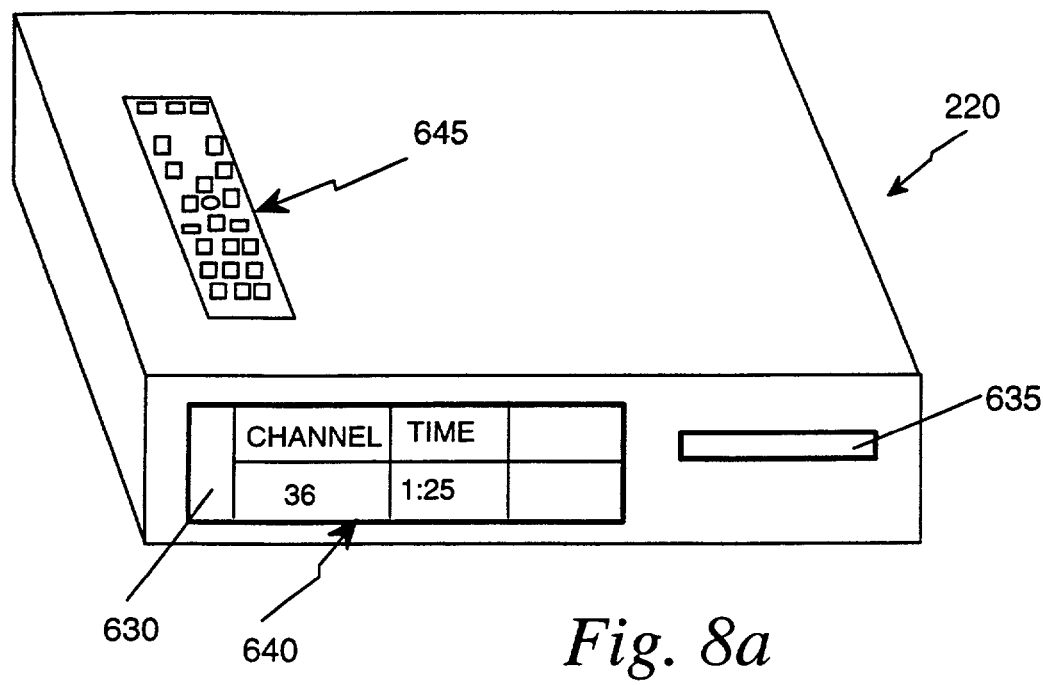
FIG. 8a is a perspective front view of a set top terminal.
Figure 8B:
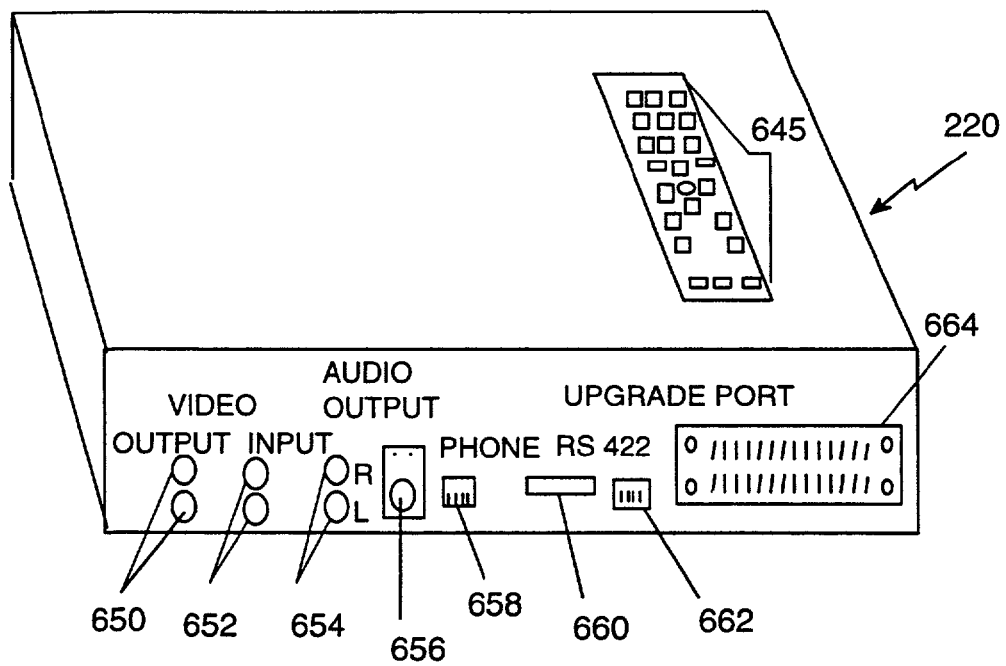
FIG. 8b is a perspective rear view of a set top terminal.

FIGS. 8a and 8b show front and back views respectively for the preferred embodiment of the set top terminal 220. The front panel of the set top terminal 220 as shown in FIG. 8a includes an infrared sensor 630 and a series of LED displays 640. These LED displays 640 preferably indicate with an icon or a letter (e.g. A-K) the major menu currently selected by the set top terminal 220. This visual display will remain lit while the subscriber is watching (or listening to) programming within a major menu. The LEDs 640 of the preferred embodiment also show the channels selected directly by a user, or menu channel selections which range from 1 to 50.

LEDs 640 are preferably provided to indicate a decompression error, a processing error, or other error. Text messages may alternatively be provided to more clearly indicate particular errors to servicemen or subscribers. These error indications aid in repairing or correcting any such errors in the set top terminal 220 or assist in programming the set top terminal 220. Further displays may include current channel, time, volume level, sleep time, parental lock (security), account balance, use of a hardware upgrade, second channel being recorded by VCR, use of the Level D music hardware upgrade in a separate room, and any other displays useful to a subscriber to indicate the current status of the set top terminal 220.

The LED's 640 may also provide an indication of the digital audio channel currently tuned. With this display feature, subscribers may use the digital audio feature without activating the television screen. The source of a signal and output selected (e.g., a subscriber's separate audio system, a VCR, etc.) may be displayed. Although LED's are preferred, the set top terminal 220 may also use a CRT, LCD's, or other display technology.

On the right front half of the set top terminal 220 there is a flapped opening 635 into a cavity that allows the insertion of a magnetic cartridge (or similar portable storage device, including optical disk, ROM, EPROM, etc.). This cartridge opening 635 allows the set top terminal 220 to be upgraded or reprogrammed locally with the use of a magnetic tape cartridge. Game cartridges may also be accepted through a similar flapped opening allowing the subscriber to play video games using the set top terminal 220.

On the top or cover of the set top terminal 220 are located pushbutton controls 645. In the preferred embodiment these pushbutton controls 645 duplicate the two-part alpha-iconic remote control that will be described later. Any function that can be performed on the remote may also be performed at the set top terminal 220 using the duplicative pushbutton controls 645.

FIG. 8b provides a rear view of one embodiment of the set top terminal 220 including the input/output equipment of the terminal. Moving from left to right there are a pair of output terminals 650, a pair of input terminals 652, a pair of stereo/audio output terminals 654, a satellite dish input port 656, a telephone jack 658 and an RS422 port 660. Further to the right there is an upgrade port 662 and a cover plate 664 held in place by a series of sheet metal screws.

The set top terminal 220 has two outputs 650, one for a television and one for a VCR. Control signals may be transmitted through the VCR output to allow the VCR to be automatically controlled by the set top terminal 220. Certain program may be selected by a subscriber from menus, and the VCR will be automatically activated to record the selected program.

The set top terminal 220 is equipped to handle one or two cable inputs by way of inputs 652 for incoming signals. In addition, a phone jack 658 and RS242 or 422 port 660 are provided for maintenance, trouble shooting, reprogramming and additional customer features. In alternate embodiments, the telephone jack 658 may be used as the primary mode of communication between the cable headend 208 and the set top terminal 220. This connection is possible through the local telephone companies, cellular telephone companies or personal communications networks (PCN).

In an alternative configuration, in areas without cable services where subscribers use backyard satellite systems (TV RO) to receive packaged television services, the set top terminal 220 will include the appropriate hardware to allow connection to the satellite 206 reception equipment through port 656. In this configuration, the menu system within the set top terminal 220 will be programmed directly from the operations center. Additionally, an upstream communication mechanism must be in place at the subscriber's home (i.e. modem) to communicate information to the operations center.

In order to provide the greatest flexibility possible and prevent the set top terminal 220 from becoming outdated during the terminal's useful life, an additional electronic card slot or expansion slot has been built into the preferred embodiment. This expansion slot is covered by the metal plate cover 664 shown in FIG. 8b. It is anticipated that additional memory or capabilities may be needed for certain customer features and also to update the system as the cable delivery system's capabilities increase. The expansion slot provides an easy method to upgrade the terminal hardware.

In the preferred embodiment, the set top terminal 220 includes a hardware upgrade port 662 as shown in FIG. 8b, in addition to the expansion slots behind plate 664. The hardware upgrade port 662 should accommodate at least a four-wire connection for: (1) error corrected, decrypted data output of the set top terminal 220, (2) control interface, (3) decompressed video output of set top terminal 220, and (4) video input port. In the preferred embodiment multiple wires are used to perform each of the four functions. The four sets of wires are combined in a single cable with a single multipin connector. Port 662 may also be used to attach various hardware upgrades below to a set top terminal 220.

In the preferred embodiment, multipin connections may be used for the multiwire cable. The multipin connection 662 may range from DB9 to DB25. A SCSI, or small computer systems interface, port may also be provided. Alternatively, four or more ports may be provided instead of the single port depicted.

The preferred embodiment has four hardware upgrades available for a set top terminal 220: a Level B interactive unit, a Level C interactive unit with compact disc capability, a Level D digital radio tuner for separate room use, and a Level E information download unit. Each of these upgrades is connected to the set top terminal 220 unit via the same upgrade port 662 described earlier. The same four wires in a single cable described earlier may be used.

The Level B interactive unit will allow the user access to online data base services for applications such as home shopping, airline reservations, news, financial services, classified advertising, home banking, and interactive teletext services. For example, with this upgrade, a user will be able to reserve plane tickets or buy consumer electronics. The primary feature of this upgrade unit is that it allows actual transactions to occur requiring two way communications via modem with outside services. This added two way communications capability may be with the cable headend 208. Additionally, this two way communications may occur over cellular or PCN.

The Level C interactive unit will employ a high volume local storage capacity, including compact disc or other random access digital data formats. This unit will allow use of interactive multi-media applications. For example, computer games, multi-media educational software, encyclopedias, other reference volumes (e.g. Shakespeare library), etc. In the preferred embodiment, many of these applications will interact with live programming providing additional information and interactivity to the basic program feed. For example, a viewer watching a show set in a foreign country may be able to retrieve additional information, maps, economic data, etc. about that country that are stored on the compact disc. In the level C applications, the upgrade hardware may closely monitor the television broadcast via additional data channels (e.g. vertical blanking interval, or other digital data encoded within live video) providing context sensitive interactivity.

The Level D hardware upgrade, digital radio tuner, will allow the subscriber separate access to the digital radio channels while other programming (not necessarily radio) is being viewed on the television. Typically this upgrade would be used for digital radio usage in a separate room from that of the television. The upgrade has a separate tuner, decompressor, and visual display. In the preferred embodiment a second remote control (scaled down version) is provided to access the audio system.

The Level E hardware upgrade allows the subscriber to download large volumes of information from the operations center or cable headend 208. The Level E hardware upgrade will enable subscribers to download data such as books to local storage. Primarily the Level E hardware upgrade is additional local storage via hard disk, floppy, optical disk, magnetic cartridge etc. Preferably a small portable reader called "everyBookJ" is also provided with the upgrade to enable downloaded text to be read without the use of a TV.

The downloadable information may be text or video supplied by the operations center or cable headend 208. With this upgrade, books may be downloaded and read anywhere with the portable reader. Using this upgrade video may be downloaded and stored in compressed form for later decompression. The video would be decompressed only at the time of viewing. Important text that the public desires immediate access may made available through this system. Text such as the President's speech, a new law, or a recent abortion decision rendered by the Supreme Court may be made immediately available.

Using a more sophisticated port, especially the SCSI port, multiple hardware upgrade units may be connected, or "daisy-chained" together, to operate simultaneously.

Figure 9A:
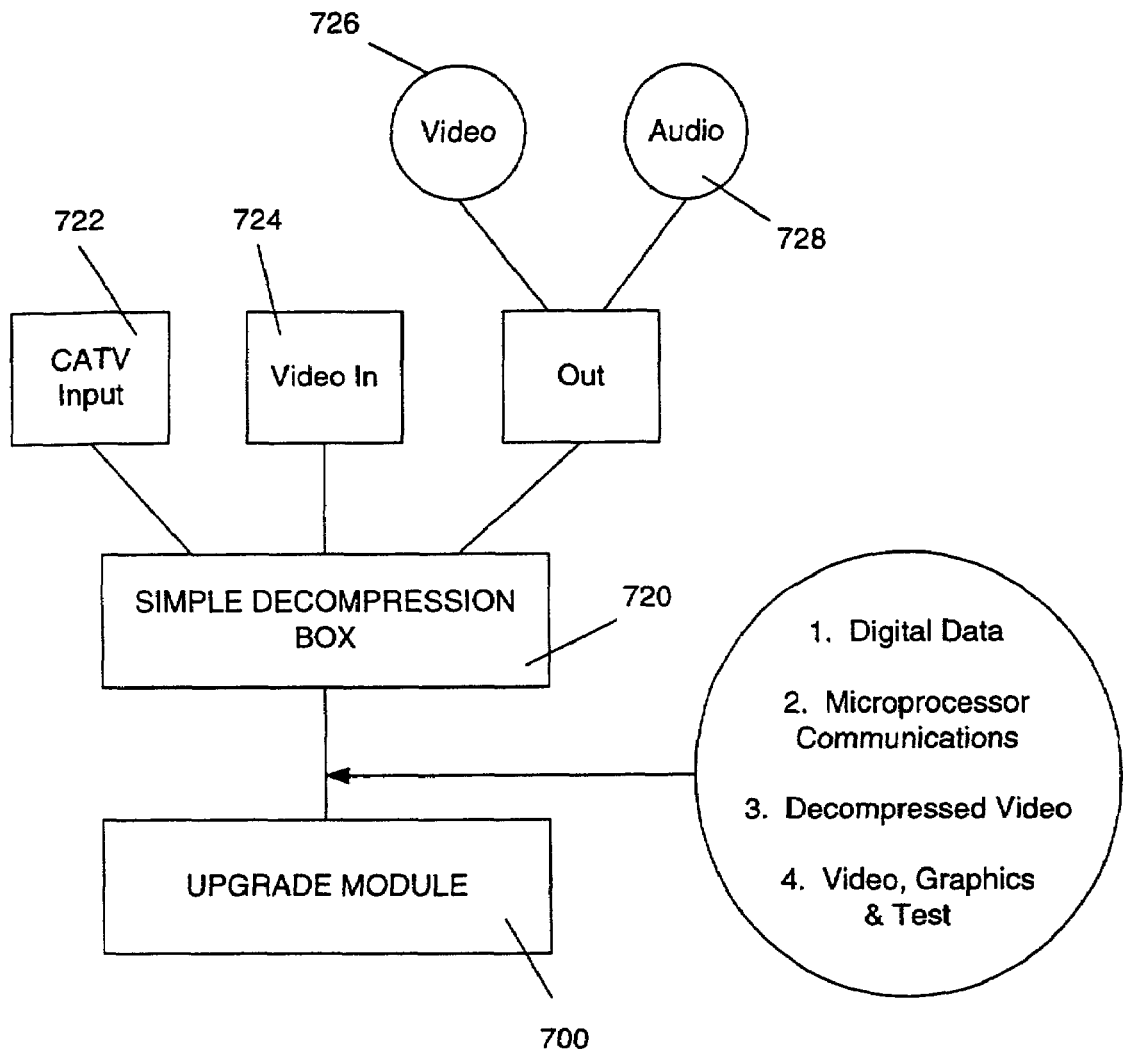
FIG. 9a is a schematic of a basic decompression box and upgrade module, with the associated connections.
Figure 9B:
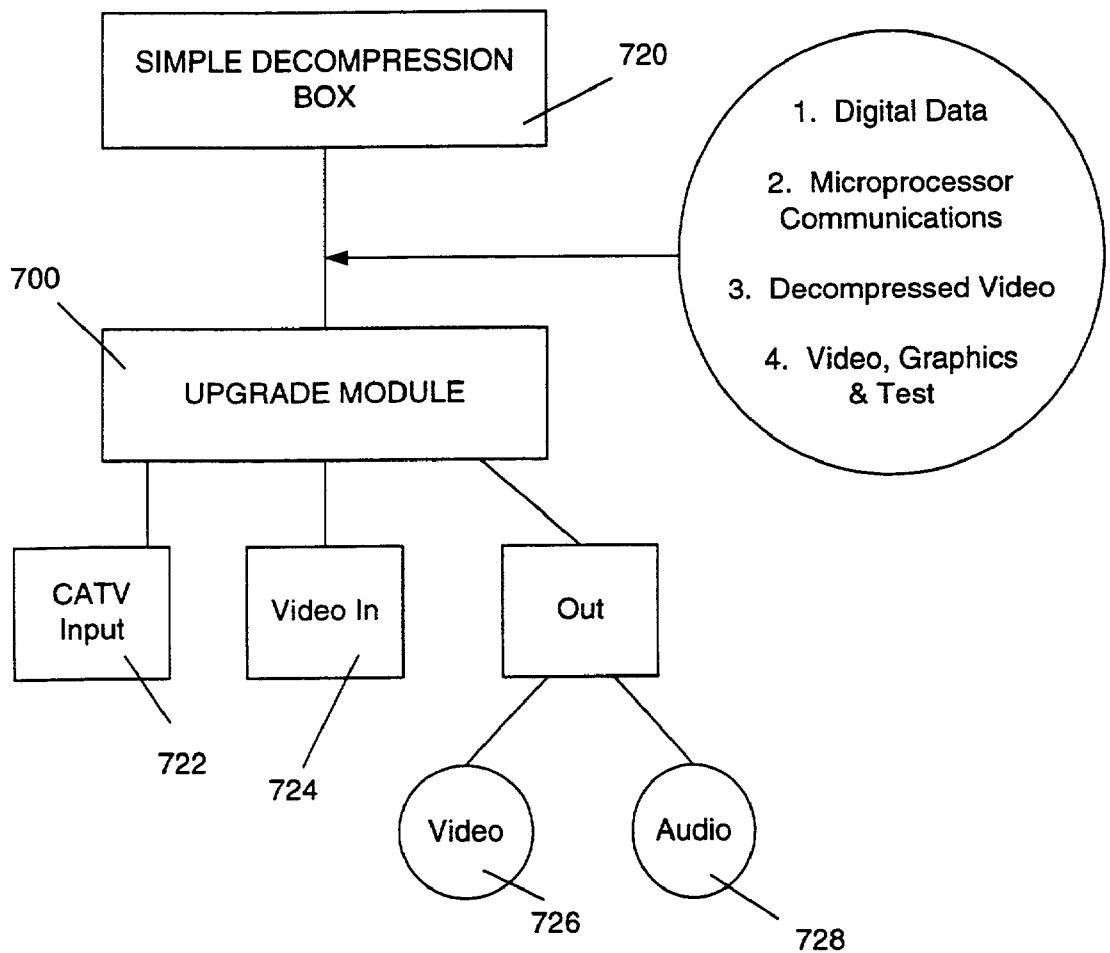
FIG. 9b is a schematic of an alternative embodiment of a simple decompression unit and upgrade module, with associated connections.

FIG. 9a shows sets of wires in a single cable connecting an upgrade module 700 and the simple decompression box 720 through a port similar to the hardware upgrade port 662. The simple decompression box 720 preferably is an industry standard decompression box capable of communicating with an upgrade module to enhance functionality. For example, a microprocessor in the simple decompression box 720 will be able to communicate with a microprocessor in an upgrade module 700.

Thus, as shown in FIG. 9a, if this type of connection is built into a simple decompression box that does not have the full functionality of the set top terminal 220, an upgrade module unit 700 may be connected providing the simple decompression box 720 with the full functionality of a set top terminal 220. Subscribers who have purchased simple decompression boxes 720 may be given all the functions of a set top terminal 220 inexpensively.

In the preferred embodiment, multipin connections may be used for a multiwire cable connecting decompression box 720 with the upgrade module 700. The multipin connection may range from DB9 to DB25. A SCSI, or small computer systems interface, port may also be provided. Alternatively, four or more ports may be provided instead of the single port depicted.

The digital data set of output wires of the simple decompression box 720 will preferably output error corrected and decrypted data to the upgrade set top terminal 700. The second set of wires, the interface connection, allows the microprocessor in the upgrade module 700 to communicate to the microprocessor of the simple decompression box 720. In this manner, the video circuitry of the upgrade module 700 and the simple decompression box 720 may be synchronized. The third set of wires, the decompressed video output, can provide the upgrade module 700 with a decompressed video signal to manipulate. The fourth set of wires, video input set, allows the simple decompression box 720 to accept a video signal that is a combined text, graphics, and video signal.

Upgrade module 700 preferably includes at least the following circuitry: a video, graphics and text demultiplexer; a text and graphics video plane combiner; a run-length graphics decompressor; and, a run-length compressed graphics memory (non-volatile RAM, ROM, EPROM, or EEPROM). By means of communications through the multi wire connection between upgrade modules 700 and simple decompression box 720, compressed video and control signals may be demultiplexed by the demultiplexer within upgrade module 700. The run-length graphics decompressor, by communicating with the run-length compressed graphics RAM, permits decompression of the input compressed video signal. The text and graphics video plane combiner in upgrade module 700 allows the demultiplexed and decompressed signal to be output, through simple decompression box 720, to a subscriber's television with both video and overlay menus with text.

FIG. 9a shows the CATV input 722, the video input 724, and the video and audio outputs 726, 728, as part of simple decompression box 720. This is the preferred embodiment because this will reduce the component cost of upgrade module 700. Upgrade module 700 could simply be a cartridge insertable into simple decompression box 720. Alternatively, as shown in FIG. 9b, the CATV input 722, the video input 724 and the video and audio outputs 726, 728 may be included as part of upgrade module 700.

The electronics of the set top terminal 220 must receive signals from the Cable headend 208 or Operations Center and separate the program control information from the packaged programs. After separation of the program control information, this signal may be used to generate program menus allowing the user to select specific television programs from within the packaged programs. After selection of a particular program, the set top terminal 220 will demultiplex and extract a single channel signal then decompress the appropriate channel signal to allow the user to watch his selected program. Although the set top terminal 220 can be equipped to decompress all the program signals, this adds unnecessary cost since the subscriber will view one channel at a time. Upon the occurrence of an error in this selection and decompression procedure, the set top terminal 220 LED display will warn the subscriber of an error.

During the normal functioning of the set top terminal 220 the LED display can be customized by the user to display the time, the program channel, VCR activation or other pertinent information. Although the set top terminals may be operated using the keyboards located on top of the set top terminal 220 box, it is expected that most subscribers will use the remote control.

Although the preferred embodiment decompresses one channel at a time for the viewer, users who desire to use the picture-on-picture capability of their televisions can be provided with an upgrade to the set top terminal 220 allowing two channels to be tuned and decompressed at any given time. Once two signals are available to the television the picture-on-picture capability may be utilized to its fullest potential. With the picture-on-picture capability available in the set top terminal 220, a special television is not required for picture-on-picture functionality.

In the preferred embodiment all of the customer features available on the set top terminal 220 will be controllable via on-screen menu displays. In this manner, the subscriber using a cursor may easily customize the programming of his set top terminal 220. The basic programming of each set top terminal 220 will be located on ROM within the set top terminal 220. Random access memory, the magnetic cartridge capability, and the extension card slot will each allow upgrades and changes to be easily made to the set top terminal 220.

In the preferred embodiment, the set top terminal 220 will include features that are now being adopted in the industry such as parental controls and locks, electronic diagnostics and error detection, mute, on-screen volume control, sleep timer, recall of last selection, etc. Each of these features has a corresponding menu that allows on-screen customizing and activation of the feature. The set top terminal 220 also includes a sophisticated favorite channel list and favorite program list.

In addition to all the features that the set top terminals supports with its current internal programming, additional features may be added or existing features upgraded through remote reprogramming of the set top terminal 220. Utilizing the resident operating system on the ROM, the cable head end is able to reprogram the random access memory of the set top terminal 220. With this capability the cable head end can remotely upgrade software on the set top terminals.

In the preferred embodiment, the cable head end will reprogram the menu format from time to time based upon special events or programming needs, such as Olympic telecasts, presidential elections, etc. This reprogramming will occur by using the program control information channel and sending the appropriate signals over this channel. In an alternative embodiment, one channel is dedicated for the special programming needs. When reprogramming is to occur, the cable head end will send an interruption sequence on the program control information channel that informs the set top terminal 220 that reprogramming information is to follow. Significant reprogramming of the set top terminals will occur infrequently. However, the changing of color or formats on menus occur more often. In alternative embodiments, color changes to menus may be accomplished via the program control information itself and does not require reprogramming from the cable head end.

In the preferred embodiment, the basic building blocks or templates of the on-screen menu displays will be stored on graphics memory consisting of no-volatile RAM, ROM, EPROM, or preferably, EEPROM, as shown as 620 in FIG. 10. With the information from this graphics memory 620, the microprocessor 602, graphics decompressor 622, text generator 621 (if necessary), and video combiner 624 will build a menu screen. The memory files of the graphics memory or EEPROM 620 are preferably categorized into three categories, background graphics 800, logo graphics 820, and menu and display graphics 850.

A background graphics file 800 will store menu backgrounds such as: universal main menu backgrounds 804, universal submenu backgrounds 808, promo backgrounds 812 and custom menu formats 816. A logo graphics file 820 will store any necessary logos such as: Your Choice TV logos 824, Network logo files 828, cable system logo files 832, studio logo files 836, and graphic elements file 840. A menu display and cursor graphics file 850 will store menu display blocks 854 and cursor highlight overlays 858 as well as any other miscellaneous files needed to build the menus.

Using this method of storing menus, the menus can be changed by reprogramming the graphics memory 620 of the set top terminal 220. To revise the entire design of displayed menus, the network controller 214 or operations center instructs the EEPROM 620 to be erased and reprogrammed with new menu templates. To change one menu format or logo, the network controller 214 or operations center instructs just the one location in memory to be erased and rewritten. Obviously, this menu reprogramming can be done locally (at the set top terminal 220) by a servicemen.

Figure 10A:
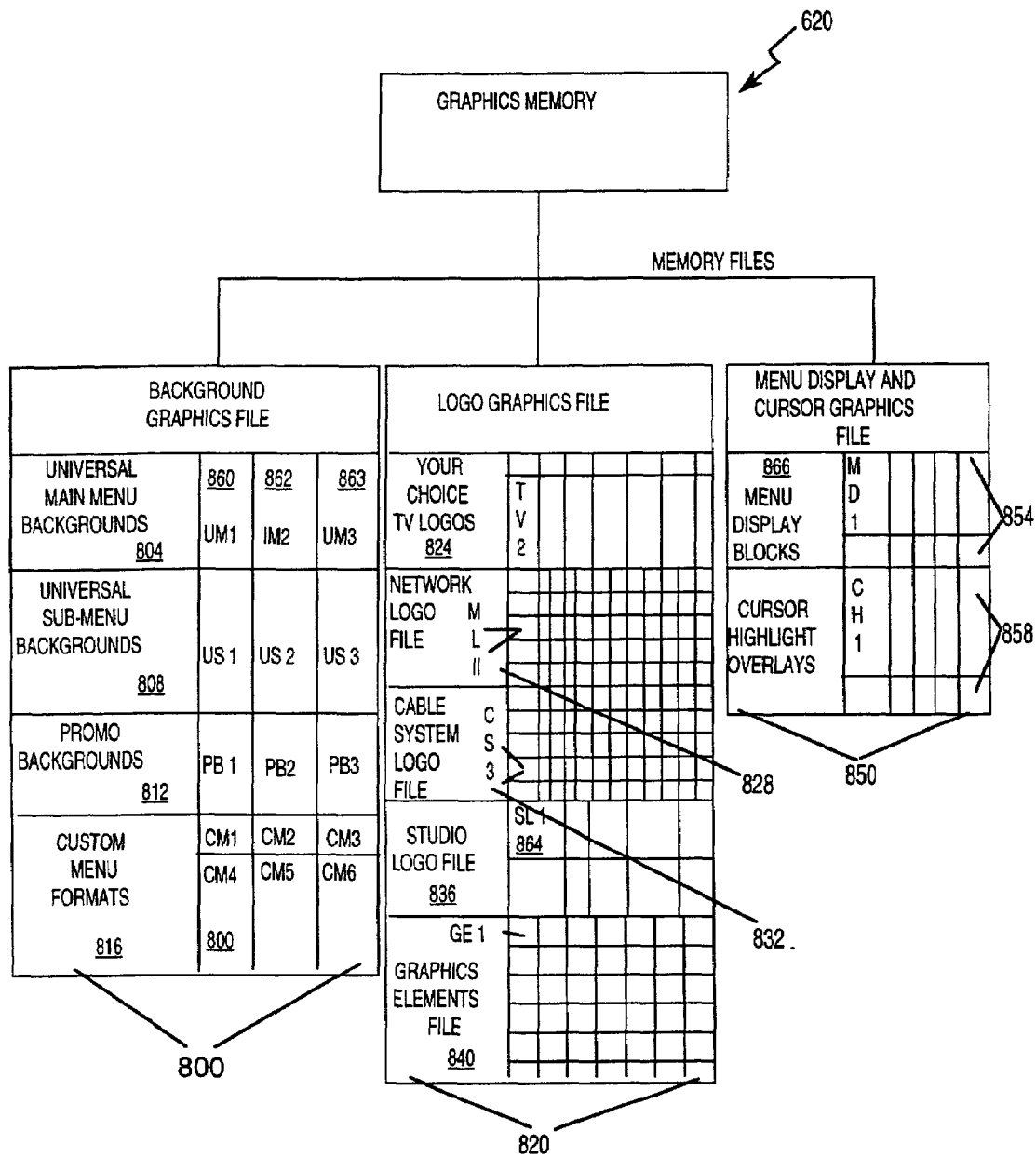
FIG. 10a is a drawing of storage for on-screen menu templates stored in graphics memory of the set top terminal.

As shown in FIG. 10a, each memory subfile is further divided into various memory blocks. For example, the background graphics file 800 contains the universal main menu backgrounds 804. The universal main menu backgrounds memory 804 includes memory units UM1, UM2 and UM3, as shown in FIG. 10a. Similarly, the logo graphics file 820 and menu display and curser graphics file 850 further contain within those subfile individual memory blocks (for example, studio logo file 836 has memory block SL1; menu display blocks 854 has memory menu display block MD1).

Figure 10B:
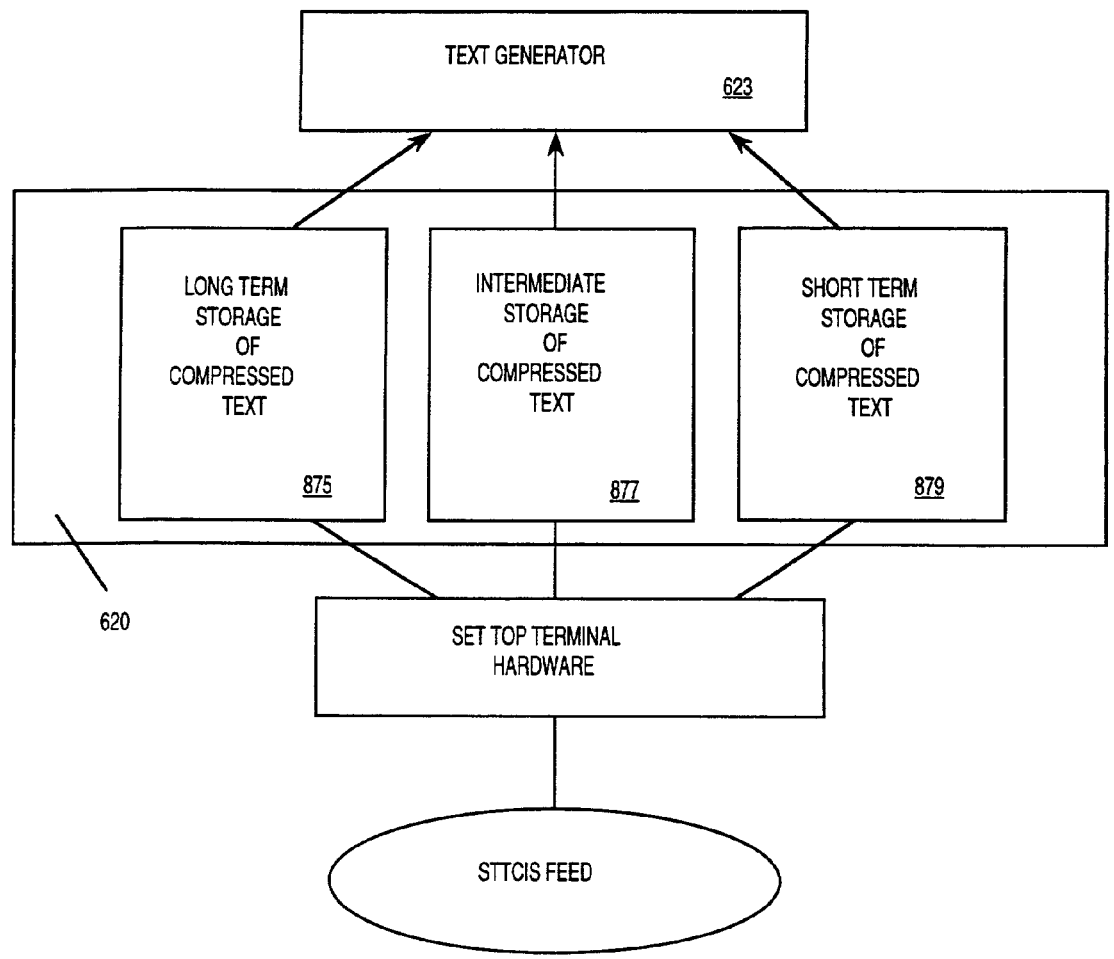
FIG. 10b is a drawing showing the hierarchical storage of graphics memory for the set top terminal.

FIG. 10b shows the hierarchical storage of text transmitted from the cable head end as STTSCIS. Although text may be continuously transmitted with the video signals to set top terminals 220, text may also be transmitted intermittently. In such a case, the text is stored in the set top terminal. Preferably, the text is transmitted and stored in a compressed format using known techniques. Additionally, the text is preferably stored in graphic memory 620 within set top terminal 220.

Depending upon the use of the text, it will be stored in one of three portions of memory. Information sent with the text will either direct the text to a particular portion of memory, or include information as to the priority of text. The microprocessor 602 may then direct the text to the appropriate memory location for storage.

If the text is to be used frequently and over a long period of time, a long term storage 875 will be used. If the text will be used for a shorter period of time (for example, a month), the text will be directed to an intermediate storage area 877. If the text is to be used almost immediately, or for a short period of time (for example, within a few days) the text is directed to a short term storage area 879. Microprocessor 602 locates the appropriate text required for a particular menu and retrieves it from the appropriate portion of memory 620. The text is output from the graphics memory 620 to the text generator 621. Text generated from the text generator 621 is thereafter directed to text/graphics combiner 624.

Figure 10C:
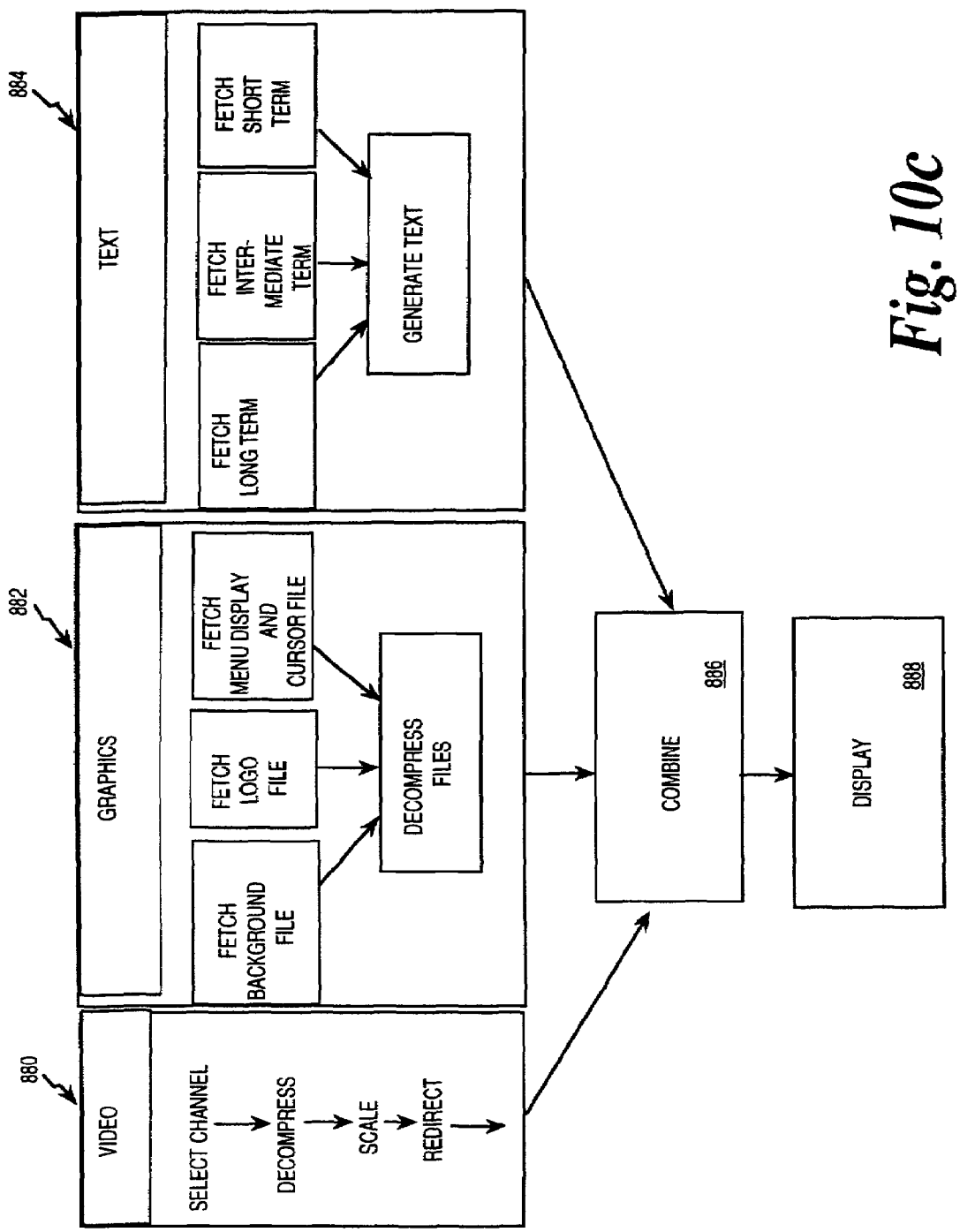
FIG. 10c is a drawing of a flow chart showing the steps required for the microprocessor to retrieve, combine and display a menu.

FIG. 10c shows the steps performed by the microprocessor 602 for creating a menu based upon a series of overlay screens. These instructions are stored in memory within the set top terminal 220. Alternatively, these instructions or routines are transmitted from the operations center 202 to be stored in memory within the individual set top terminals 220.

Initially, microprocessor 602 instructs tuner 603 to select a channel. The channel is decompressed, and error corrected and decrypted, if necessary. If the video is to be reduced in size, so as to be placed within a video window 1556, or is a split screen video window which must be enlarged, the video is scaled to the appropriate size. Additionally, the video may be required to be redirected to a portion of the television screen. This is done by creating a series of offsets for each pixel location of the video.

Graphics must also be used to create a menu in most instances. As is shown in block 882, the microprocessor 602 must fetch a background file, fetch a logo file and fetch a menu display and cursor file in most instances. Each of these files must be decompressed. Following decompression, the file is sent to video combiner 886.

Similarly, microprocessor 602 must fetch text, as shown in block 884. Depending upon the memory location of the text, microprocessor 602 will fetch the text for long-term, intermediate-term, or short-term storage, as described above. Based upon this memory retrieval, the text is generated and sent to video combiner 886. Video combiner 886 combines the video (if any) with as many screens of a decompressed graphics as are necessary, and any text. The image or portions of the image are stored in combiner 886 until all overlays are received by combiner 886. Thereafter, the entire image is sent, under direction of another routine, to be displayed on the television screen, as represented by display block 888.

Figure 10D:
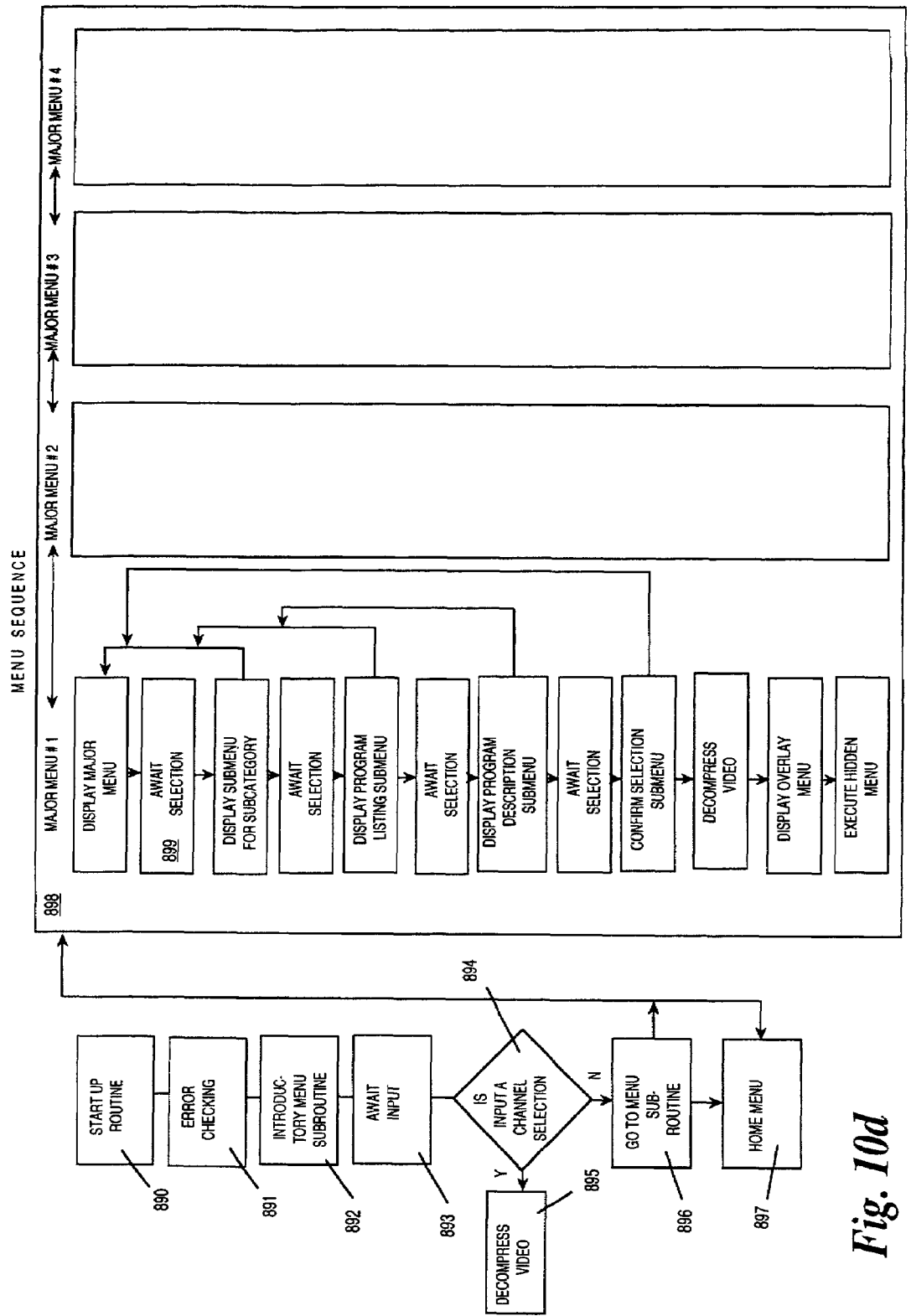
FIG. 10d is a drawing of a flow chart showing the steps required for the microprocessor to sequence program menus.

FIG. 10d is a full chart of programming instructions performed by microprocessor 602 for sequencing menus. Upon powerup of the set top terminal 220, start up routine 890 is performed. Any error checking is thereafter performed (891), and introductory menu subroutine 892 is performed. This subroutine displays the introductory menu and the microprocessor thereafter awaits for an input 893.

If the subscriber inputs a channel selection 894, video for the particular channel is decompressed 895. Otherwise, the microprocessor performs another routine 896 to display the home menu 897.

At the home menu portion of the sequence of routines, a subscriber may select one of the major menus, thus starting the sequence of displays represented by routine block 898.

Alternatively, a subscriber may go directly to a major menu by depressing a menu select button on remote 900 and the microprocessor will execute another the go to submenu subroutine 896.

Once a subscriber has selected a major menu, the appropriate subroutines are executed by the microprocessor using a series of instructions shown in block 898. After each display, microprocessor 602 awaits for a selection by the subscriber, shown as block 899. These blocks could be also represented as decision blocks.

After displaying the major menu, and receiving a selection by the user, a particular submenu for a subcategory is displayed, if such a menu exists. Again, microprocessor 602 waits for an input from the subscriber after executing a routine to display a program listing submenu. Thereafter, after receiving an input, microprocessor 602 performs the next routine for displaying a program description submenu. Thereafter, if a particular selection requires a confirmation menu, that subroutine is executed and the appropriate menu displayed. Thereafter, the selected video is decompressed, and displayed on the television screen. If there are any display overlay menus or hidden menus, the proper subroutine is executed by microprocessor 602 and these menus are displayed.

At any time during the selection of menus in major menu block 898, the subscriber may also depress another major menu button to move into a second column of process instructions (represented by major menu 2, major menu 3, etc. columns). Thus, a subscriber may move from major menu to major menu. Additionally, a subscriber may depress a home menu button on remote 900 to return to the home menu at any time.

The various subroutines executed by microprocessor 602 allow a subscriber to navigate through the various menus of the present invention. A subscriber may sequence back through menus or return to the home menu with a one-touch return of the home menu button on remote 900. All of these functions help to add to the system's user friendliness.

Figure 11A:
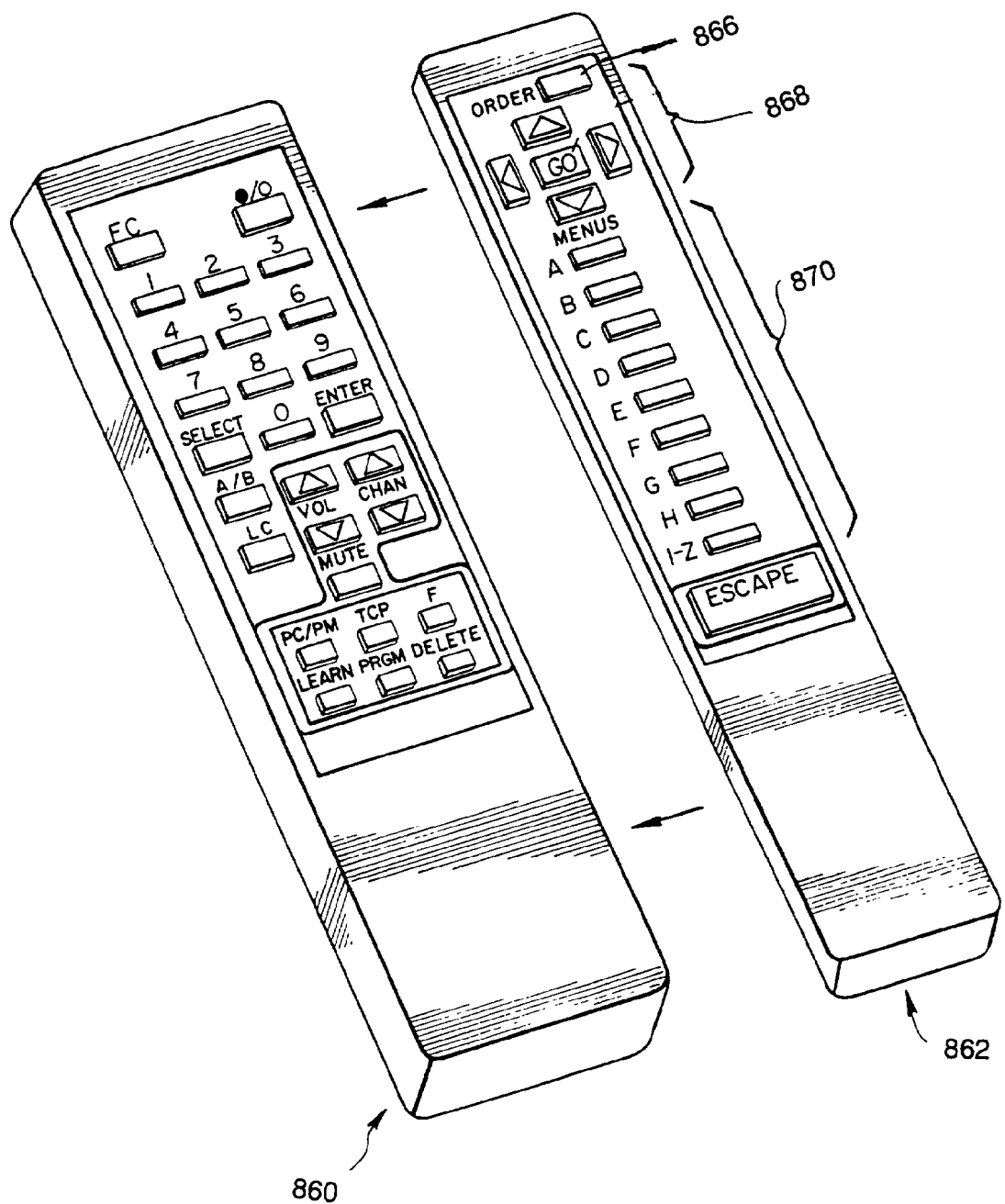
FIG. 11a is a schematic showing the two parts of a remote control unit.
Figure 11B:
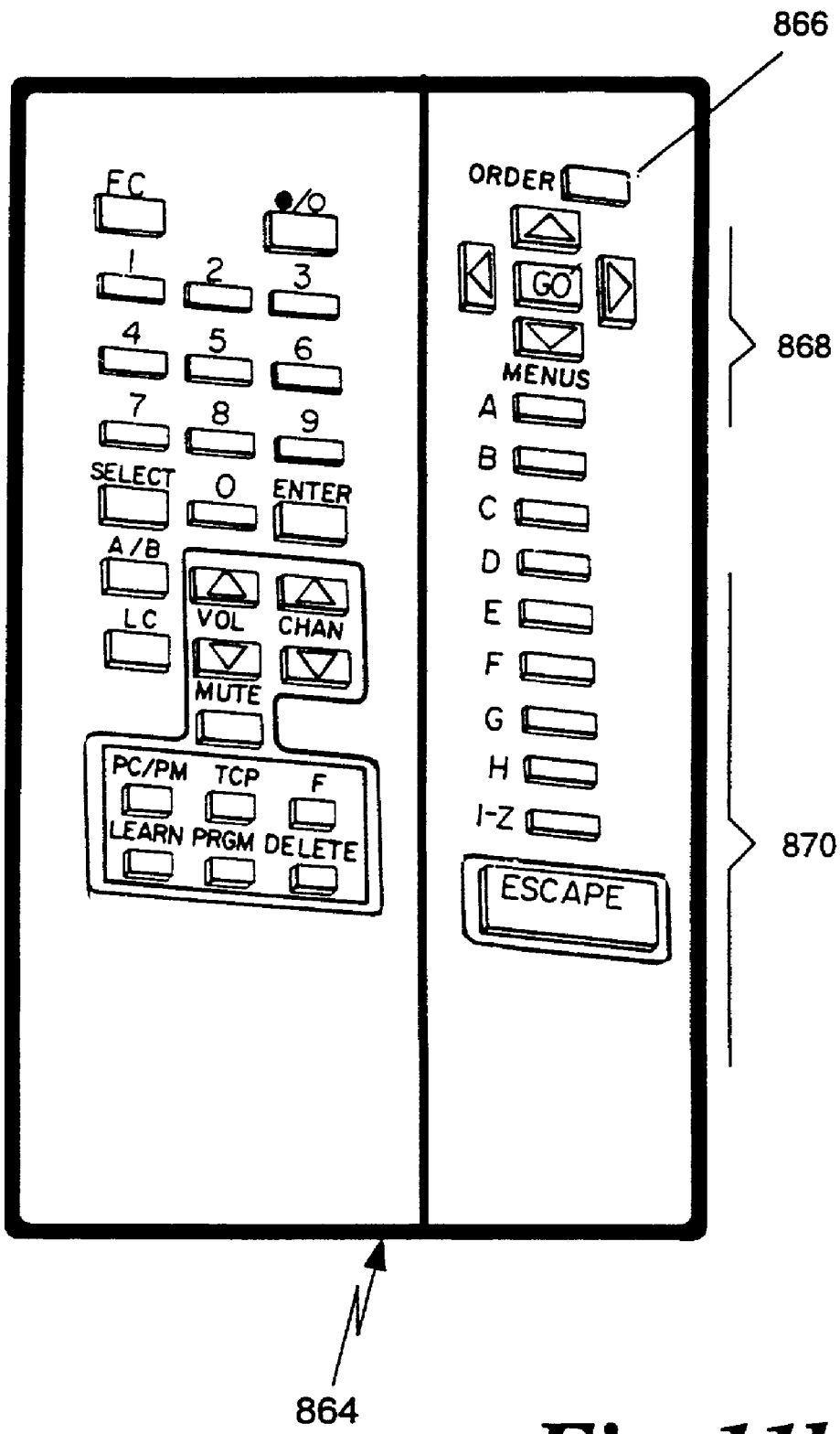

As shown in FIGS. 11*a* and 11*b*, a two-section remote control is shown. To reduce costs and make the set top terminal 220 as user friendly as possible, a standard television remote control 860 is augmented by adding a new section 862 that provides the additional digital menu access and ordering functions. FIG. 11*a* depicts the addition of menu access and cursor movement control to a Gerald RC 650 Remote Control. The cursor movement and function buttons required for the set top terminal's operation may be added to any standard remote control format allowing the user to feel more at home with the new remote control. FIG. 11*b* shows the two section remote control combined in a single unit 864.

The remote control 864 has an ordering button 866, four-way cursor movement, and a "go" button 868, and menu access buttons 870. The remote operates using infrared with the signals being received by the infrared sensor on the front of the set top terminal 220.

In the simplest embodiment the remote may be built with only cursor movement and a go button. In more sophisticated embodiments the remote control may be provided with buttons that are programmable to perform specific functions for a series of entries. An intelligent or smart remote would increase both the cost and capability of the set top terminal 220 system. Using this augmented remote control the subscriber can navigate the program menu system of the set top terminal 220.

Figure 12A:
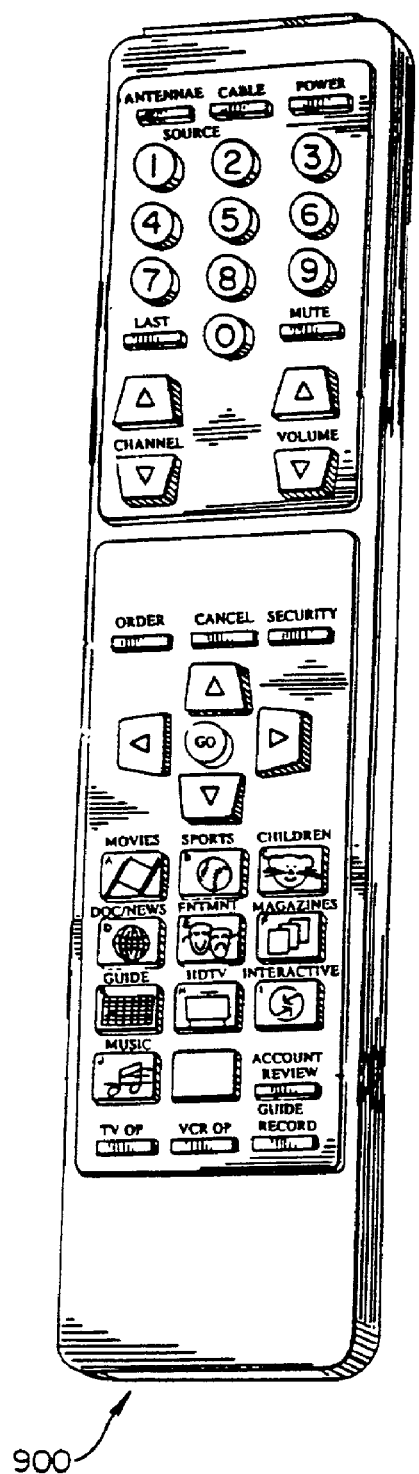
FIG. 12a is a perspective view of the preferred remote control unit of the present invention.
Figure 12B:
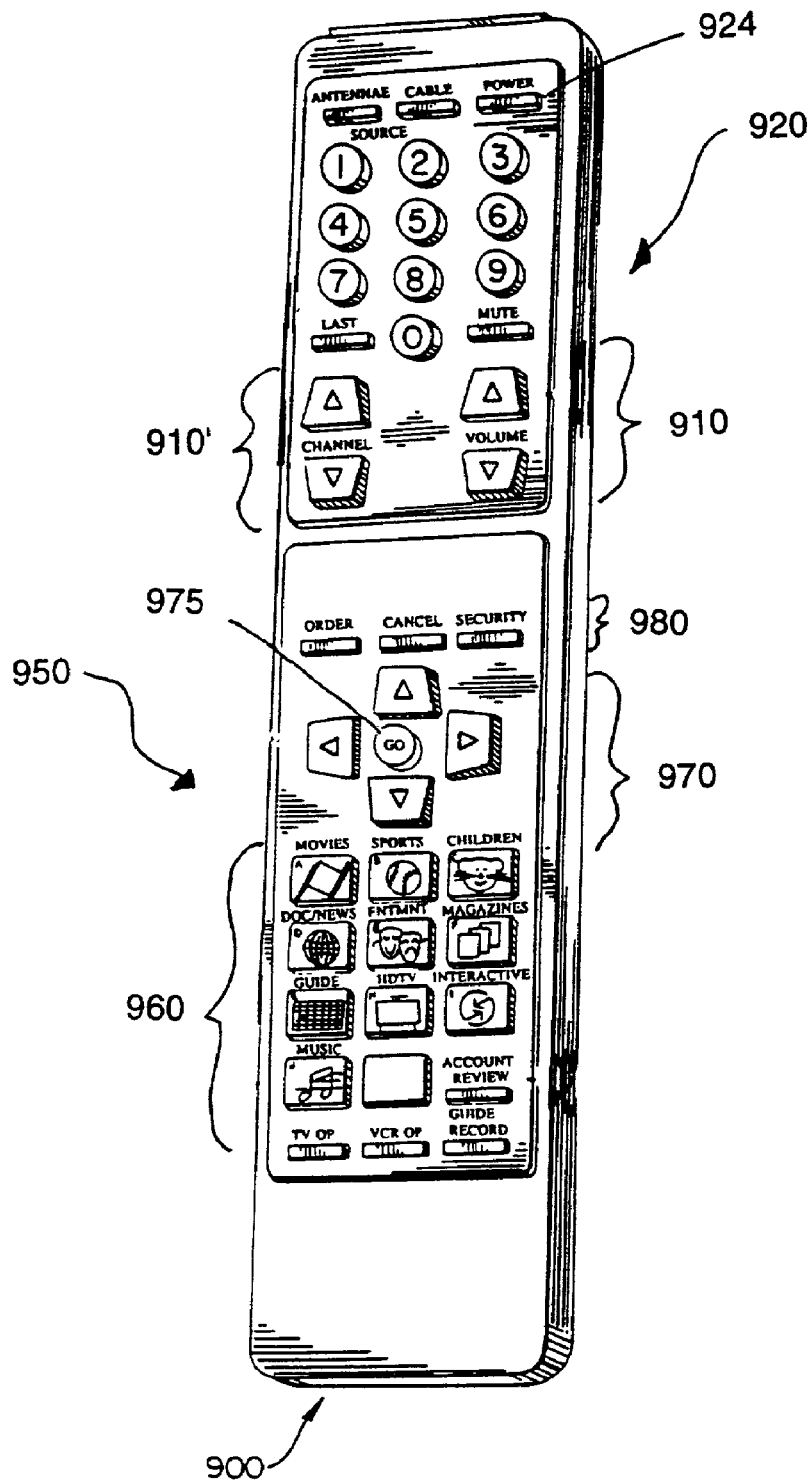

FIGS. 12*a* and 12*b* show an alternative and preferred embodiment of the remote control for use in the present invention. The standard television receiver remote control switches or buttons 920 are again separated from the menu accessing ordering function buttons 950. The standard television receiver remote control buttons 920 include volume control, channel select, power and signal source buttons. The menu buttons 950 include cursor movement and select, menu select, and pay television buttons. However, the standard buttons 920 are separated from the menu access and ordering buttons 950 in the longitudinal direction of the remote, as opposed to the width-wise separation, shown in FIG. 11*a*. Additionally, the color of the buttons or the surrounding background may differ between the standard television remote control buttons 920 and the menu buttons 950 to visually differentiate between these two groups of buttons.

The width and depth of the remote control unit 900 are considerably less than the length to allow the remote control unit 900 to fit easily within a user's palm. The remote control unit 900 in preferably has the center of mass balanced substantially near the longitudinal middle. This allows a user's thumb to naturally be placed in substantially the middle portion of the remote control unit 900, when it is picked up by a user.

Since the center of mass of the remote control unit 900 is placed substantially near the longitudinal middle of the remote 900, thereby having a user's thumb naturally fall in this same center region, the standard remote 920 and menu access 950 switches or buttons most frequently accessed and depressed by a user are placed within easy reach of the user's thumb. Channel and volume increment and decrement buttons 910 are placed near this center of mass and longitudinal center line. The channel buttons 910 are preferably beveled in opposing directions to allow a user to feel for and press a desired button without looking down at remote 900. Similarly, the volume buttons 910 are preferably beveled in opposing directions for the same reason.

Additionally, the channel buttons 910 could have a surface texture different from those of the volume buttons 910 to allow even easier differentiation between channel and volume buttons 910. For example, the volume buttons could have a rough surface texture, while the channel buttons could have a smooth surface texture.

Also placed in the longitudinal center, within easy reach of a user's thumb, are cursor movement buttons 970 and "go" button 975. The "go" button 975 selects an option corresponding to the placement of the cursor. As opposed to buttons, a joystick may be used with a selection on the stick, or a trackball, depressible for selecting a desired choice. The cursor buttons 970 are placed ninety degrees apart, with the "go" button 975 placed within the center of the cursor movement buttons 970, as shown in FIG. 12*b*. The cursor movement buttons 970 are preferably beveled inwardly toward the "go" button 975. The "go" button 975 is recessed below the level of the cursor movement buttons 970 so that it is not accidentally pressed while depressing the cursor movement buttons 970. In addition to the beveling on the cursor movement buttons 970, they may also have a surface texture to allow a user to feel for and select the appropriate button without looking down at the remote 900. Directional arrows could be raised or recessed on the surface of the cursor movement buttons 970 for this purpose.

Menu select buttons 960 are placed near buttons 970 as shown in FIG. 12*b*. Menu select buttons 960 are preferably the largest buttons on remote 900. Menu select buttons 960 preferably have icons or other graphics imprinted on their top surface or adjacent to the corresponding button. For example, a button for the sports major menu may contain a baseball icon. The icons represent the programming available on the particular major menu selected by the menu select buttons

960. The icons may also be raised above the level of the menu select buttons to provide a textured surface. This would allow a user to select an appropriate menu button 960 by feel, without looking at the remote control unit 900. The icons would require substantial differences in texture, while still providing a meaningful graphic related to the associated menu.

As shown in FIGS. 12*a* and 12*b*, labels and icons are provided for the following major menus: movies, sports, children's programming, documentary/news, entertainment, magazines, programming guide, HDTV (high definition television), interactive TV, music, and an additional button for further programming. Menu select buttons 960 may also be labeled A through J for the above programs, with the last button for all additional major menus labeled K-Z.

The layout of the user select buttons for the remote 900 have been designed to allow a user to select an appropriate button without viewing the remote by using the layout of buttons shown in FIGS. 12*a* and 12*b*, in conjunction with textured or beveled buttons. With this "eye-off-of-the-remote" construction, most of the frequently used buttons may be located by the sense of touch alone. However, to aid selection of an appropriate button visually, certain buttons may have different colors. For example, the menu select buttons 960 may all be of a color different from the rest of the buttons on the remote 900. Additionally, the colors should be selected to provide for easy location and identification by a user. For example, if the icons are printed in black ink, yellow menu select buttons 960 are preferred, because yellow would provide the greatest visual contrast with the black ink.

Although remote 900 is described with a variety of channel selection buttons, nearly all buttons from a standard remote control (section 920 buttons) could be eliminated. The present invention would allow a subscriber to use a remote control containing only menu select buttons and/or cursor movement and select buttons.

The power button 924 and "go" button 975 preferably have a separate color from the other buttons on the remote 900. The power button 924 is preferably a separate color because this button is used infrequently. The power button is placed out of a user's thumb's reach so it is not accidentally depressed. The power button 924 should be distinguished from the other buttons because a television viewer must locate this button first before viewing any programming. Similarly, the "go" button 975 is used often because it provides the means for a user to select options, and thus should be easily distinguished from the other buttons.

Pay television buttons 980 may also be assigned a color different from the other buttons on the remote 900. By making the pay television buttons 980 a different color, it would help a user to avoid selecting an undesired pay television program.

As used herein, "button" is contemplated to include all manner of switches or touch sensitive circuitry to activate a particular function in the remote control unit 900. Additionally, although the remote control unit 900 communicates with the set-top box by means of infrared transmission, other forms of communication are contemplated, including ultrasound, radio frequency and other electromagnetic frequency communication.

Figure 13:
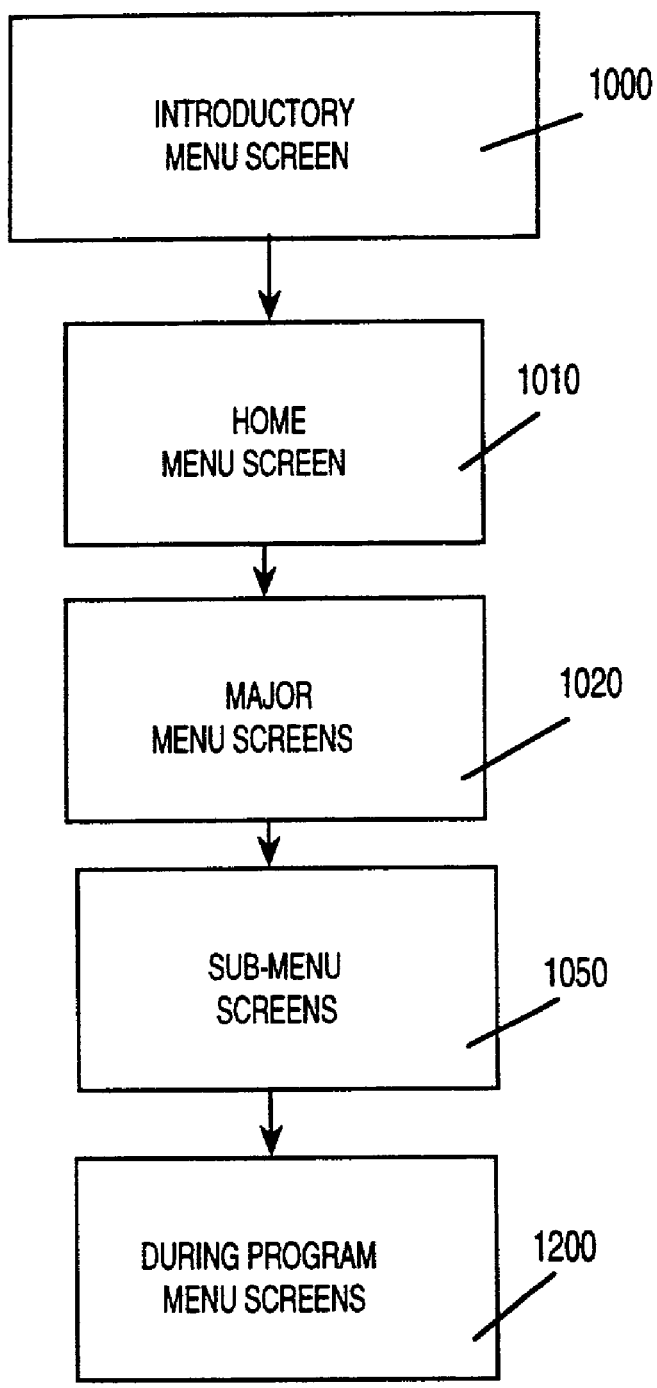
FIG. 13 is a flow chart of the progression of primary menus in the menu driven system of the set top terminal.

FIG. 13 shows the basic structure of the program menu system. Although the term "menus" has been used above, the menus could also be seen as defining zones or categories of programming. The first series of menus, Introductory menu 1000, Home menu 1010, Major Menus 1020, and Submenus 1050 execute subscriber program selection inputs. The During program menus 1200 provide a subscriber with additional features or options after a program has been selected and shown. There are two primary types of During program menus 1200, Hidden Menus 1380 and Program Overlay Menus. Both are described in the following text and figures. The menu sequence and each menu structure has been particularly program designed using the "eye-off-the-remote" design concept. A subscriber can easily navigate through the menu system with the cursor movement and "go" buttons 970, 975. Since the subscriber never needs to take his eye off the television screen, the cable operator is likely to have the subscriber's complete attention.

The introductory menu screen 1000 automatically appears upon power-up and initialization of the set top terminal 220. The introductory menu screen 1000 welcomes the user to the cable system and provides important announcements or messages. In addition, the introductory menu 1000 can be used to inform the subscriber if he has a personal or group message that has been sent to his set top terminal 220 by the cable headend. The subscriber may then access the personal or group message with an appropriate key entry while viewing the introductory menu 1000. Since the introductory menu 1000 must be viewed by each subscriber, it also provides an opportunity for the cable provider to run advertisements.

Following the introductory menu screen 1000 the subscriber will normally be advanced to the home menu screen 1010. The home menu 1010 is the basic menu that the subscriber will return to make his first level of viewing decisions. From the home menu 1010, the subscriber is able to access all television programming options. Some programming options may be accessed through cursor movement on the screen, others directly by a button selection on the remote control 900, or both, on-screen selection and remote control 900 direct access.

In the normal progression through the menu screens, the subscriber will be forwarded to a major menu screen 1020 that correlates to his direct remote control 900 selection or selection from the home menu screen 1010. The selections on the home menu 1010 are for large categories of programming options and therefore the major menu 1020 allows the subscriber to further refine his search for the television program of his choice.

Following the major menu 1020 the subscriber will navigate through one or more submenu screens 1050 from which he will choose one particular program for viewing. For most programming selections the user will proceed from the home menu 1010 to a major menu 1020 and then to one or more submenus 1050. However, for certain programming options or functions of the set top terminal 220 the user may skip one or more menus in the sequence. For example, in the preferred embodiment the subscriber may directly access a major menu 1020 by pressing a single icon button. In an alternative embodiment, the introductory menu 1000 will provide the user with the capability of directly accessing information on his cable television account without proceeding through a series of menus.

The series of menus shown in FIG. 13 is the normal or standard format for a variety of alternative embodiments to the present invention. An introductory screen upon power up that contains important messages, followed by a home menu 1010 with major programming categories is the basis upon which many alternative embodiments of the menu driven selection process can be built.

Skipping a sequence or level of the menu structure is possible and perhaps desired in certain instances. In simple alternate embodiments it is possible to combine the home menu 1010 and introductory menu 1000 into one menu that performs both functions. It will be obvious to one skilled in the art that the specific functions of the Home menu 1010 and Introductory menu 1000 may be exchanged or shared in a number of ways. It is also possible to allow a user to skip directly from the introductory menu 1000 to a submenu 1050. This can be accomplished most easily with a separate direct access remote control 900 button. Generally, a subscriber will access a television program through execution of a submenu 1050.

The During program menus 1200 are enacted by the set top terminal 220 only after the subscriber has selected a television program. These menus provide the subscriber with additional functionality and/or additional information while he is viewing a selected program. The During program menus 1200 sequence can be further subdivided into at least two types of menus, Hidden Menus 1380 and Program Overlay Menus 1390.

To avoid disturbing a subscriber during viewing of a program, the Hidden Menus 1380 are not shown to the subscriber but instead "reside" at the set top terminal 220 microprocessor. The Hidden Menus 1380 do not effect the selected program audio. The microprocessor awaits a button entry either from the remote 900 or set top terminal 220 buttons before executing or displaying any Hidden Menu options. The Hidden Menus 1380 provide the subscriber with additional functions such as entering an interactive mode or escaping from a selected program.

Program Overlay Menus 1390 are similar to Hidden Menus 1380 in that they occur during a program. However, the Program Overlay Menus 1390 are overlayed onto portions of the television screen and not hidden. The Program Overlay Menus 1390 allow the subscriber to continue to watch the selected television program with audio but place additional information on portions of the television screen. Most overlays cover small portions of the screen allowing the subscriber to continue to comfortably view his program selection. Other Overlays which are by their nature more important than the program being viewed will overlay onto greater portions of the screen. In the preferred embodiment, some Program Overlay Menus 1390 reduce or scale down the entire programs video screen and redirect the video to a portion of the screen.

All menu entries may be made either from buttons available on the top cover of the set top terminal 220 or from the remote 900.

Figure 14A:
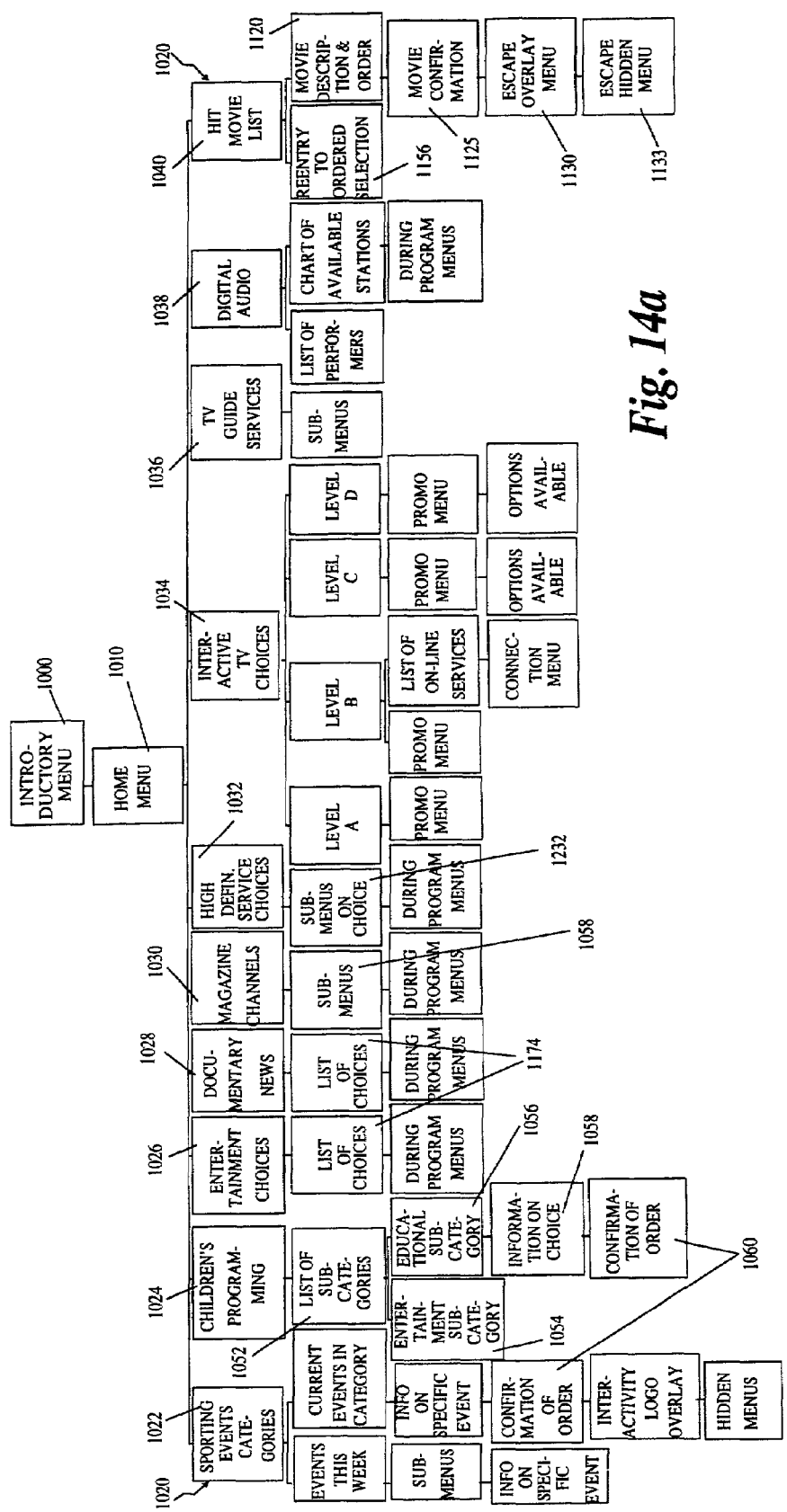
FIG. 14a is a drawing of the basic menus used in the present invention, including the ten major menus represented by icons.
Figure 14B:
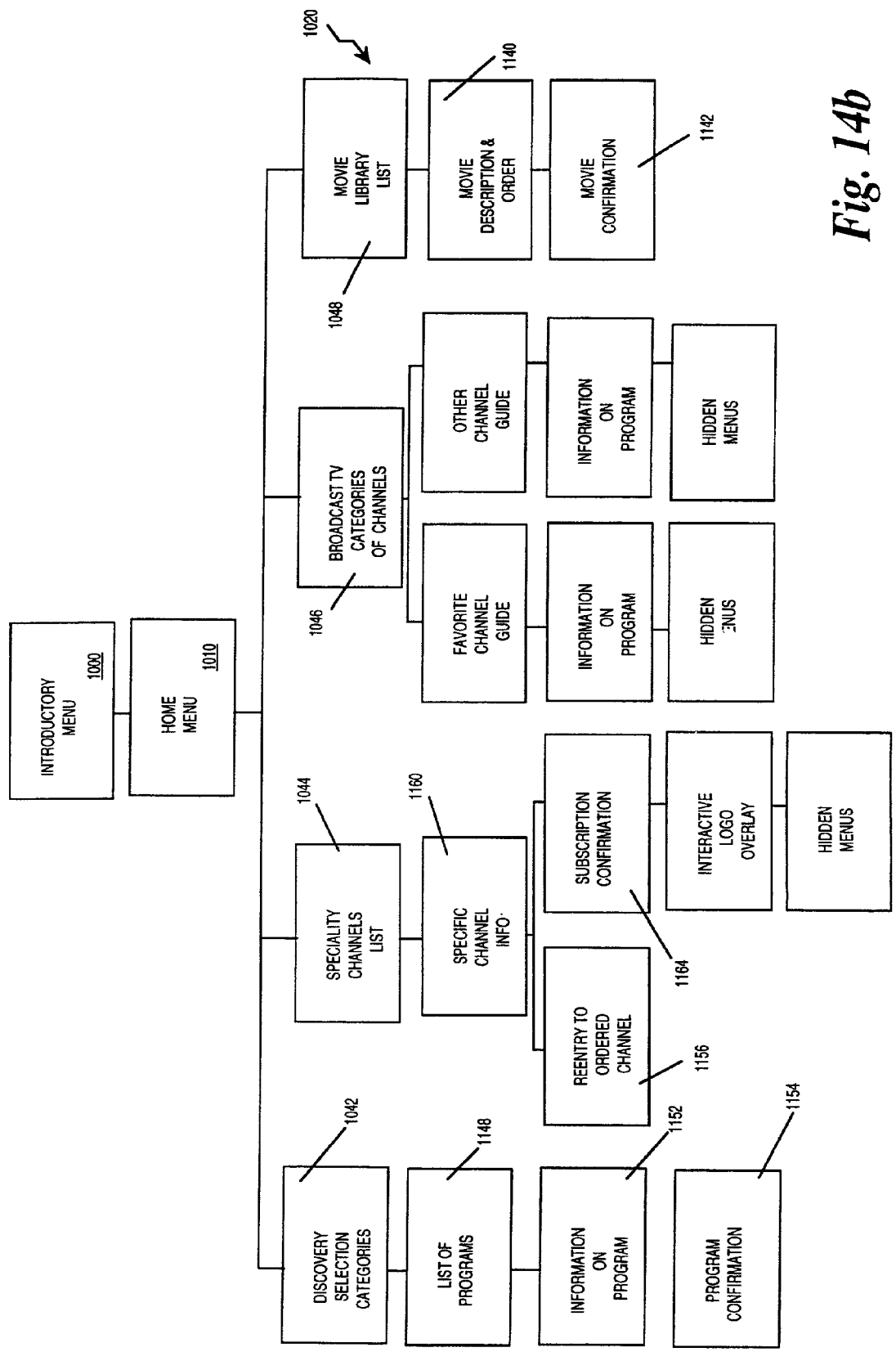

FIG. 14*a* shows the preferred embodiment for subscriber selection of television programming. FIG. 14*b* shows additional major menu 1020 categories, 1042, 1044, 1046, 1048, which may be used with the invention. Again, the introductory menu 1000 followed by the home menu 1010 is the preferred sequence of on-screen displays. In the preferred embodiment shown in 14*a*, the home menu 1010 provides a choice of ten major menus 1022, 1024, 1026, 1028, 1030, 1032, 1034, 1036, 1038, 1040. Upon selection of a major menu 1020 category from the home menu 1010, the program proceeds to a major menu 1020 offering further viewer selections. Each major menu 1020 is customized to target the expected viewership. Depending on the number of available program choices the major menus 1020 either breakdown the major category into sub-categories or provide the subscriber with access to further information on a particular program.

For example, the major menu 1020 for children's programming provides a list of subcategories 1052 from which the subscriber selects. Upon selection of a subcategory a submenu 1054, 1056 listing program choices within that subcategory is shown to the subscriber. Upon selection of a particular programming choice within the first submenu 1050, the subscriber is then provided with a second submenu 1058 describing the program that the subscriber has selected. From this menu, the subscriber may now confirm his program choice and receive a confirmation submenu 1060 from the set top terminal 220 software.

Since the system utilizes digital signals in compressed format, High Definition Television programming can also be accommodated through the menu system. In addition, since the set top terminal 220 has two way communication with the cable headend, interactive television programming is possible, with return signals generated by the set top terminal 220. Similarly, the system can support "movies on demand" where a subscriber communicates through the set top terminal 220 with an automated facility to order movies stored at the facility.

Using this on-screen menu approach to program selection, there is nearly an unlimited number of menus that can be shown to the subscriber. The memory capability of the set top terminal 220 and the quantity of information that is sent via the program control information signal are the only limits on the number of menus and amount of information that can be displayed to the subscriber. The approach of using a series of menus in a simple tree sequence is both easy for the subscriber to use and simply implemented by the set top terminal 220 and remote control device 900 with cursor movement. A user interface software programmer will find many obvious variations from the preferred embodiment shown.

Figure 15A:
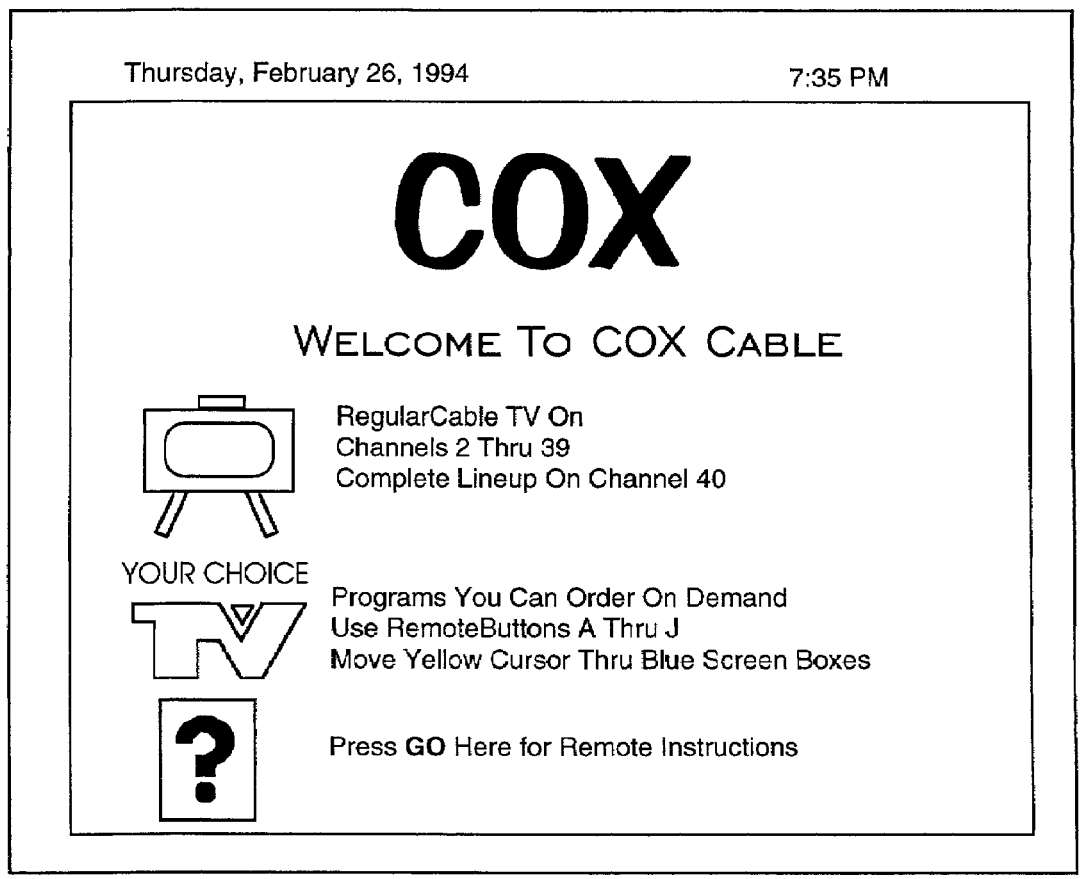
FIGS. 15a-15b are drawings of introductory menus.
Figure 15B:
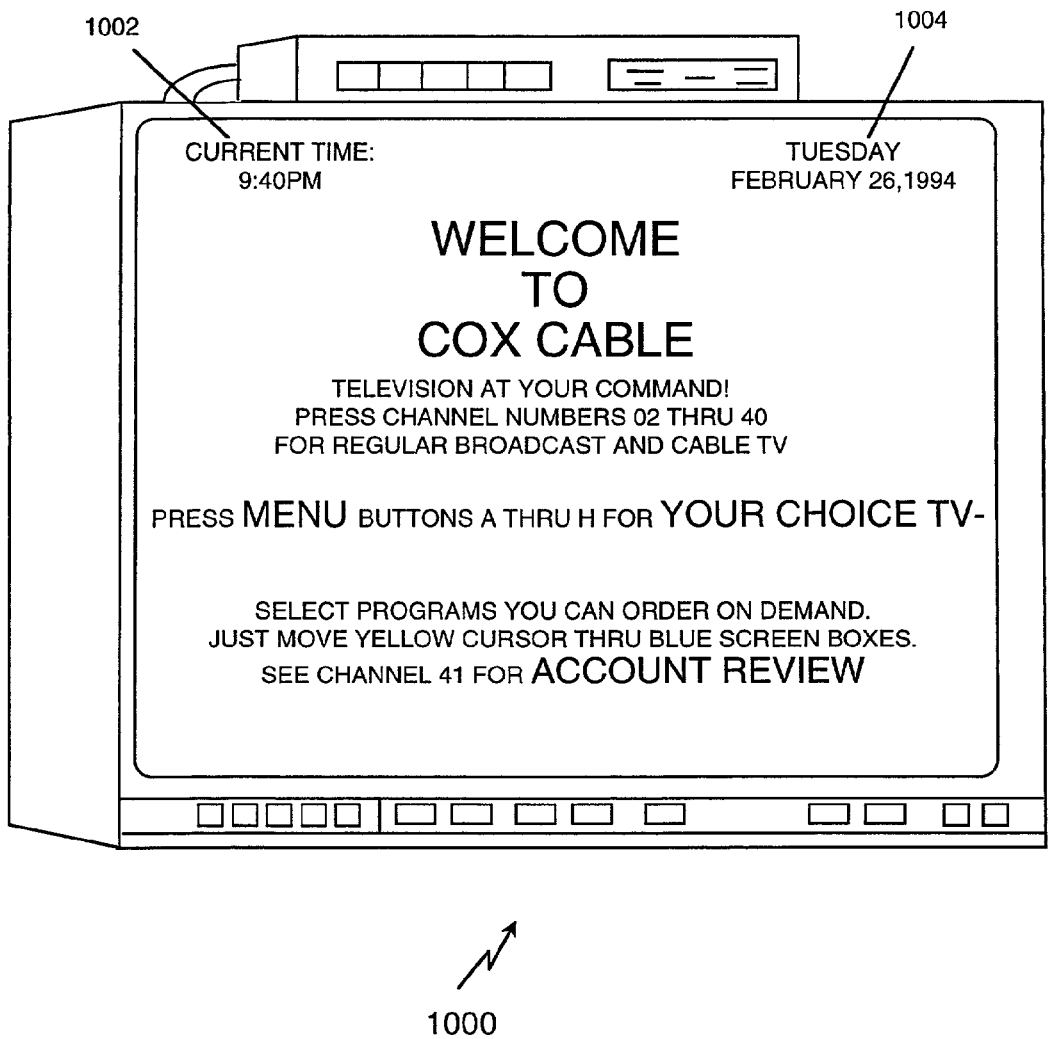

FIGS. 15*a* and 15*b* show examples of introductory menu screens that are displayed on the subscriber's television. FIG. 15*a*, the preferred embodiment, welcomes the subscriber to the cable system and offers the subscriber three options. The subscriber may choose regular cable television (channels 2 through 39), programs on demand (e.g., movies), or instructions on the use of the remote control 900. Other basic program options are possible on the introductory menu screen 1000. For example, instead of, or in addition to, the remote control 900 instructions, a system "help" feature can be offered on the introductory menu 1000.

FIG. 15*b* shows an alternate embodiment for the introductory menu screen 1000. In the upper left-hand corner of the menu, there is a small window 1002 that may be customized to the subscriber. A subscriber will be given the option of showing the current time in this window. In the upper right-hand corner a second customized window 1004 is available in which a subscriber may show the day and date. These windows may be easily customized for subscribers to show military time, European date, phase of the moon, quote of the day, or other informational messages. These windows may be customized by subscribers using on-screen menu displays following the introductory menu 1000.

In the preferred embodiment, the subscriber is given the capability of accessing base channels such as regular broadcast TV and standard cable channels directly from the introductory menu 1000 by entering the channel number. The subscriber is also given the capability of directly accessing his account with the cable company. Further, in the preferred embodiment, the subscriber may directly access a major menu 1020 and bypass the home menu screen 1010. If the subscriber is familiar with the programming choices available on the major menus 1020, he may select an icon button 960, or a lettered key (alpha key) from his remote control 900 and directly access the desired major menu 1020. If any key entry other than those expected by the set top terminal 220 software program is made, the home menu 1010 is placed on the television screen. In addition, after a period of time if no selections are made from the introductory menu 1000, the program may default to the home menu screen 1010.

Figure 16A:
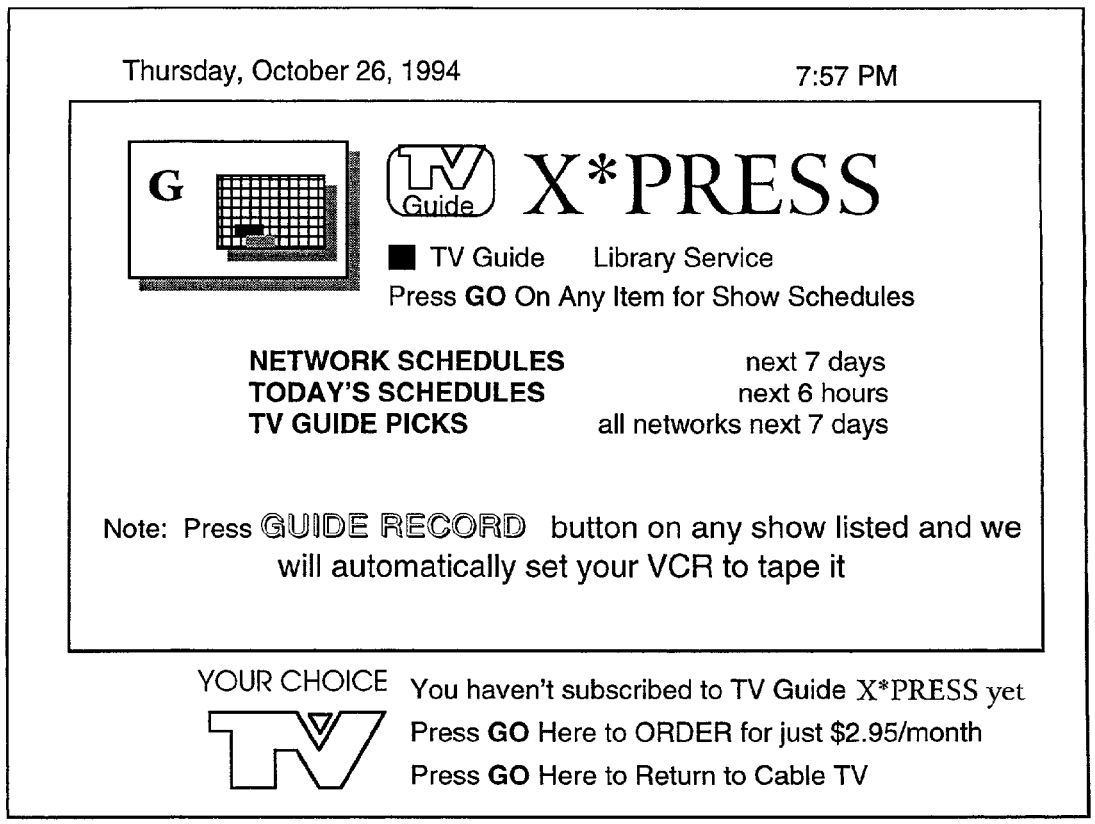
Figure 16C:
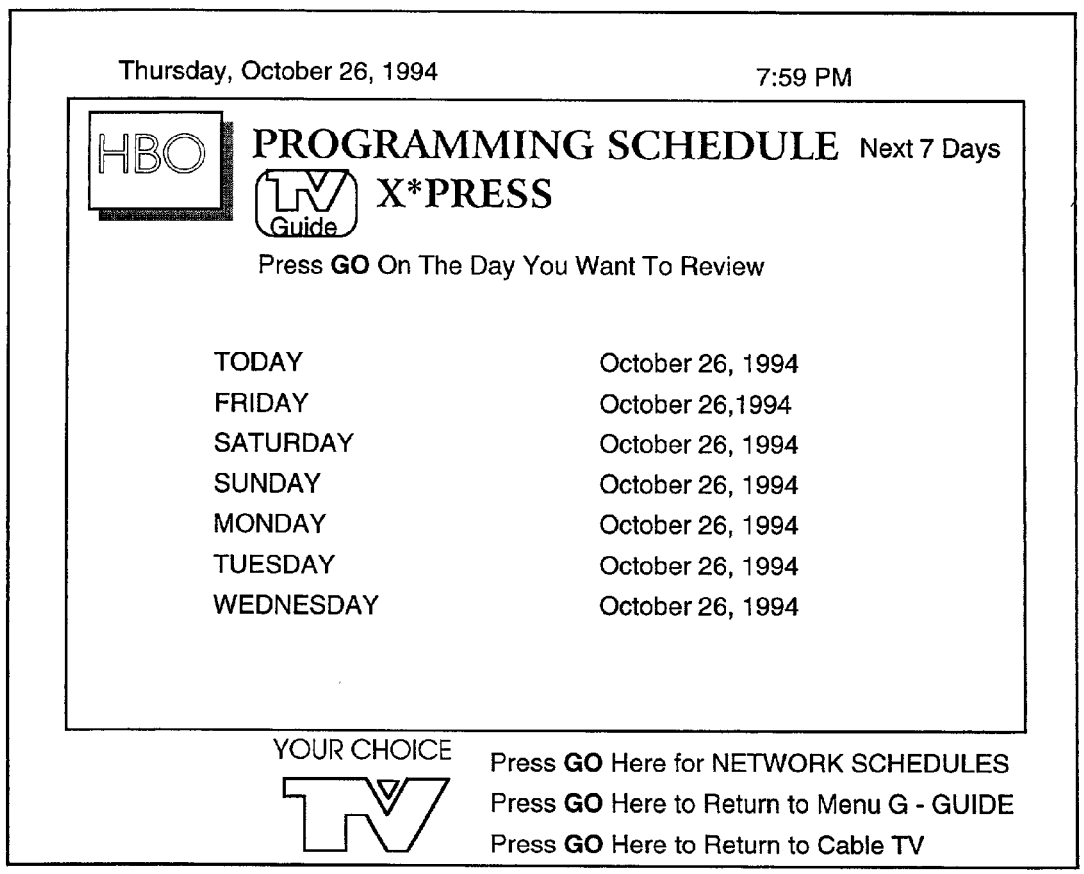
Figure 16D:
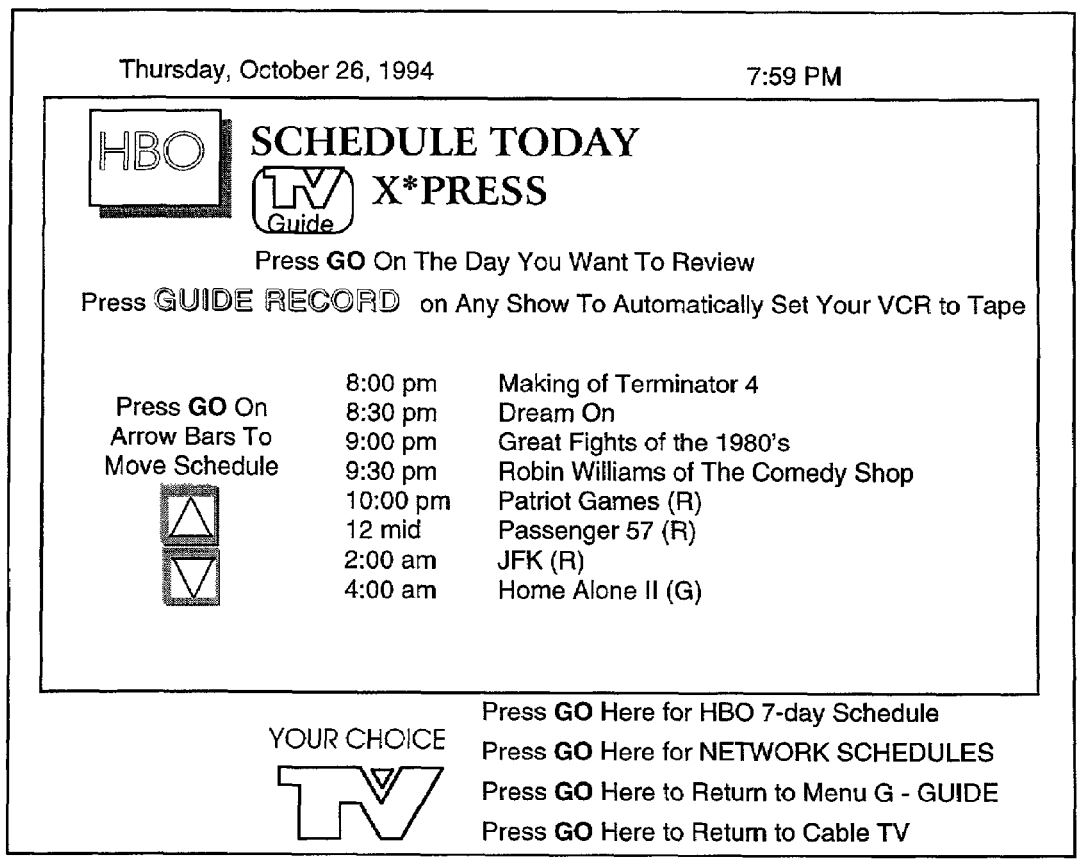

In the preferred embodiment, TV guide services, listing programs available on network schedules, will be available on a major menu, as shown in FIG. 16a. In the preferred embodiment, the major TV guide menu 1036 would offer submenus, such as network schedules for the next seven days, today's network schedules for the next six hours, and TV guide picks for the next seven days. If the particular set top terminal 220 has been subscribed to the TV guide service, the subscriber may proceed to a submenu showing schedules of programs. If the subscriber chooses the network schedule submenu 1236, he is offered a list of network schedules to choose from as shown in FIG. 16b. If a subscriber were to choose, for instance, HBO, the submenu 1238 shown in FIG. 16c would appear. This submenu allows a subscriber to choose the program date that interests him. Following selection of a date, the subscriber is shown a more specific submenu 1242 listing programs available on the particular date as shown in 16d.

Figure 16E:
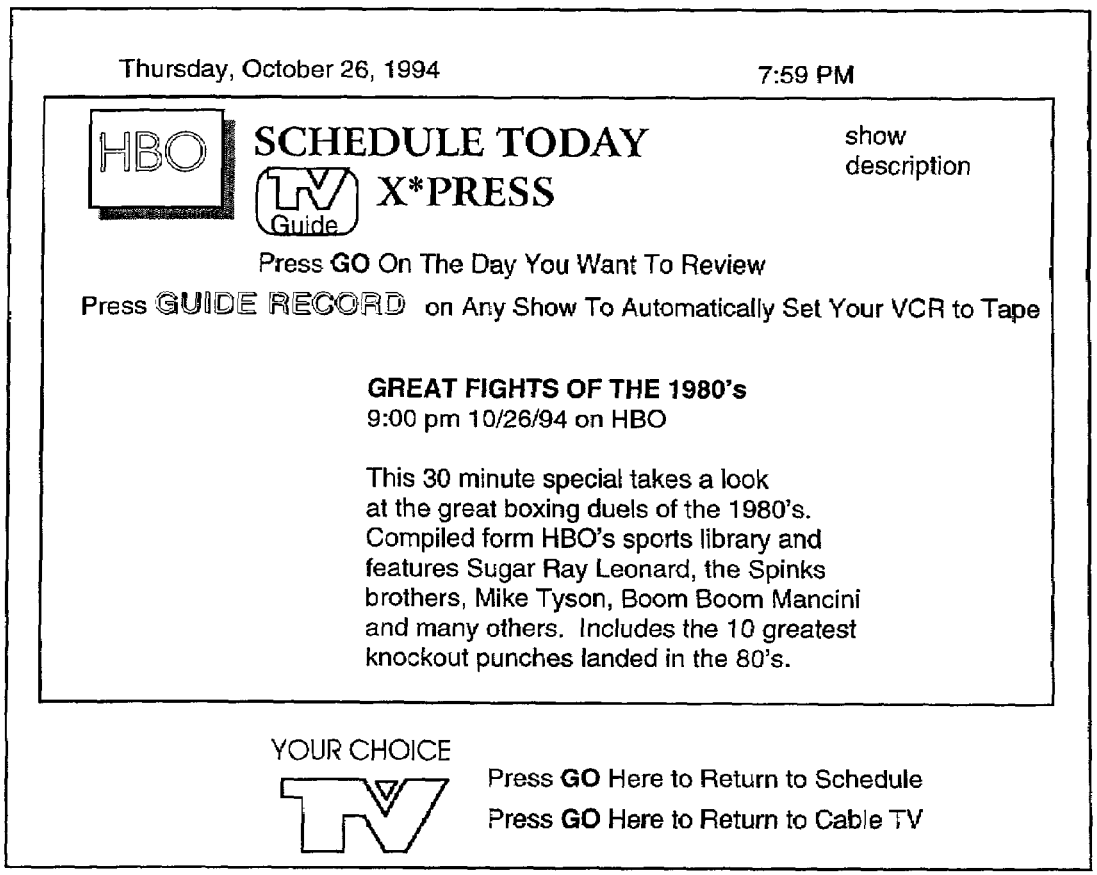

Following a program choice, a program description submenu 1244 is placed on the television screen as shown in FIG. 16e. In addition, from this program description submenu, the viewer may choose to record the selected program on his VCR using the guide record feature.

Figure 17C:
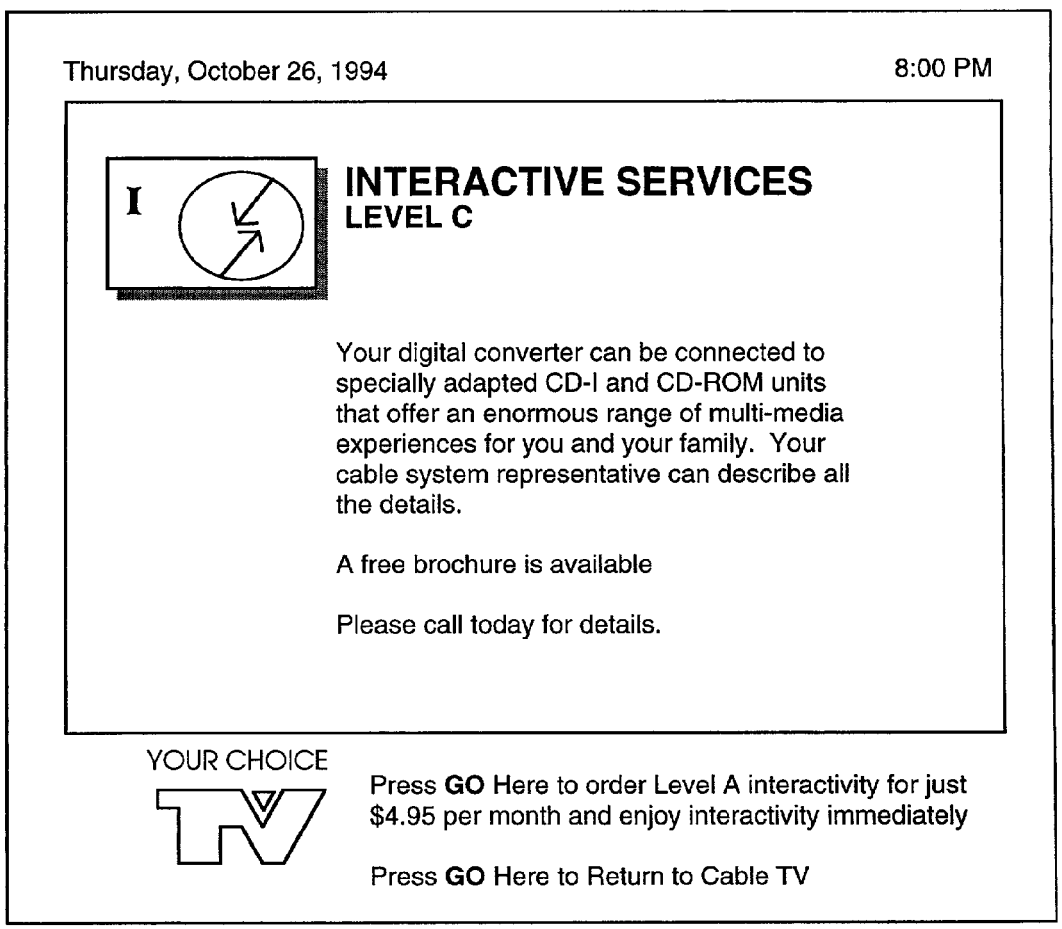

FIGS. 17a, 17b, and 17c demonstrate the use of promotional menus to sell subscriptions to services in the system. In particular, FIG. 17a is a promotional menu 1304 for Level A interactive services. Level A interactive services offers subscribers additional information about programs such as quizzes, geographical facts, etc. This information may be received by the set top terminal 220 in several data formats including VBI and in the program control information signal. FIG. 17b is a promotional menu 1306 for Level B interactive services which include a variety of on-line type services such as Prodigy, Yellow Pages, Airline Reservations, etc.

FIG. 17c is a promotion menu 1308 for the Level C interactive services. The Level C interactive services utilize local storage such as CD technology to offer an enormous range of multi-media experiences. The Level C interactive services require a hardware upgrade as described earlier. Specially adopted CD-I and CD-ROM units are needed for this service.

FIGS. 17d through 17j show menus that are available using the interactive Level A services. When interactive Levels A services are available in a television program, the system will display the interactive logo consisting of the letter "I" and two arrows with semicircular tails. In the preferred embodiment the set top terminal 220 will place the interactive logo on the television screen as an overlay menu 1310. In the preferred embodiment, the set top terminal 220 will detect that there is data or information available about a television program which can be displayed to a subscriber using the interactive service. When the set top terminal 220 senses that there is interactive information available, it will generate the interactive logo overlay menu and place it on the television screen. For example, the set top terminal 220 will detect that information on a television program is being sent in the vertical blanking interval (VBI) and generate an interactive logo overlay menu which will appear on the subscriber's television screen for approximately fifteen seconds during each ten minute interval of programming.

Figure 17D:
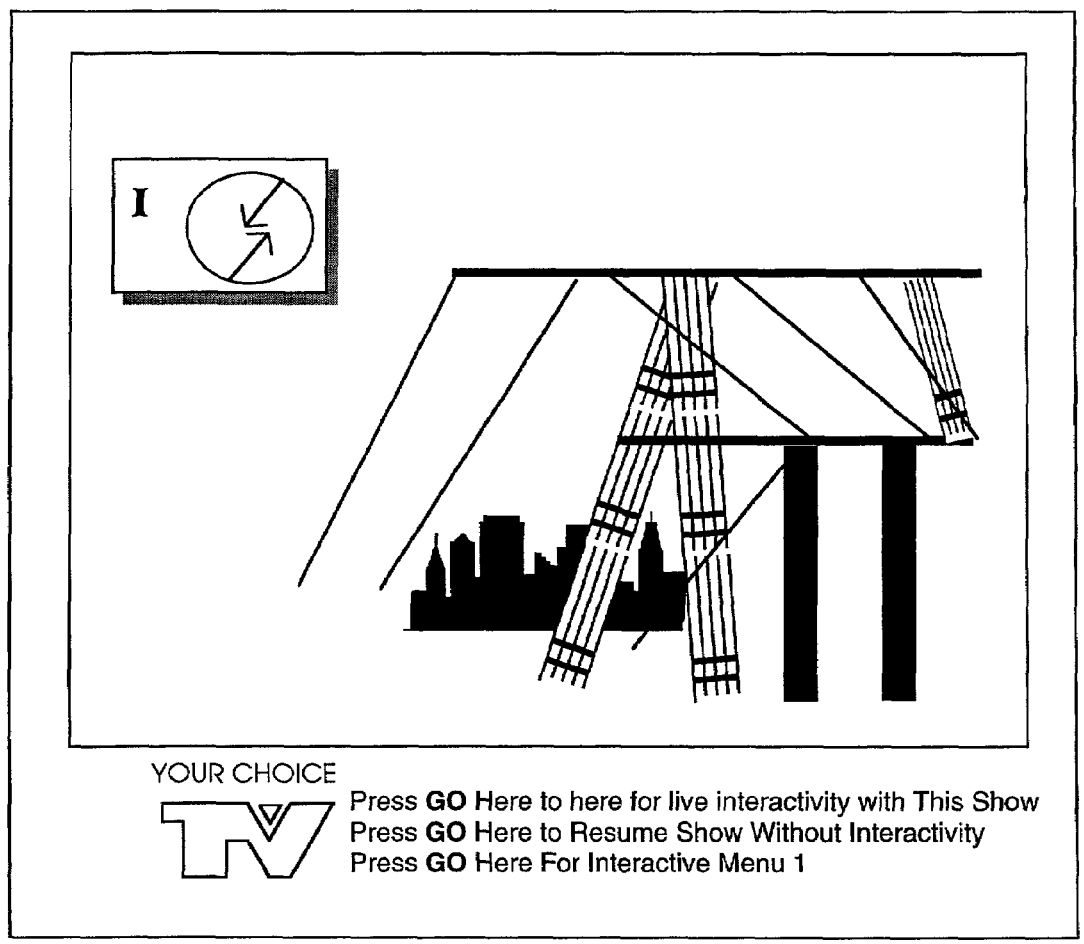

When the subscriber sees the interactive logo on his television screen, he is made aware of the fact that interactive services are available in conjunction with his television program. If the subscriber presses his interactive remote control button, an additional overlay menu will be generated by the set top terminal 220 and placed on the screen. This menu 1310 is shown in FIG. 17d being overlayed on an interactive television program. From this menu the subscriber may select interactive features or return to the television program without interactive features.

Figure 17E:
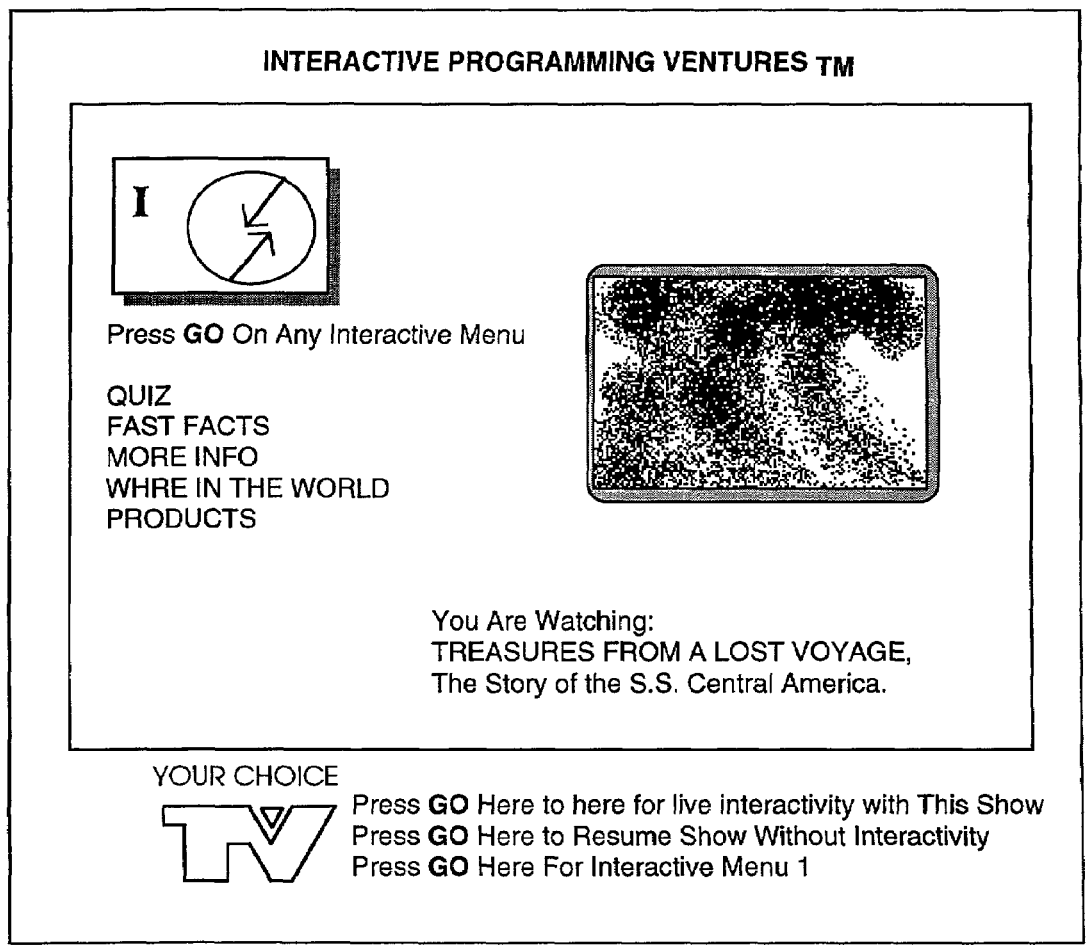

If the subscriber selects interactive features he will be presented with the interactive Level A submenu 1312 in FIG. 17e. From this submenu the subscriber may choose a variety of different types of textual interactivity with the current television program. Some examples are quizzes, fast facts, more info, where in the world, products, etc. At any time during the interactive submenus the user may return to the television program without interactive features.

This interactive submenu has an example of taking a complete television program video, scaling it down to a smaller size and directing the video into a video window of a submenu.

Figure 17F:
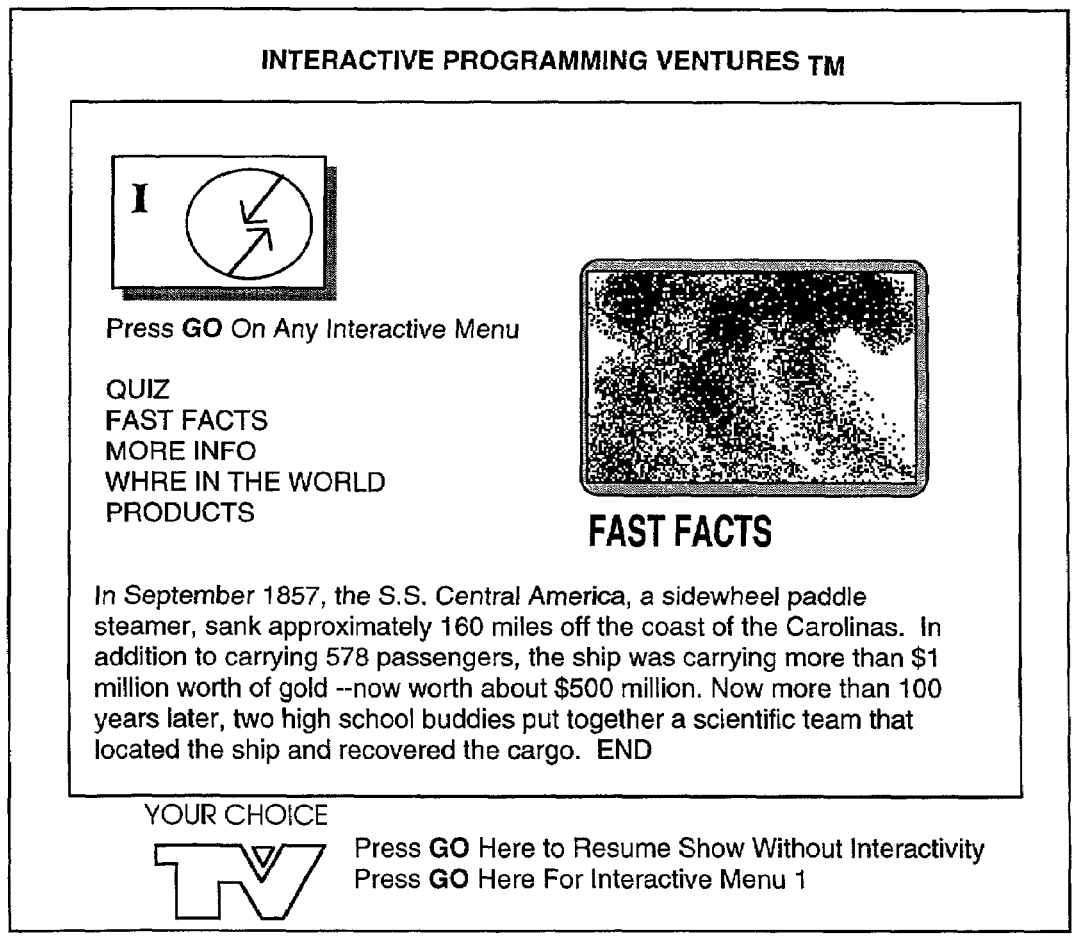

FIG. 17f shows an interactive fast facts submenu 1314. In this submenu textual information is given to the subscriber in the lower half of his screen. This textual information will change as additional data is received by the set top terminal 220 relating to this television program.

Figure 17G:
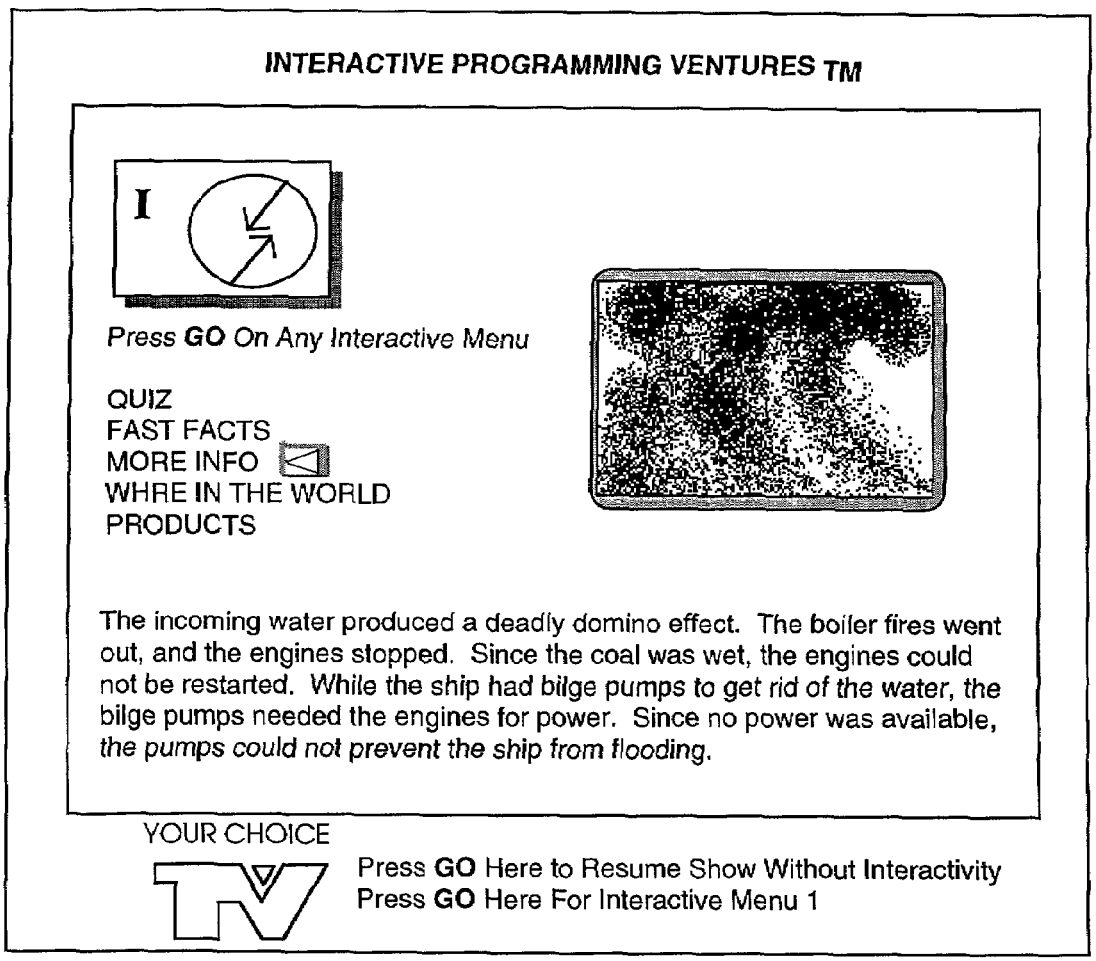
Figure 17H:
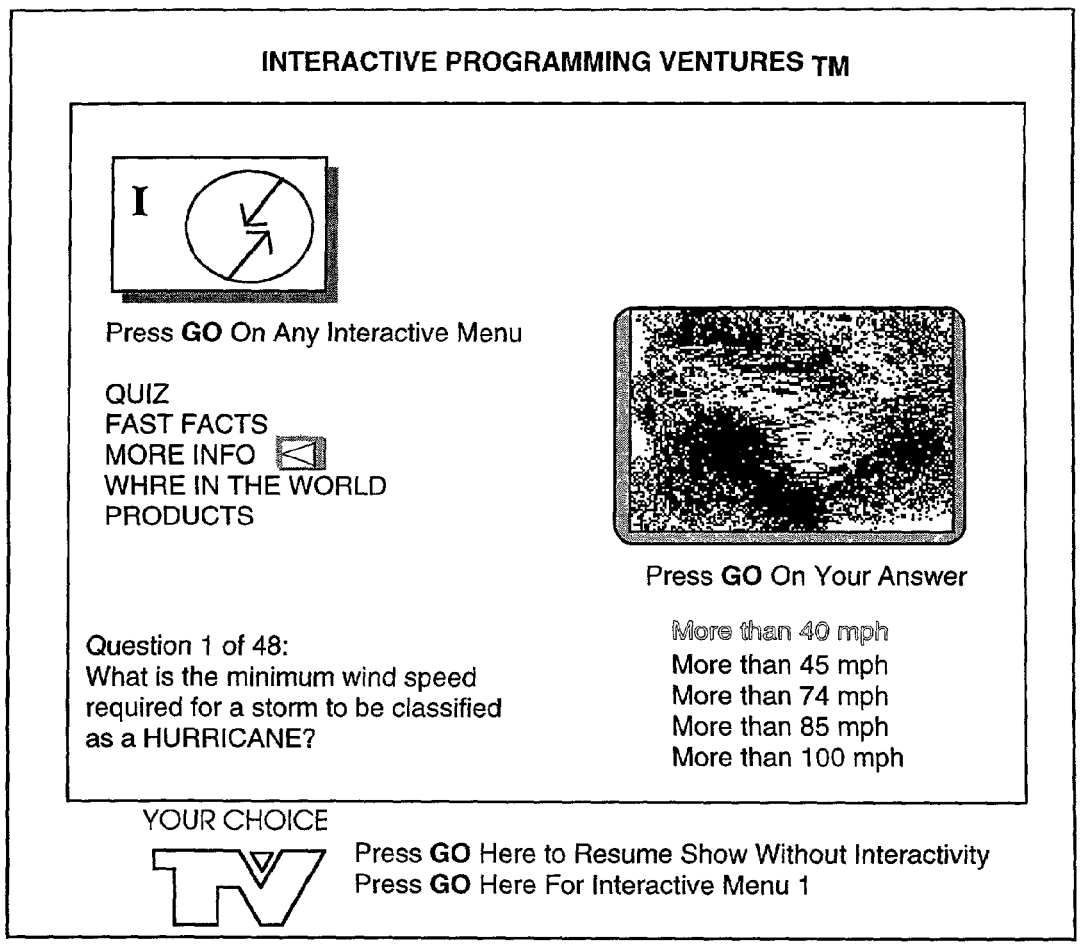
Figure 17I:
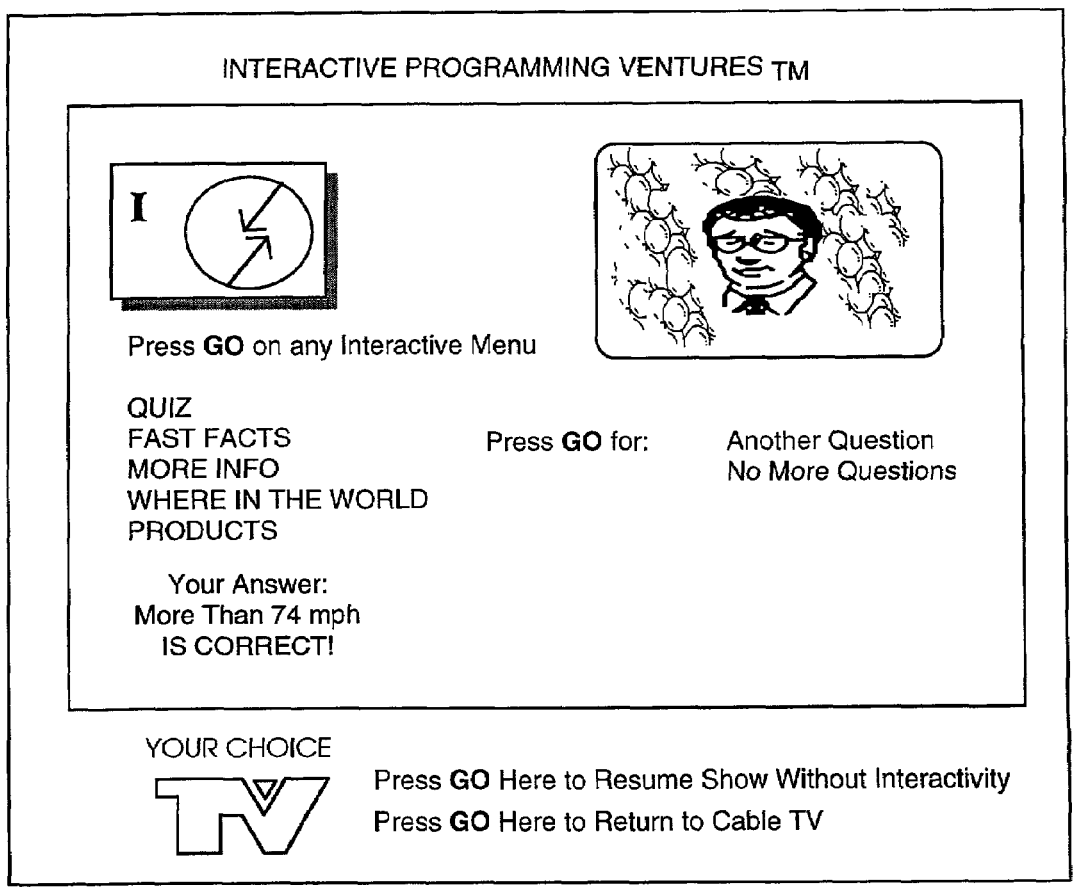

FIG. 17g shows the use of the subcategory "more information" in the interactive service. This submenu 1316 gives additional information related to the television program to the viewer in textual form in the lower half of the screen. FIG. 17h is an interactive submenu 1318 for the subcategory "quiz." In this interactive subcategory, the user is presented with questions and a series of possible answers. If the subscriber desires, he selects one of the answers to the quiz question. After his selection, the set top terminal 220 sequences to another menu. The set top terminal 220 sequences to the interactive quiz answers submenu which informs the subscriber whether he has chosen the correct answer or not. FIG. 17i shows a correctly answered quiz question 1320 and FIG. 17j shows an incorrectly answered quiz question 1324. In the preferred embodiment, the menu graphics for both of these menus 17i and 17j is the same. The only difference is in the text which can be generated by the text generator of the set top terminal 220.

Figure 18A:
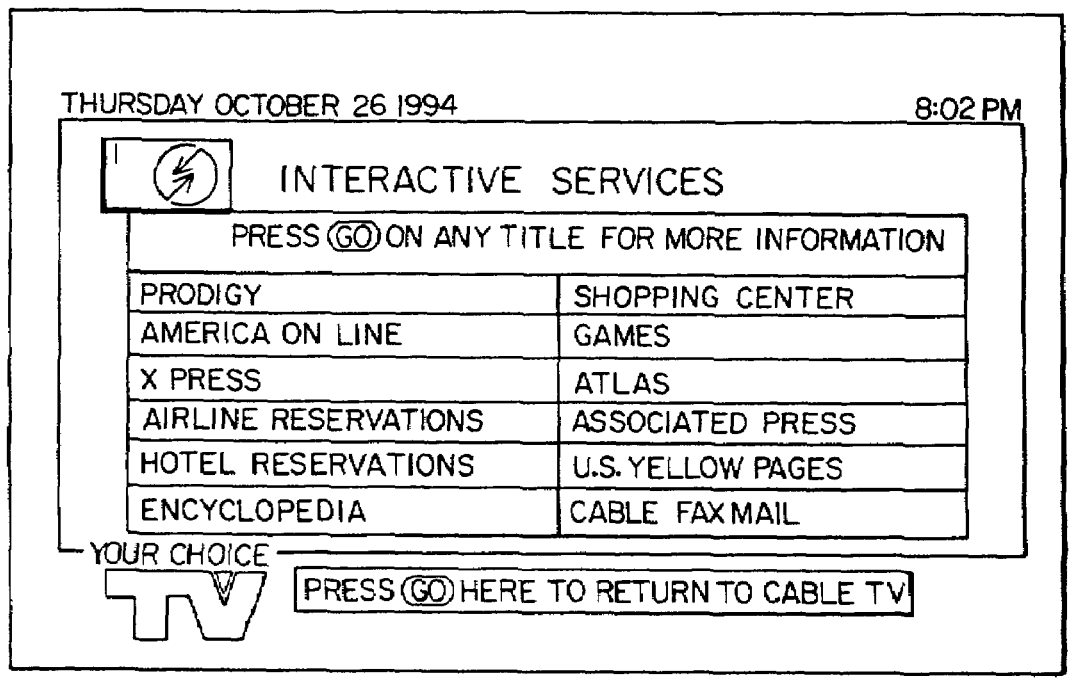

FIG. 18a is an example of a submenu for Level B interactive services. From this menu screen 1330, any of a number of on-line data services could be accessed. In FIG. 18a, the airline reservations selection has been selected by the subscriber.

Figure 18B:
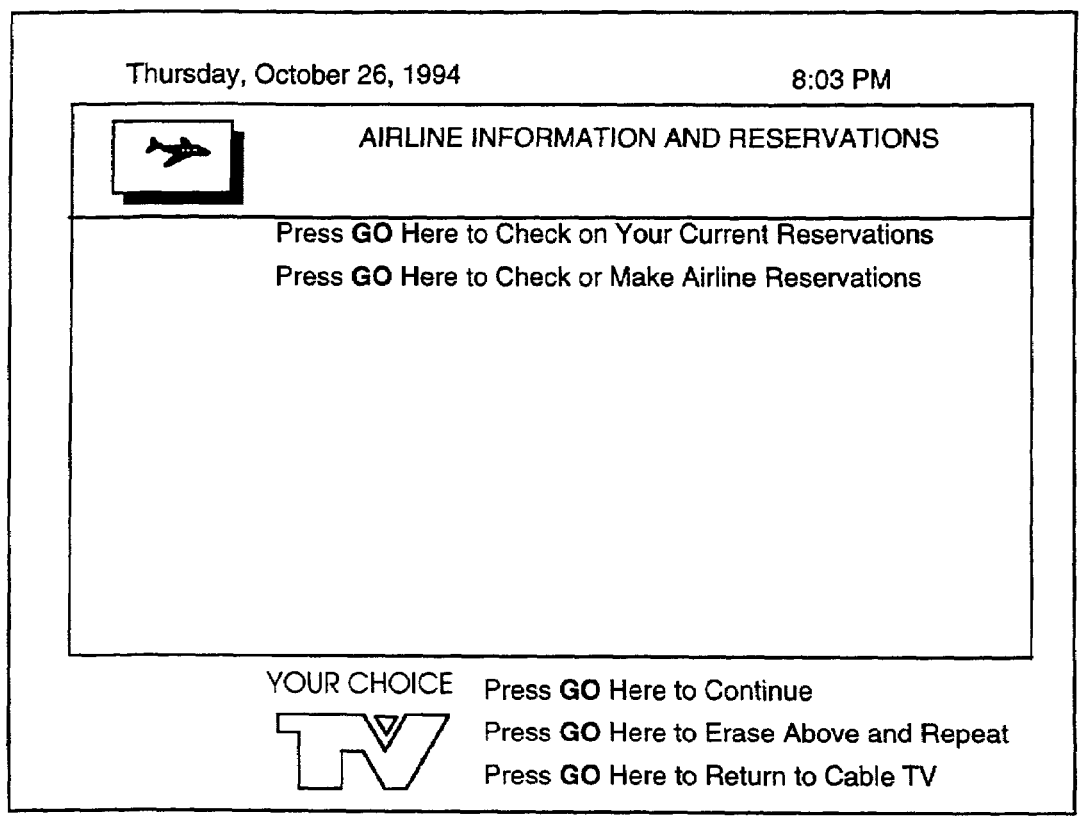
Figure 18C:
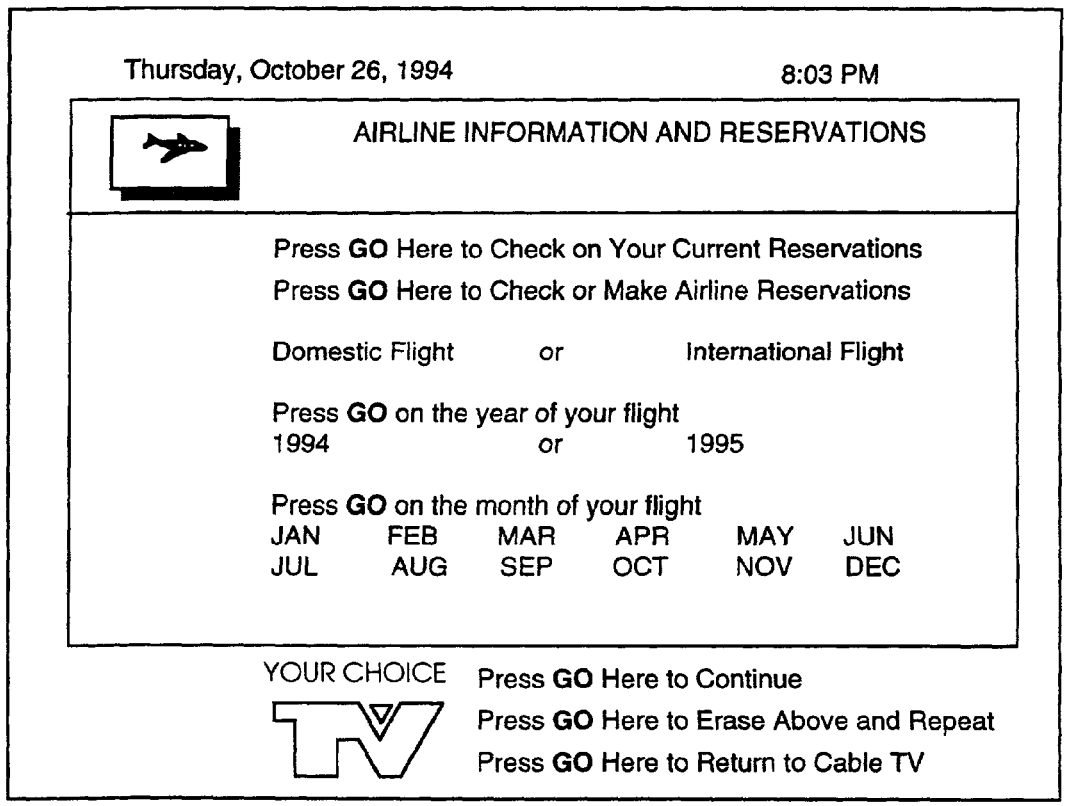

FIGS. 18a through 18l provide an example of a sequence of menus that a subscriber may encounter with an on-line data service. In particular, this example relates to airline information and reservations and the subscriber in this sequence is reserving and purchasing airline tickets. FIG. 18b is an example of the first submenu 1332 for a data service offering various options. In this case, the subscriber has the option of checking current reservations or making new reservations. In each of these submenus related to a data service, the subscriber is able to return to the home menu 1010 or regular cable TV and exit the data service. FIG. 18c requires the subscriber to enter information related to his airline reservation in this submenu 1334, such as: domestic or international flight, year of flight reservation, month of flight reservation.

Figure 18D:
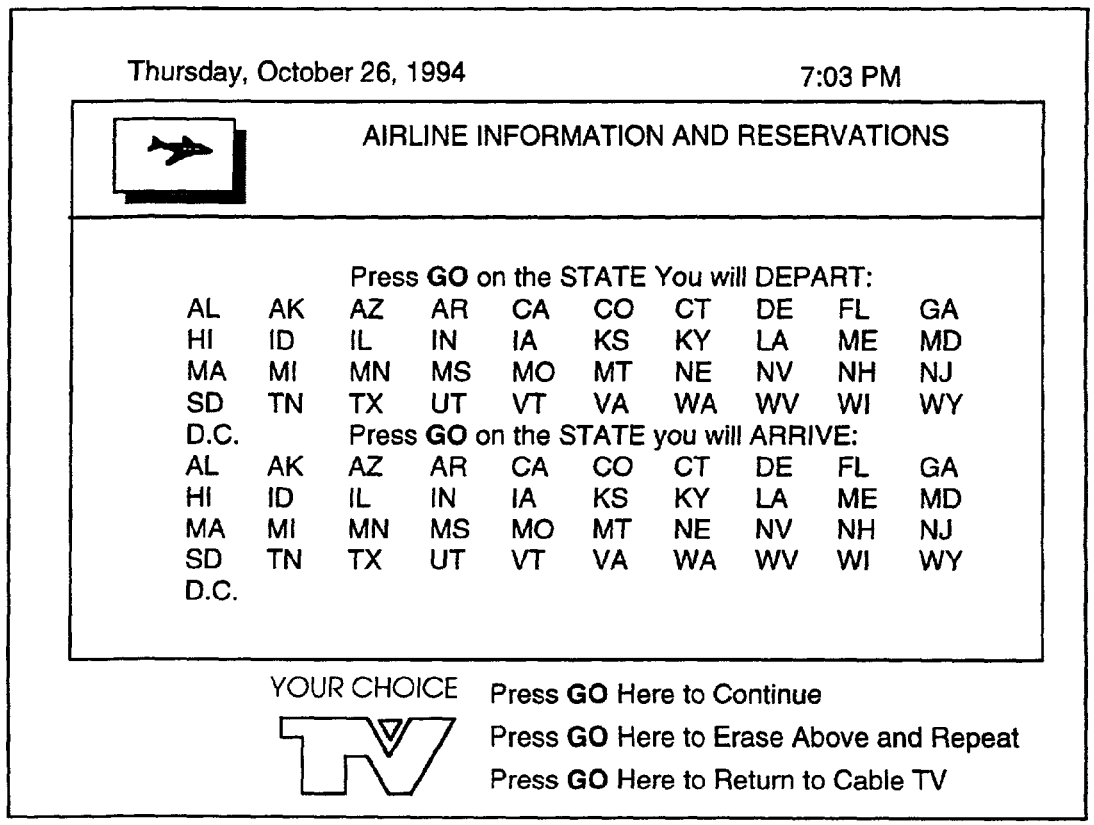

FIG. 18d is another submenu in the airline information and reservation data service. FIG. 18d provides an example of how the subscriber may choose among many options on a single screen 1336. In this manner, the preferred embodiment of the system can avoid the use of a separate keyboard for textual entry. Although a separate keyboard may be provided as an upgrade, it is an added expense which some subscribers may wish to avoid. FIG. 18d shows an "eye off the remote" approach to entering information. FIG. 18d allows the user to chose the State in which he will depart and the state in which he will arrive. The airline information reservation submenu 1338 shown in FIG. 18e allows a subscriber to choose the airports from which he will depart and arrive and also the approximate time period of his departure and his arrival. FIG. 18*f*, an airline information and reservation submenu 1340, allows a subscriber to view six available flights. A subscriber may select one of the flights to check on its availability.

Figure 18G:
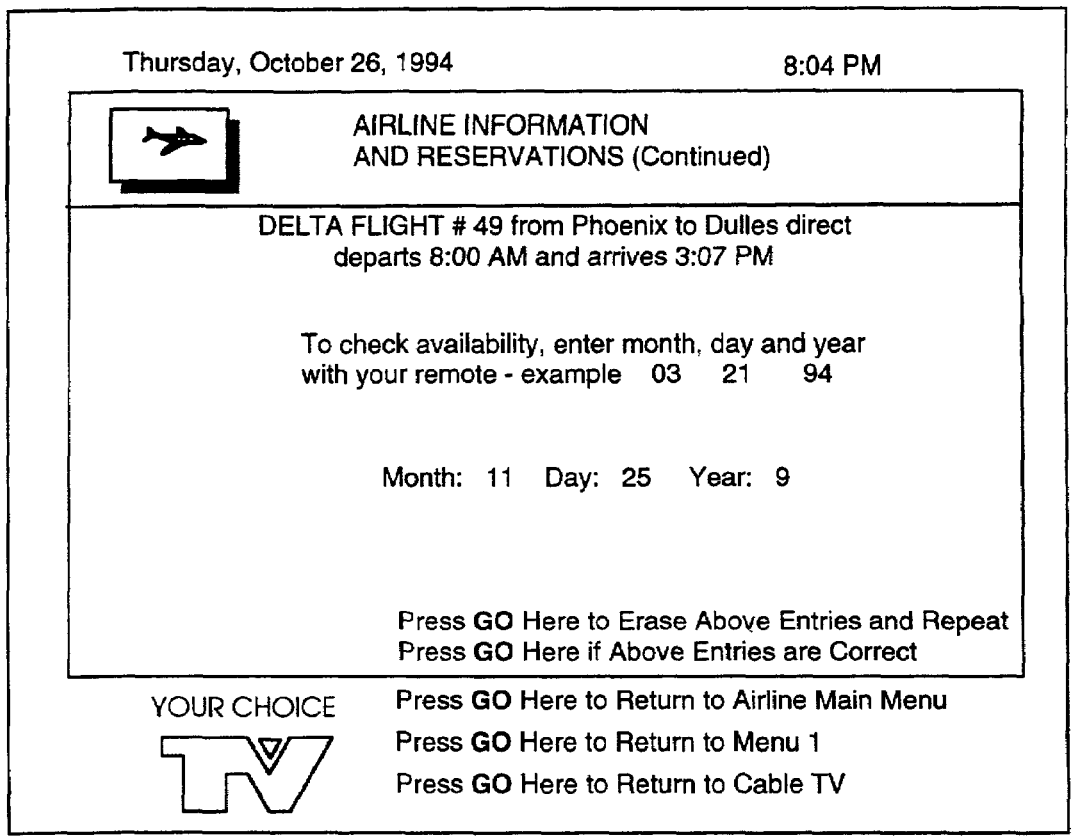

FIG. 18*g*, an airline information and reservation submenu 1342, allows a subscriber to enter the month, day and year for the availability date he desires. In this submenu, the subscriber is offered the option of correcting any errors in the entered information. This particular submenu is for a particular flight, including flight number.

Figure 18H:
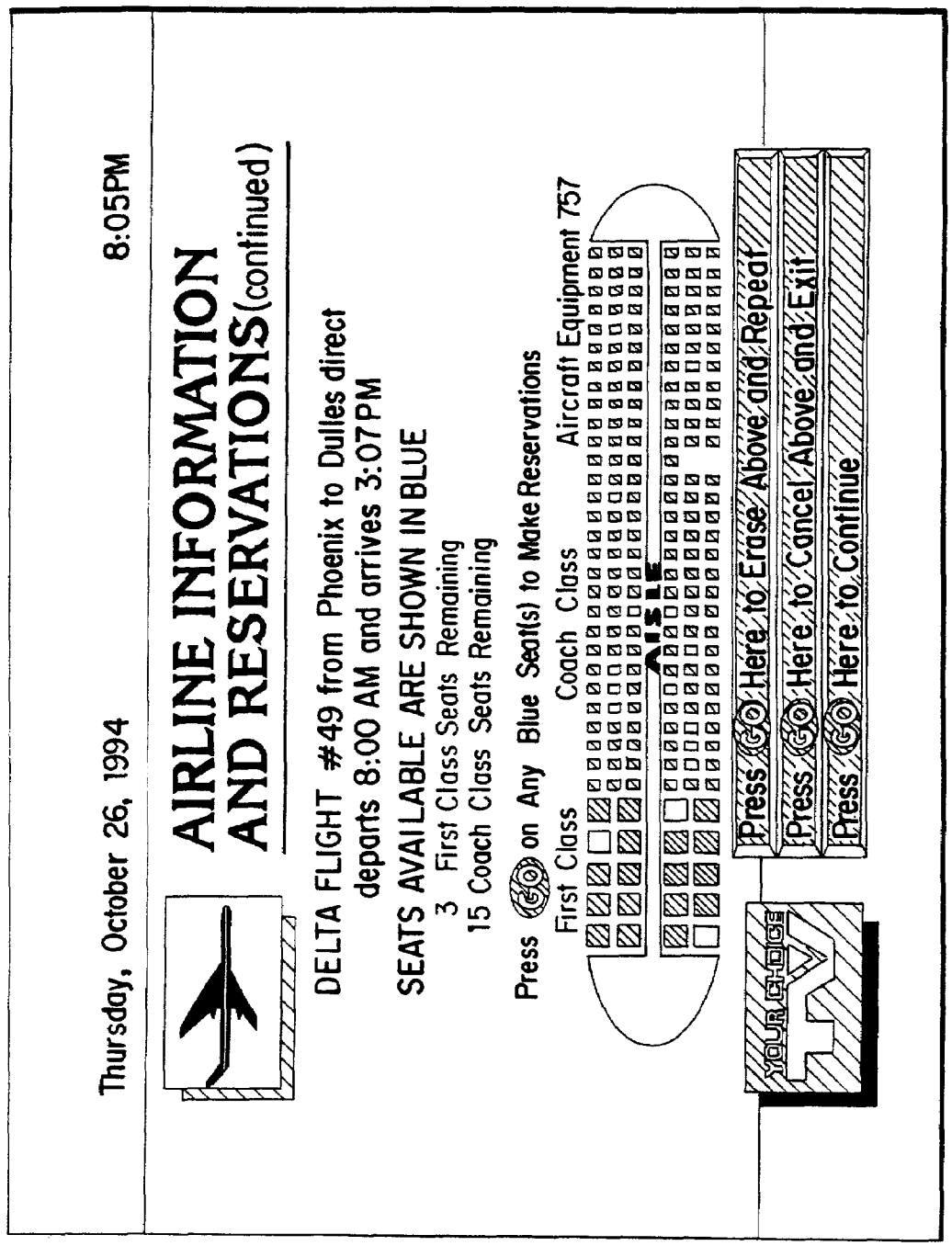

FIG. 18*h*, an airline information and reservation submenu 1344, allows a subscriber to view remaining seats available on a flight. From the menu, the subscriber may select his seat assignments. This submenu is an example of how information may be graphically shown to a subscriber using a portion of the menu and different coloring schemes. In this menu, the lower half of the screen shows the passenger compartment of an airplane with all the seat locations graphically represented by square blocks. By coloring the available seat locations in blue and the unavailable seat locations in a different color, the menu can present a great deal of information in a limited amount of space. This graphic presentation of information for the interactive on-line data services is an important method of visually displaying large amounts of information to the subscriber.

FIG. 18*i*, an airline information and reservation submenu 1346, allows the subscriber to choose a one-way or round-trip ticket and to confirm his reservations. If the subscriber desires to proceed, he may charge his airline ticket to his credit card by choosing the appropriate strip menu on the lower part of the screen.

Figure 18J:
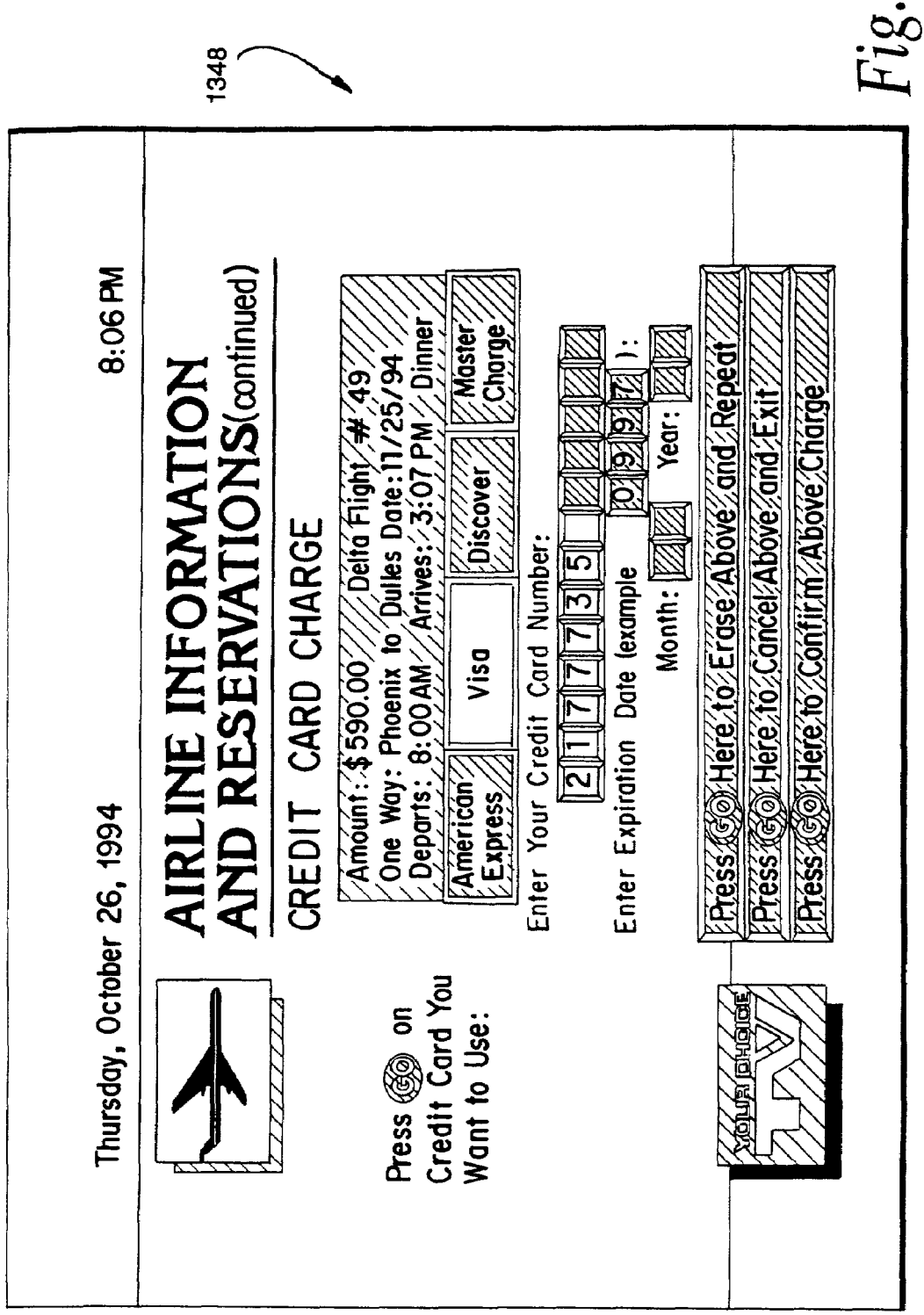

FIG. 18*j*, an airline information and reservation submenu 1348, is an example of how credit card purchases may be made using the interactive on-line data services. In this particular menu, the subscriber is charging a round-trip plane ticket on his credit card. The subscriber simply needs to enter his credit card number, expiration date, and credit card type to charge his airline ticket.

Figure 18K:
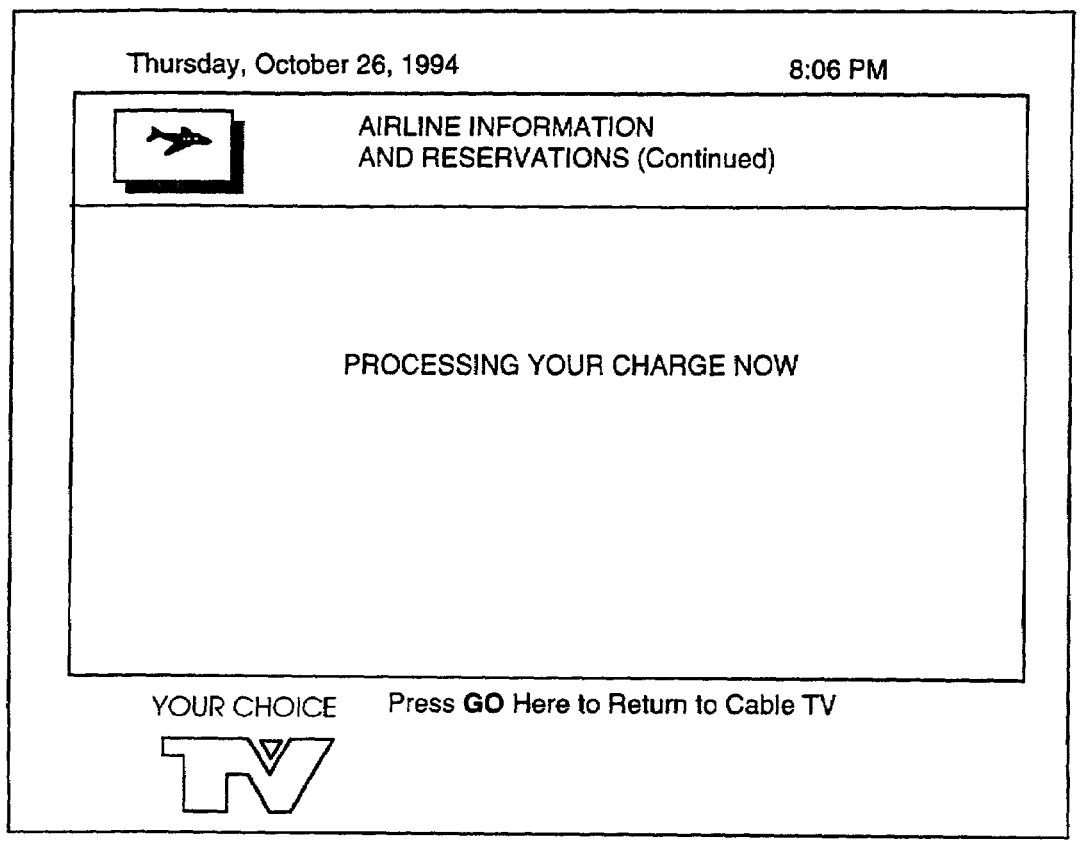

FIG. 18*k*, an airline information and reservation submenu 1350, is an example of a menu which may be shown whenever an on-line data service is processing a request sent by the subscriber. In this particular menu, the on-line data service is processing the subscriber's credit card charge for his airline ticket.

Figure 18L:
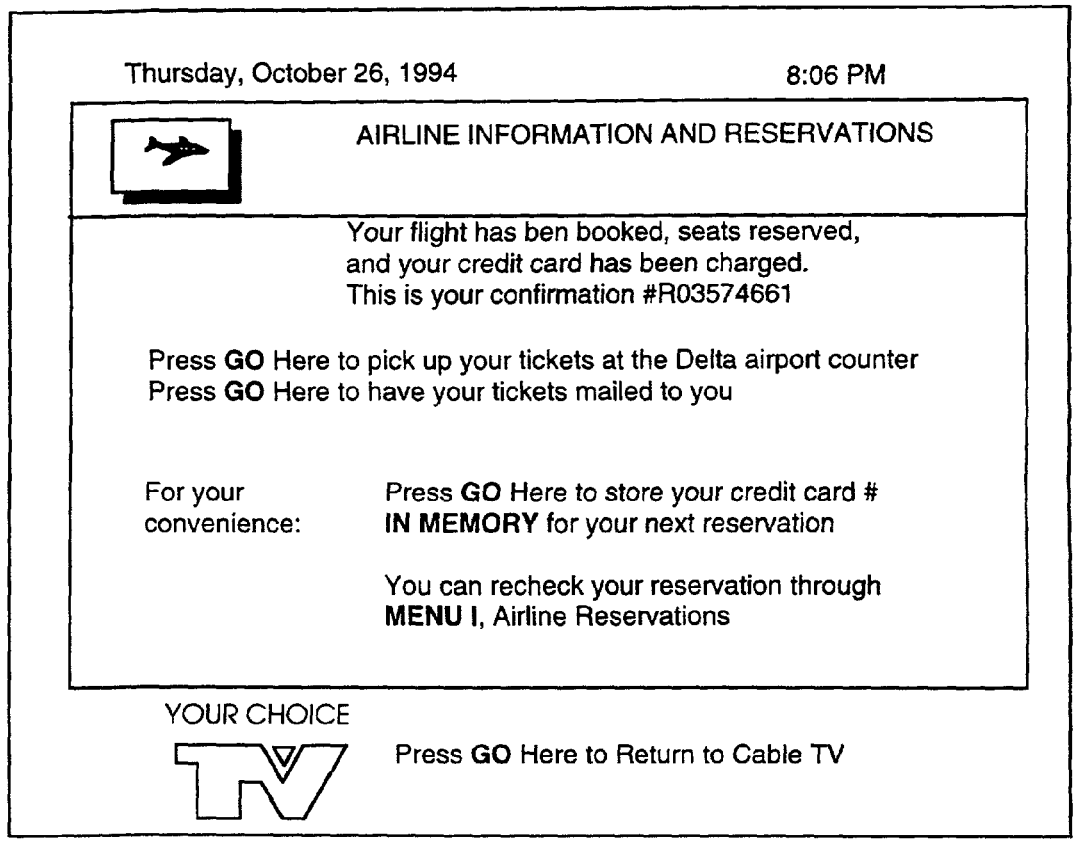

FIG. 18*l*, an airline information and reservation submenu 1352, confirms a subscriber's airline ticket purchase and passes on information on where the ticket may be picked up.

FIG. 19*a* is a major menu 1038 displaying the digital/audio program choices which are available for subscribers who have paid the monthly fee. In a chart format, the major menu shows the top five, top ten, and top forty songs available in six different categories of music. Below the chart, the system is able to provide a text message describing the particulars of the audio program selected.

The digital/audio feature of the invention allows a subscriber to listen to CD quality audio selections through his stereo. This can be accomplished by running cables directly from the set top terminal 220 to the subscriber's amplifier/stereo system. Alternatively, the user may listen to audio selections through his television system.

Figure 19C:
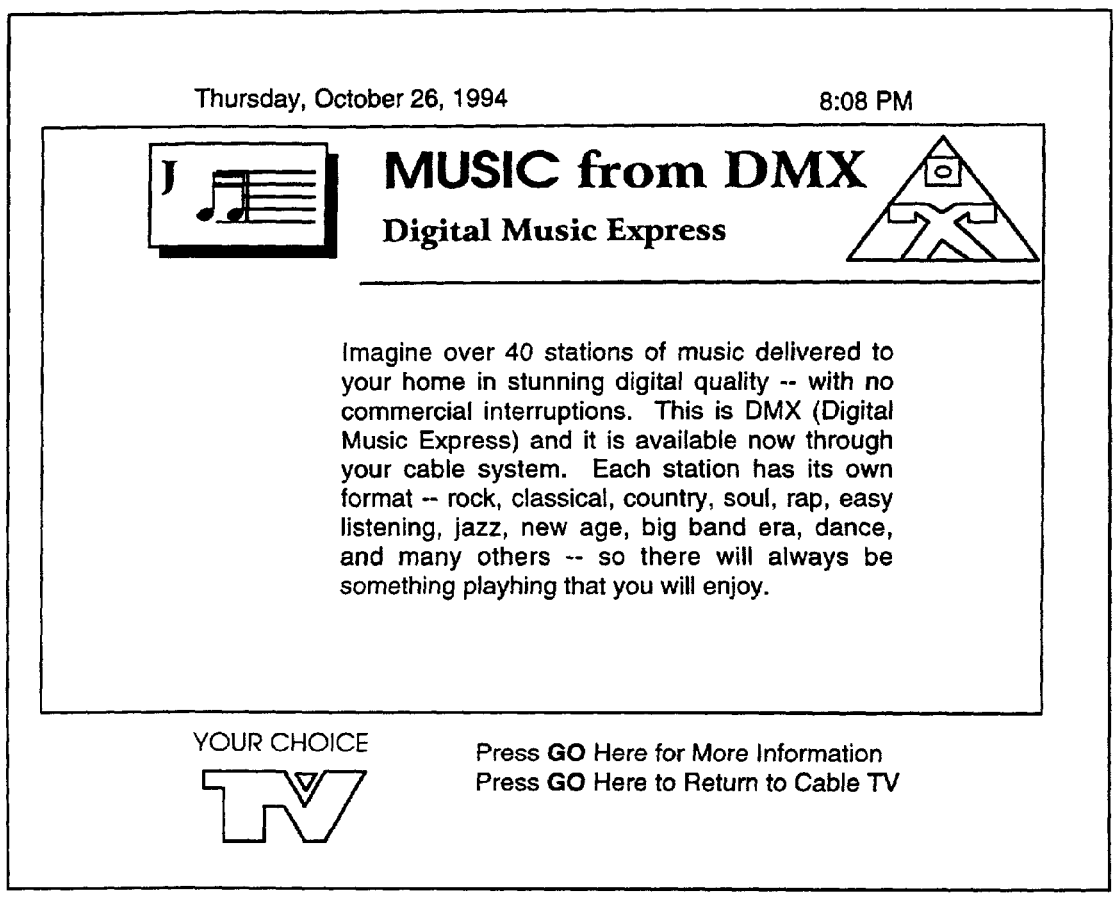
Figure 19E:
Figure 22:
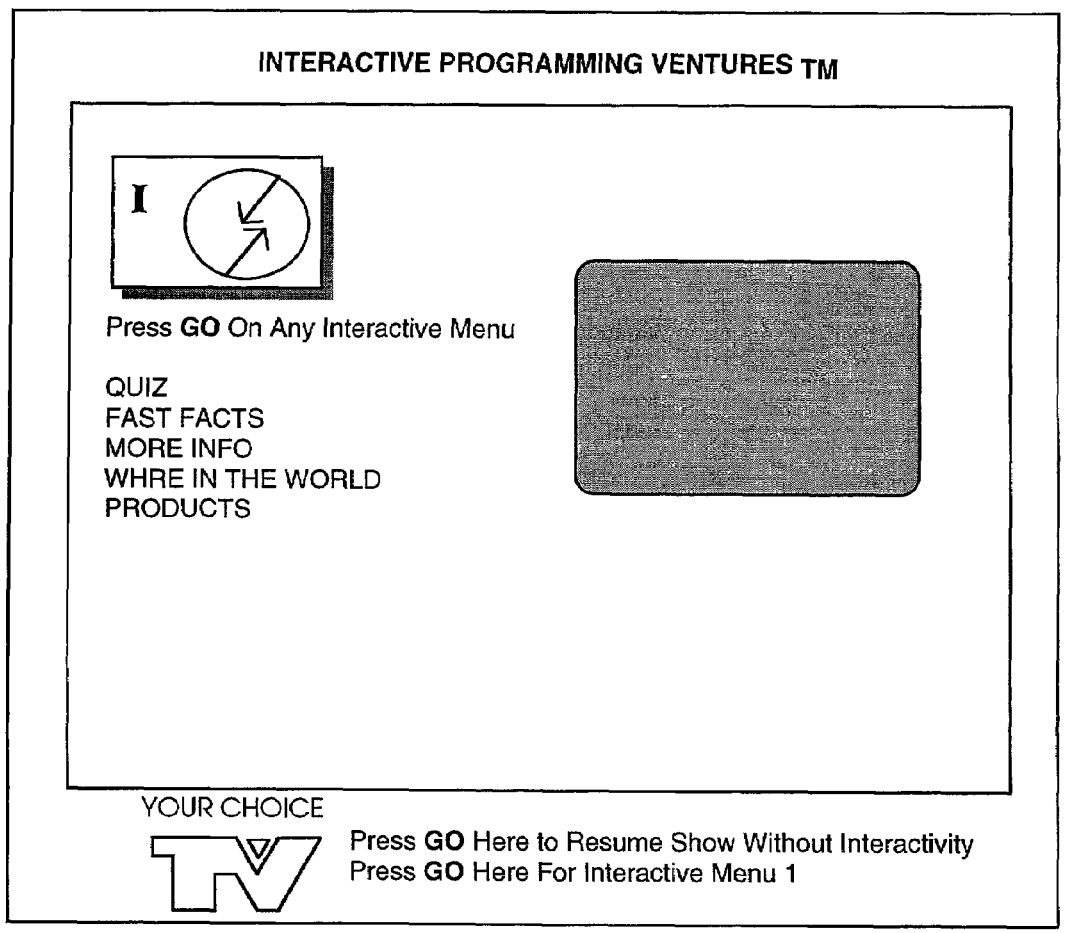
Figure 23:
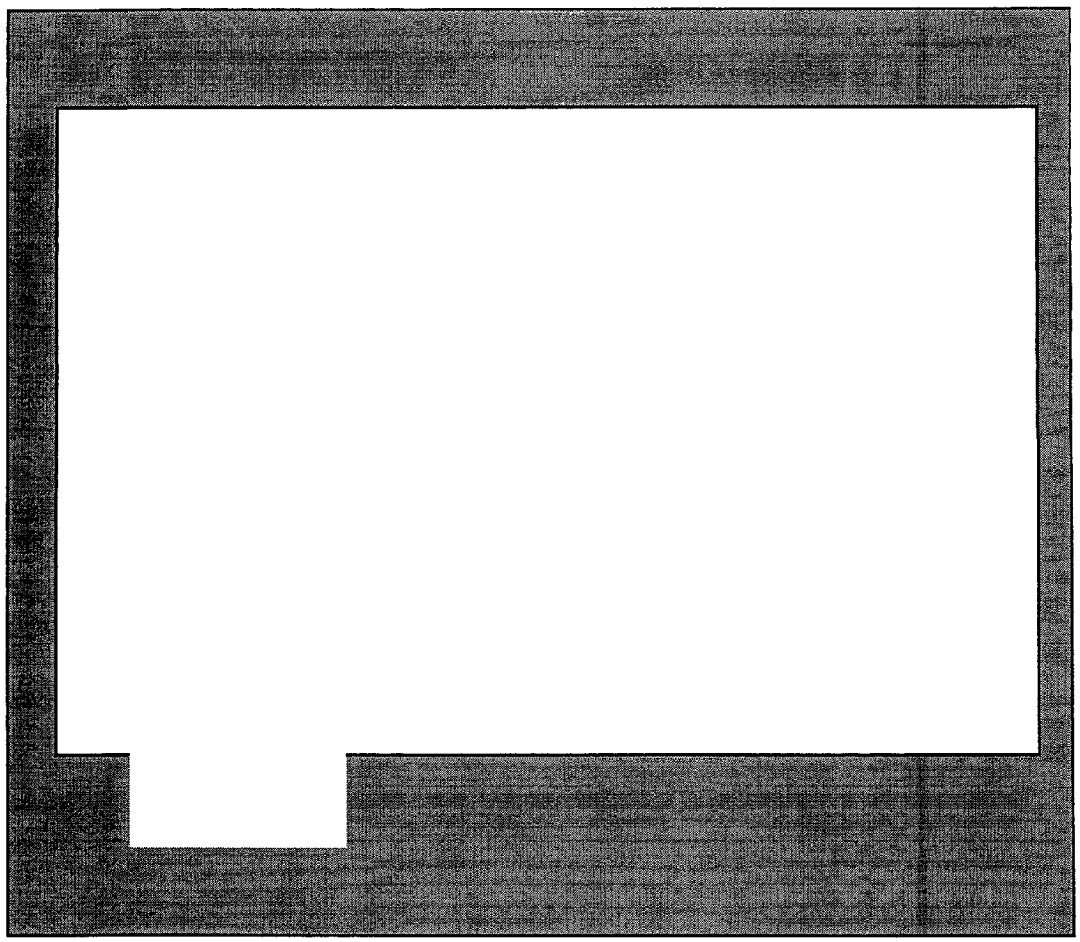
Figure 24:
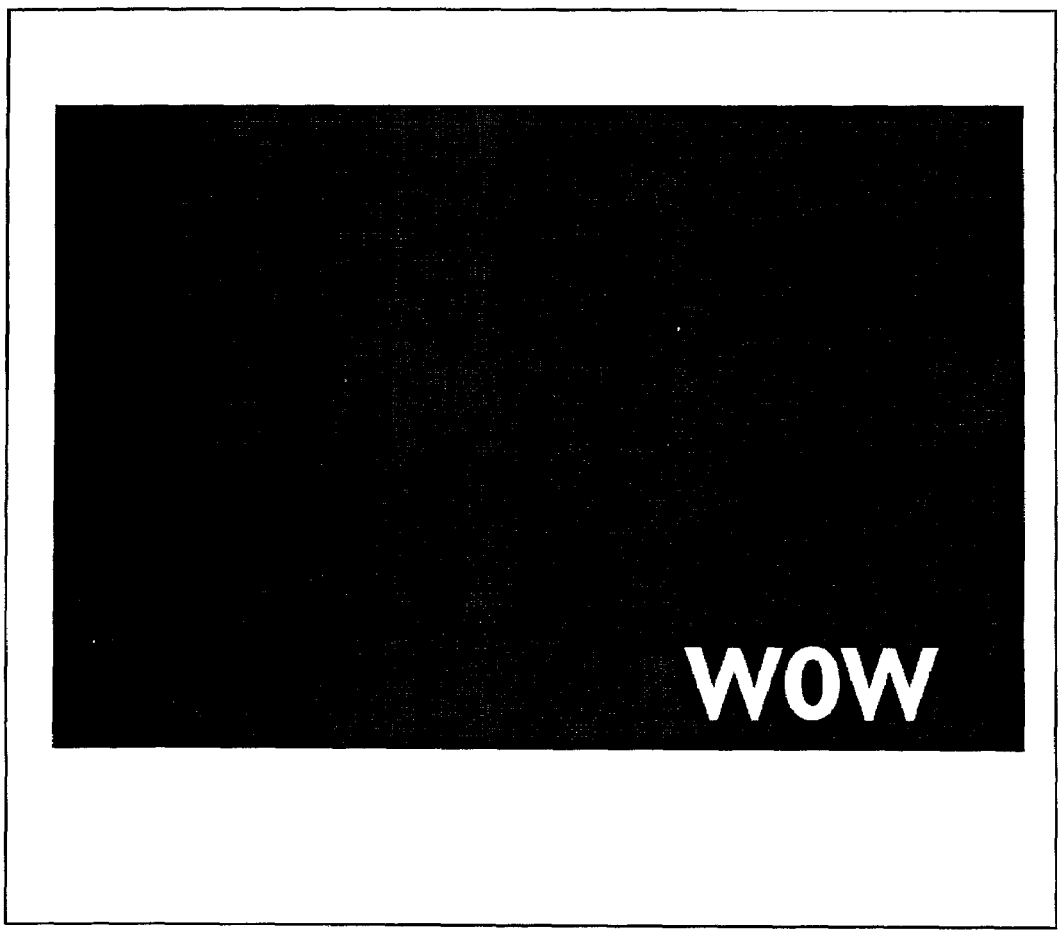
Figure 25:
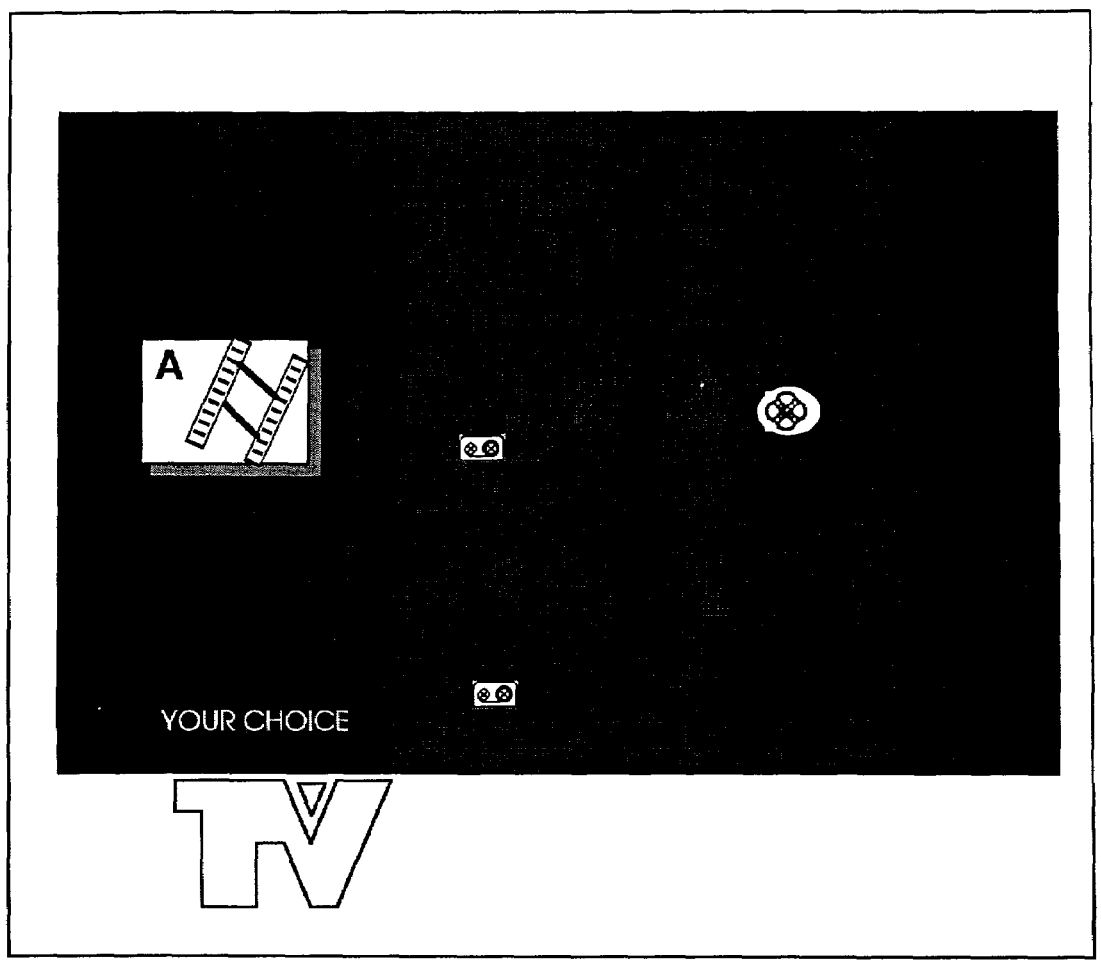
Figure 26:
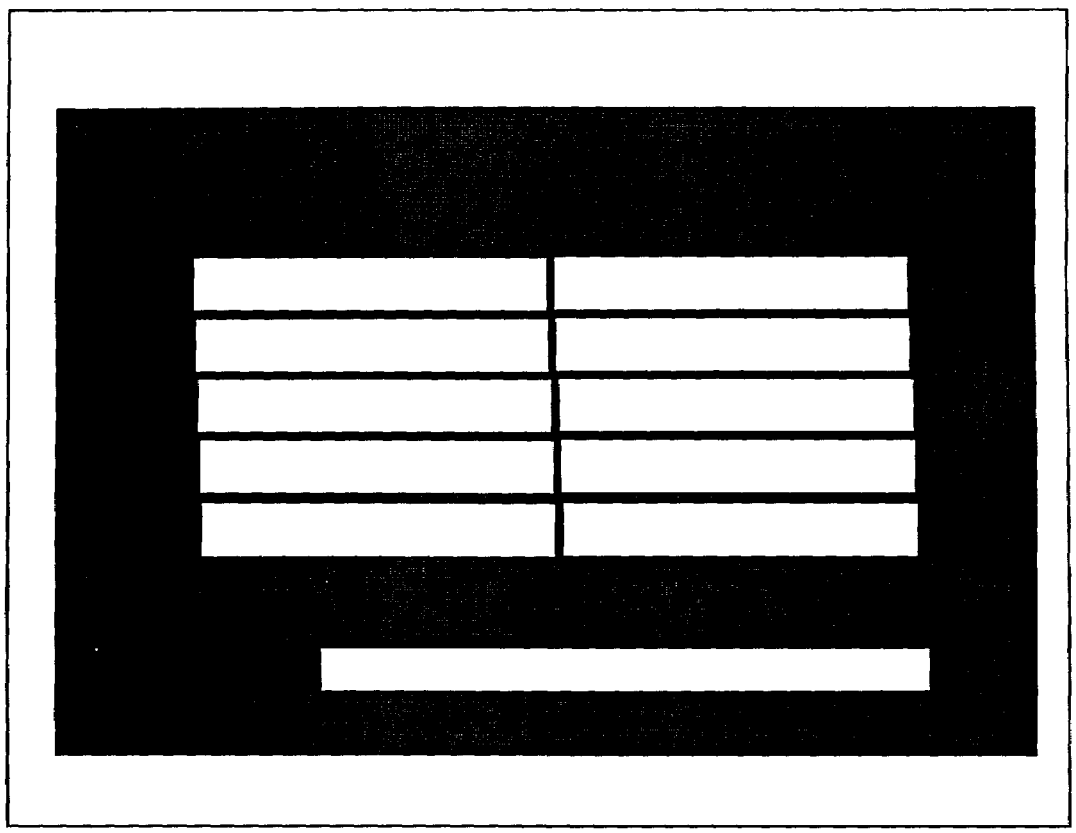
Figure 27:
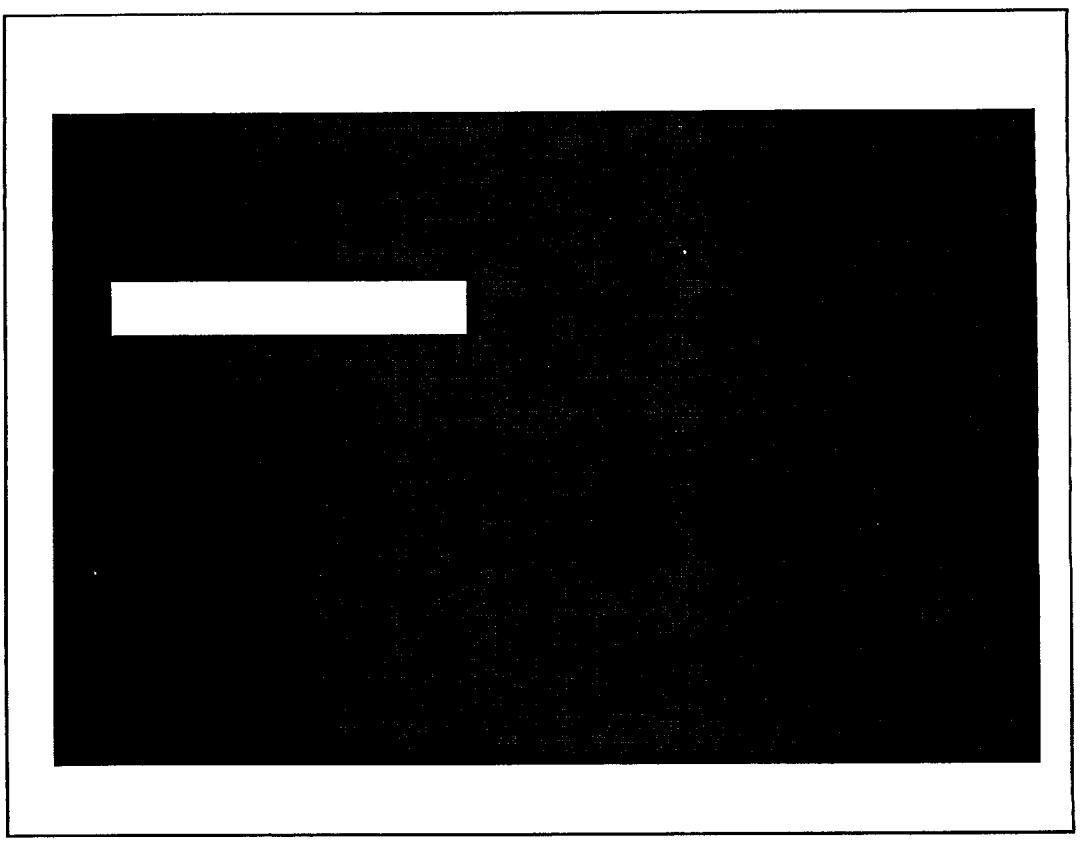
Figure 28:
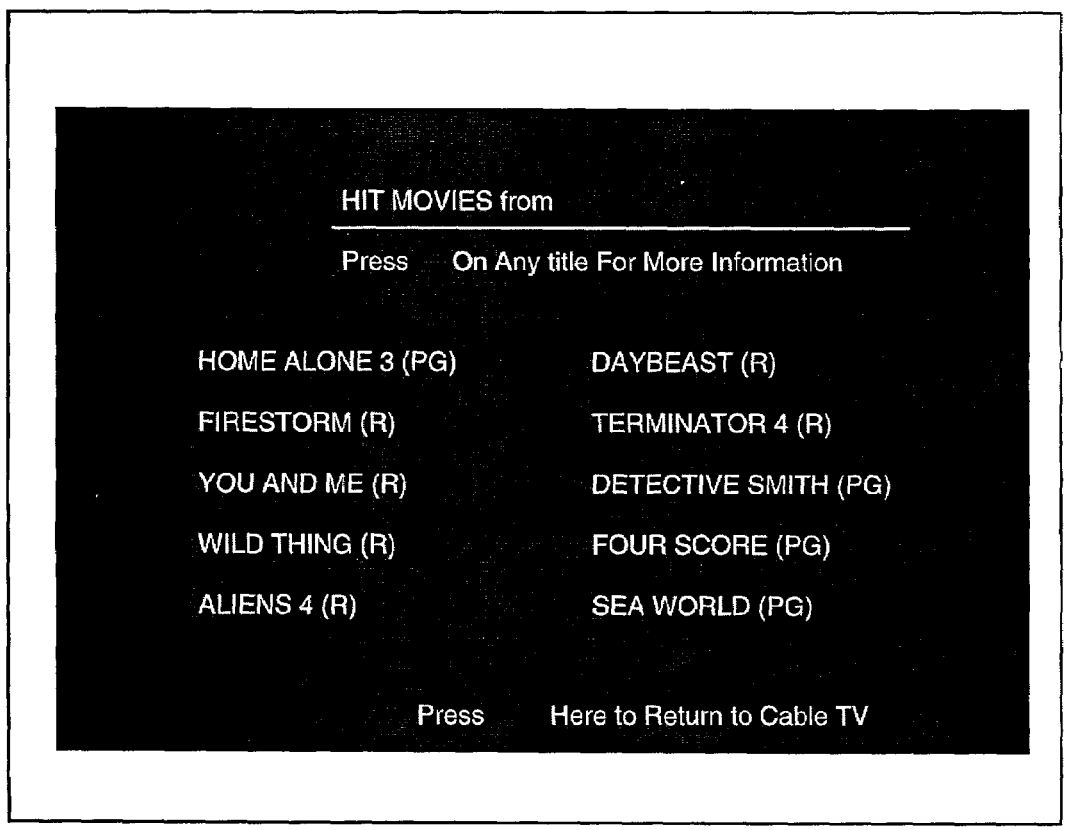

FIGS. 19*d* and 19*e* are the same major menu 1038 as FIG. 19*a* but shows a different selection and a different program description in the lower text 1408, 1412. From any of the menu screens for the digital/audio feature, the subscriber may return to regular cable TV with the press of a single button.

FIGS. 19*b* and 19*c* are promotional menus 1400, 1404 for the digital/audio feature. Using the same logos and menu format, the system can provide a text description enticing the subscriber to pay the monthly fee and join the service. In FIG. 19*b*, the menu allows the user to test the system with a free demonstration. The menu in FIG. 19*c* allows the subscriber to request additional promotional information about the system. Both FIGS. 19*b* and 19*c* are representative of promotional menus that may be used throughout the menued system.

FIGS. 20 through 28 demonstrate the generation of menu screens.

What is claimed is:

1. A set top terminal for generating an interactive electronic program guide for display on a television connected to the set top terminal, the terminal comprising:
   a processor; and
   memory storing instructions that, when executed by the processor, perform:
      retrieving information via a program control information signal of a program selected from a plurality of programs and watched by a subscriber;
      storing said information;
      identifying frequently-watched programs most often watched by said subscriber based upon said stored information;
      receiving a television signal;
      generating an electronic program guide for controlling display of content on a television screen based on a reprogrammable menu format stored in the memory, wherein a reprogramming of the reprogrammable menu format occurs subsequent to receiving an interruption sequence on a program control information channel, the interruption sequence advising that reprogramming information follows, and wherein the guide comprises a favorites menu including names of programs available for selection, wherein the programs included in the favorites menu are based on the identified frequently-watched programs;
      receiving selection signals from a subscriber input of a program that will be broadcast at a future time selected from said favorites menu;
      notifying said subscriber that a change of channel is imminent based upon nearing said future time of said program that will be broadcast at said future time; and
      changing said channel to said program at said future time.

2. The terminal of claim 1, wherein the instructions, when executed, further perform storing in memory identifiers of the frequently-watched programs.

3. The terminal of claim 1, wherein the retrieving of said information includes identifying frequently-watched channels and storing in memory the frequently-watched channels.

4. The terminal of claim 1, wherein the menu includes a list of frequently-watched programs.

5. The terminal of claim 1, wherein the generating of the electronic program guide includes generating the favorites menu to display programs selected from the identified frequently-watched programs.

6. The terminal of claim 1, wherein an allocation of a bandwidth associated with the received television signal is dynamically changed based on a category of programming associated with the received television signal, and wherein a menu capacity associated with the electronic program guide is dynamically modified by adding or deleting at least one submenu in response to the change in bandwidth.

7. A set top terminal comprising:
   means for receiving information via a program control information signal about television viewing preferences of a subscriber;

a memory that stores the information;

means for identifying frequently-watched programs most often watched by said subscriber based upon said stored information;

means for receiving a television signal from an operations center;

means for extracting from the television signal individual programs for display on a television associated with the terminal;

means for generating an interactive program menu on the television based on a reprogrammable menu format received from a cable head end and stored in the memory, wherein a reprogramming of the reprogrammable menu format occurs subsequent to receiving an interruption sequence on a program control information channel, listing a group of available programs, the group being selected based on said identified frequently-watched programs;

means for receiving a signal from a subscriber input device selecting a program available at a future time selected from said group of identified frequently-watched programs;

means for notifying said subscriber that a change of channel is imminent based upon nearing said future time of said selected program available at said future time; and means for changing said channel to said selected program at said future time.

8. The terminal of claim 7, wherein the television viewing preferences include frequently-watched channels.

9. The terminal of claim 7, further comprising:

means for receiving program content information for the individual programs from the operations center, wherein the means for generating comprises means for generating the menu including said identified frequently-watched programs.

10. A set top terminal comprising:

a processor; and memory storing instructions that, when executed by the processor, perform:

matching individual programs to a subscriber based upon information received via a program control information signal about television viewing preferences of said subscriber and identifying frequently-watched programs most often watched by said subscriber;

generating an interactive program menu based on a reprogrammable menu format stored in the memory that displays a group of programs based on said identified frequently-watched programs, wherein a reprogramming of the reprogrammable menu format occurs subsequent to receiving an interruption sequence, the interruption sequence advising that reprogramming information follows;

receiving a signal from a subscriber input device selecting a program available at a future time selected from said group of programs based on said identified frequently-watched programs;

notifying said subscriber that a change of channel is imminent based upon nearing said future time of said selected program available at said future time; and changing said channel to said selected program at said future time.

11. The terminal of claim 10, wherein the matching of the individual programs to said subscriber comprises matching based on information regarding content of the individual programs provided in said program control information signal.

12. An apparatus comprising:

a processor; and memory storing instructions that, when executed by the processor, cause the apparatus to perform:

retrieving information via a program control information signal of a program selected from a plurality of programs;

storing said information;

identifying frequently-watched programs most often watched by a subscriber based upon said stored information;

receiving a television signal;

extracting individual programs from the television signal;

generating an electronic program guide based on a reprogrammable menu format stored in the memory for controlling display of content on a television screen, wherein a reprogramming of the reprogrammable menu format occurs subsequent to receiving an interruption sequence on a program control information channel, the interruption sequence advising that reprogramming information follows, and wherein the guide comprises a favorites menu including names of programs available for selection, wherein the programs included in the favorites menu are based on the identified frequently-watched programs;

receiving selection signals from a subscriber input of a program that will be broadcast at a future time selected from said favorites menu;

notifying said subscriber that a change of channel is imminent based upon nearing said future time of said program that will be broadcast at said future time; and changing said channel to said program at said future time.

13. The apparatus of claim 12, wherein the instructions further cause the apparatus to perform:

decompressing the television signal to obtain the extracted individual programs from the television signal, wherein said generating of said electronic program guide includes at least one of the extracted individual programs.

14. A method comprising:

retrieving information via a program control information signal of a program selected from a plurality of programs;

storing said information;

identifying frequently-watched programs most often watched by a subscriber based upon said stored information;

receiving a television signal;

extracting individual programs from the television signal;

generating an electronic program guide based on a reprogrammable menu format stored in a memory, wherein a reprogramming of the reprogrammable menu format occurs subsequent to receiving an interruption sequence on a program control information channel, the interruption sequence advising that reprogramming information follows, and wherein the electronic program guide controls display of content on a television screen, the guide comprising a favorites menu including names of programs available for selection, wherein the programs included in the favorites menu are based on the identified frequently-watched programs;

receiving selection signals from a subscriber input of a program that will be broadcast at a future time selected from said favorites menu;

notifying said subscriber that a change of channel is imminent based upon nearing said future time of said program that will be broadcast at said future time; and changing said channel to said program at said future time.

15. The method of claim 14, further comprising:

decompressing the television signal to obtain the extracted individual programs from the television signal, wherein said generating of said electronic program guide includes at least one of the extracted individual programs.

* * * * *